United States Patent [19]

Awatsu et al.

[11] Patent Number: 5,777,304
[45] Date of Patent: Jul. 7, 1998

[54] CASH PROCESSING SYSTEM FOR AUTOMATICALLY PERFORMING CASH HANDLING OPERATIONS ASSOCIATED WITH BANKING SERVICES

[75] Inventors: Kiyotaka Awatsu; Masahiko Wada; Akemi Oda; Yasuko Shibata, all of Utsunomiya, Japan

[73] Assignee: Fujitsu Limited, Kanagawa, Japan

[21] Appl. No.: 456,697

[22] Filed: Jun. 1, 1995

Related U.S. Application Data

[62] Division of Ser. No. 813,733, Dec. 27, 1991.

[30] Foreign Application Priority Data

Dec. 28, 1990 [JP] Japan ................. 2-417250
Dec. 28, 1990 [JP] Japan ................. 2-417251
Dec. 28, 1990 [JP] Japan ................. 2-417252
Dec. 28, 1990 [JP] Japan ................. 2-417253
Dec. 28, 1990 [JP] Japan ................. 2-417254

[51] Int. Cl.[6] ..................................... G06F 17/60
[52] U.S. Cl. ............... 235/379; 235/375; 902/8; 902/9
[58] Field of Search ................ 235/379, 375; 902/8, 9, 13, 20

[56] References Cited

U.S. PATENT DOCUMENTS

| | | | |
|---|---|---|---|
| 3,949,364 | 4/1976 | Clark et al. | 340/147 A |
| 4,337,393 | 6/1982 | Hilton | 235/487 |
| 4,670,643 | 6/1987 | Hain et al. | 235/379 |
| 4,704,061 | 11/1987 | Peebles | 414/405 |
| 4,808,801 | 2/1989 | Nakagawa | 235/379 |
| 4,816,652 | 3/1989 | Wildgoose et al. | 235/379 |
| 4,917,792 | 4/1990 | Murakami | 235/379 X |
| 4,992,648 | 2/1991 | Hutchison | 235/379 |
| 5,012,075 | 4/1991 | Hutchinson et al. | 235/379 |
| 5,056,643 | 10/1991 | Kirberg | 235/379 X |
| 5,099,423 | 3/1992 | Graef et al. | 235/379 |
| 5,247,159 | 9/1993 | Yuge et al. | 902/12 |
| 5,256,862 | 10/1993 | Wantanabe et al. | 235/379 |

FOREIGN PATENT DOCUMENTS

| | | | |
|---|---|---|---|
| 0 143 663 | 6/1985 | European Pat. Off. | G07D 1/00 |
| 0 148 310 | 7/1985 | European Pat. Off. | |
| 0 164 733 | 12/1985 | European Pat. Off. | G07D 1/00 |
| 0 307 375 | 3/1989 | European Pat. Off. | G07D 1/00 |
| 59-214992 | 5/1983 | Japan | |
| 62-180827 | 3/1986 | Japan | |
| 63-74829 | 9/1986 | Japan | |
| 1-282695 | 5/1988 | Japan | |
| 2 134 493 | 8/1984 | United Kingdom | G07D 1/00 |
| 2 217 086 | 10/1989 | United Kingdom | G07F 7/00 |
| 2 220 646 | 1/1990 | United Kingdom | G07D 7/00 |
| 2 225 891 | 6/1990 | United Kingdom | G07D 7/00 |

Primary Examiner—Donald T. Hajec
Assistant Examiner—Michael G. Lee
Attorney, Agent, or Firm—Staas & Halsey

[57] ABSTRACT

A cash processing system is capable of reducing manual operation in placing and collecting from a cashing handling apparatus, such as ATM's, cash dispensing machines and so forth and thus can eliminate the occurrence of error or theft. The cash processing system includes a detachable cash safe, a cash processing apparatus that detachably receives the cash safe for automatically setting a commanded amount of cash therein, and a cash handling apparatus that detachably receives the cash safe, in which the commanded amount of cash is set, for performing services including a cash dispensing service.

6 Claims, 47 Drawing Sheets

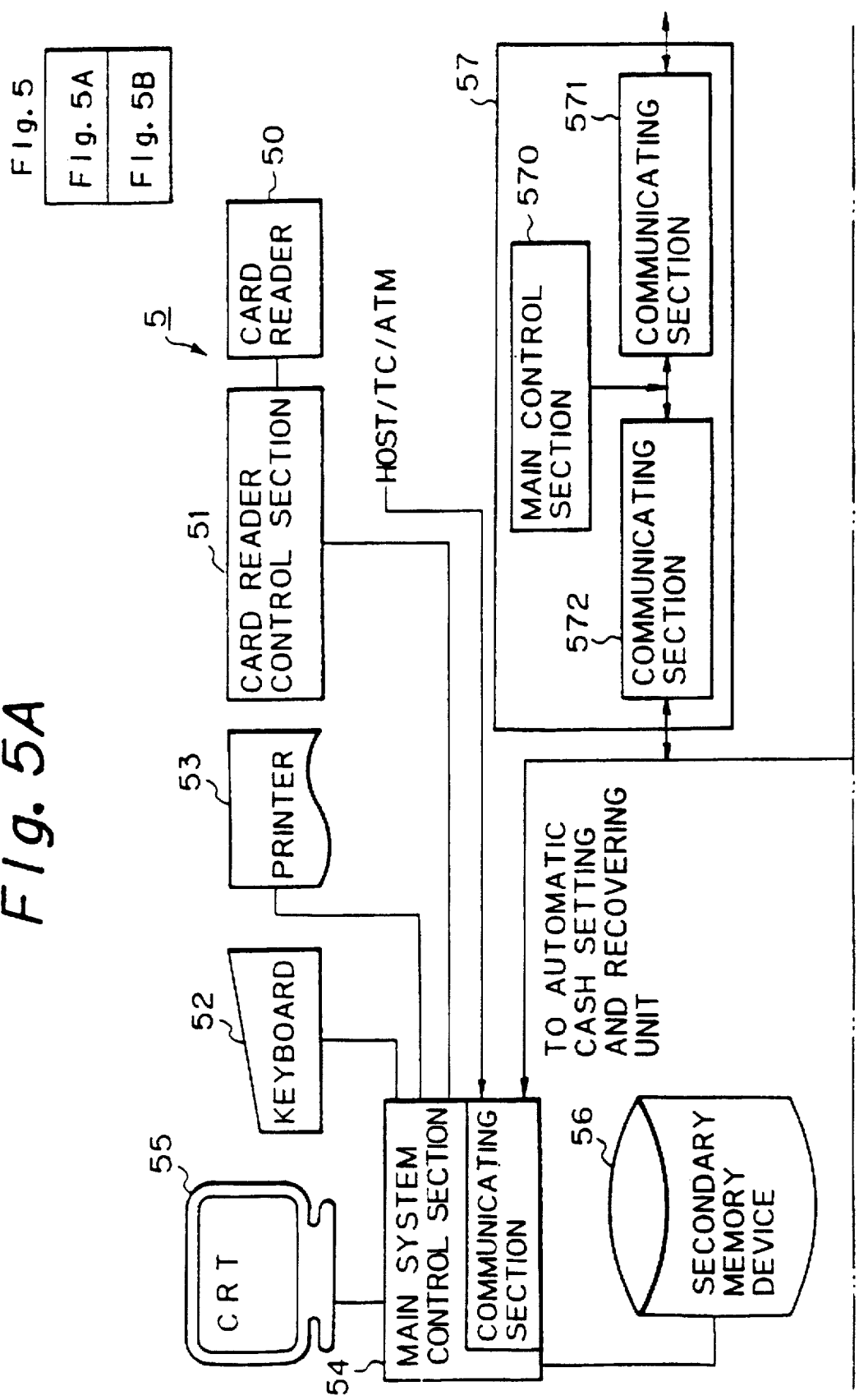

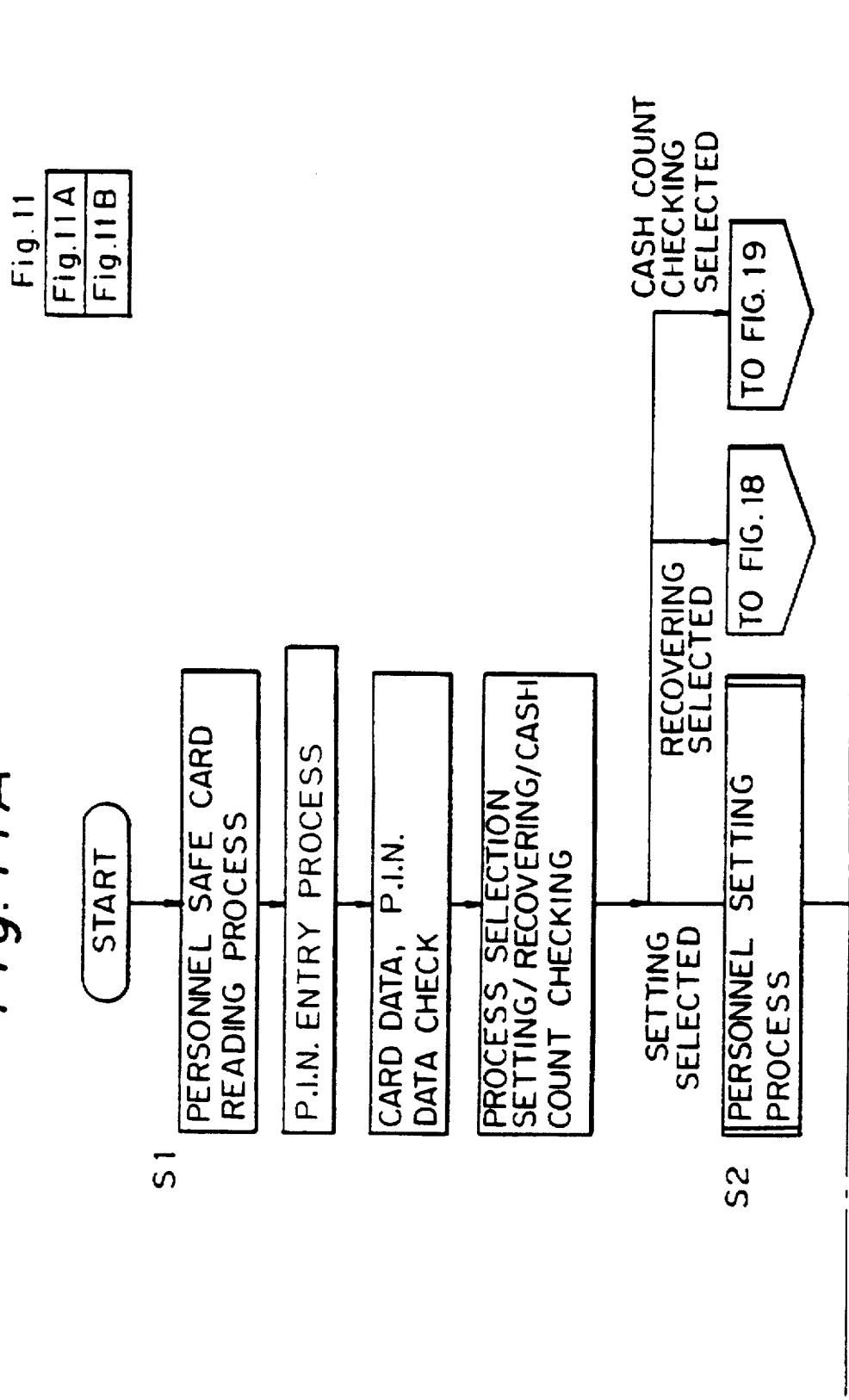

PROCESSED PERSONNEL △△△△△

OPERATING DEVICE (AUTOMATIC CASH SETTING AND RECOVERING UNIT ID)

CASH SAFE ID ○○○○

PROCESSED NUMBER

| | RECOVERY (R) | SETTING (S) | TOTAL |
|---|---|---|---|
| ¥10000 | 1000 | 2000 | S 1000 |
| ¥5000 | 90 | 0 | R 90 |
| ¥1000 | 5000 | 7000 | S 2000 |
| NG BILL | 10 | — | R 10 |
| TOTAL | 6100 | 9000 | − 2900 |

Fig. 25

| CASSETTE NUMBER | | A 0 0 1 |
|---|---|---|
| AVAILABLE APPARATUS | BANK NUMBER | 0 0 0 1 |
| | BRANCH NUMBER | 0 1 3 8 |
| | APPARATUS NUMBER | 0 0 1 0 |
| | BANK NUMBER | 0 0 0 1 |
| | BRANCH NUMBER | 0 1 3 8 |
| | APPARATUS NUMBER | 0 0 1 2 |

Fig. 26

| CASSETTE NUMBER | | A 0 0 2 |
|---|---|---|
| AVAILABLE APPARATUS | BANK NUMBER | 0 0 0 1 |
| | BRANCH NUMBER | 0 1 3 8 |
| | APPARATUS NUMBER | FREE |

Fig. 27

| CASSETTE NUMBER | | A 0 0 3 |
|---|---|---|
| AVAILABLE APPARATUS | BANK NUMBER | 0 0 0 1 |
| | BRANCH NUMBER | FREE |
| | APPARATUS NUMBER | FREE |

Fig. 28

| CASSETTE NUMBER | | A 0 0 1 |
|---|---|---|
| AVAILABLE APPARATUS | BANK NUMBER | FREE |
| | BRANCH NUMBER | FREE |
| | APPARATUS NUMBER | FREE |

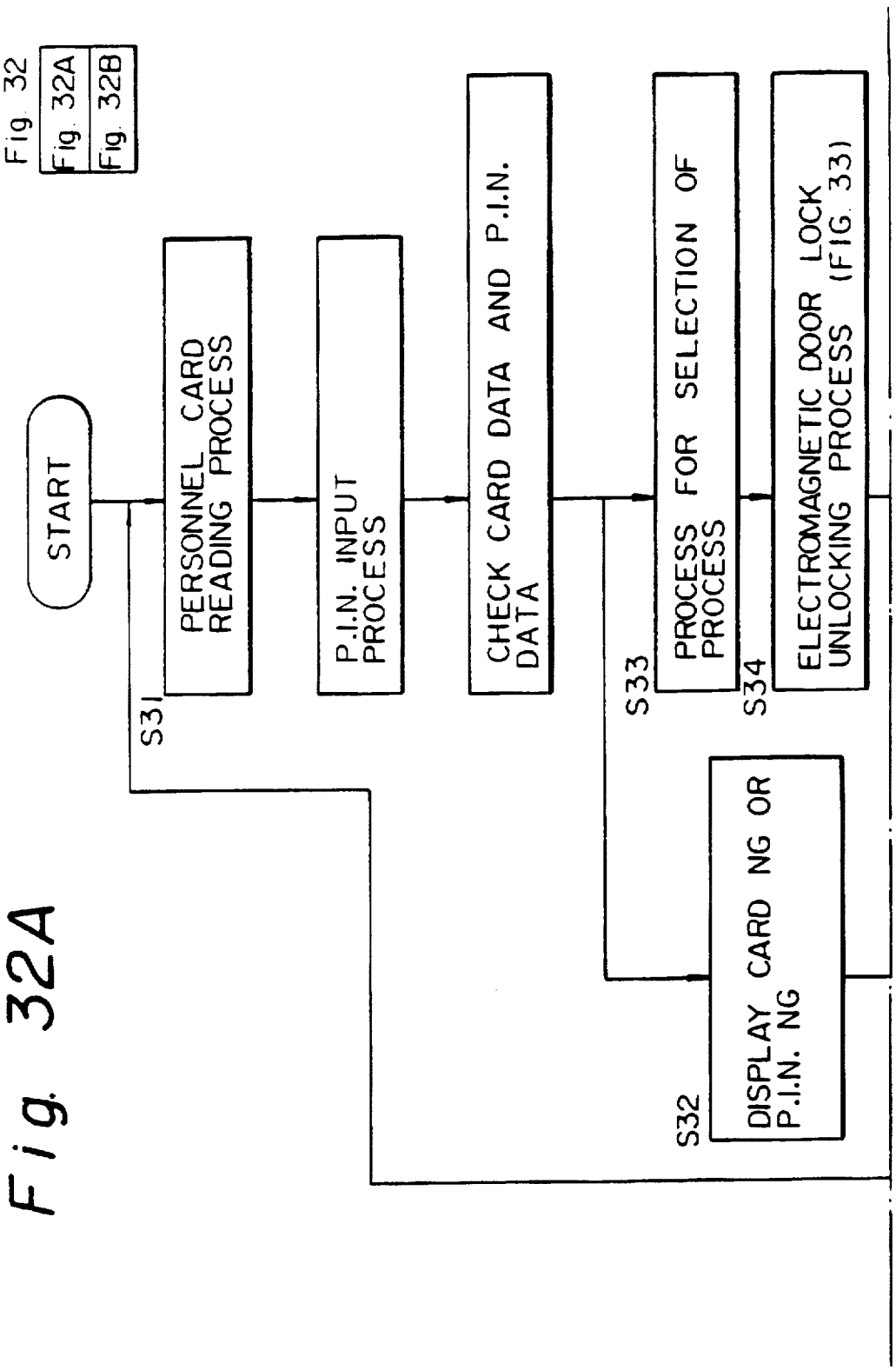

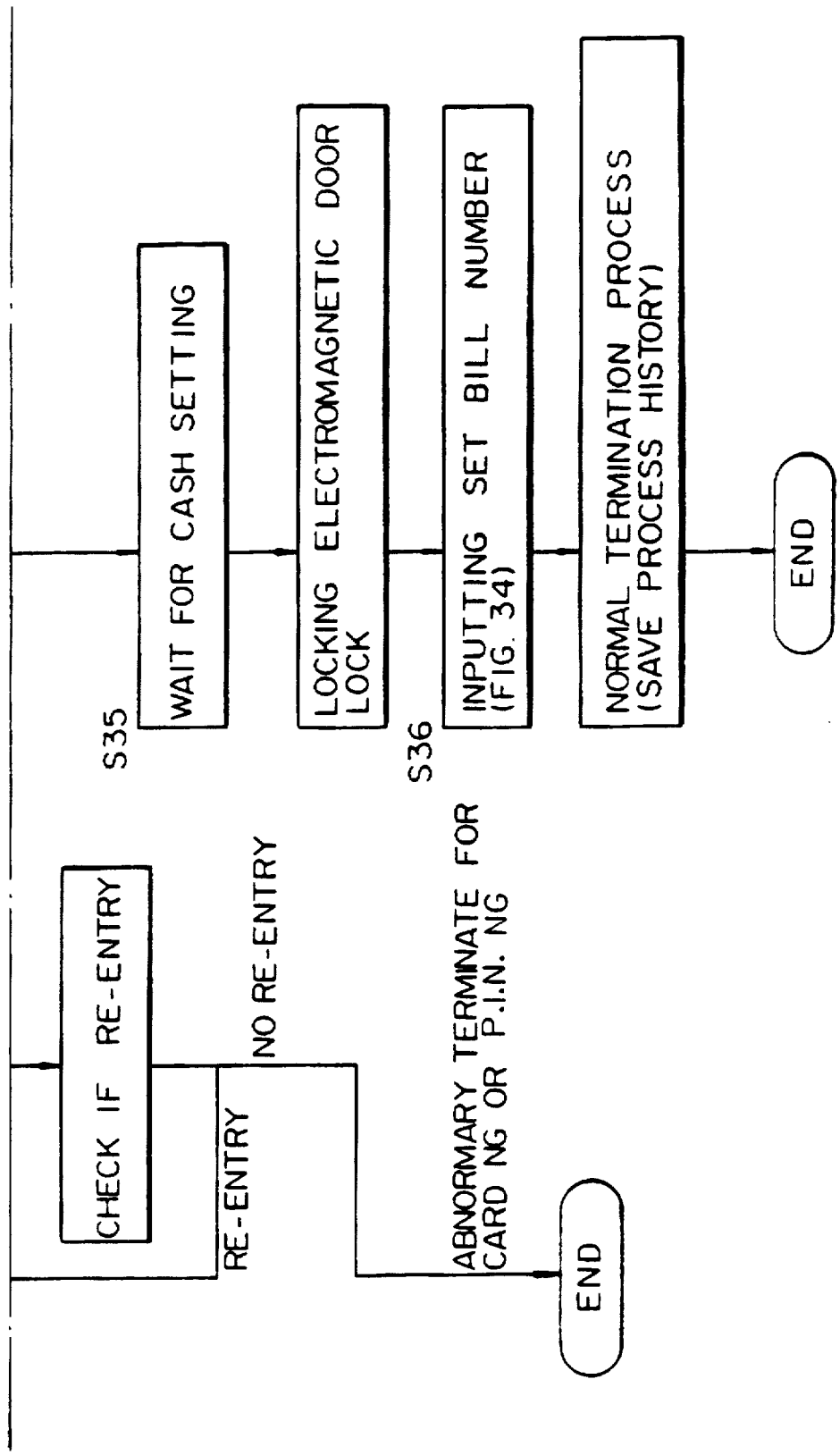

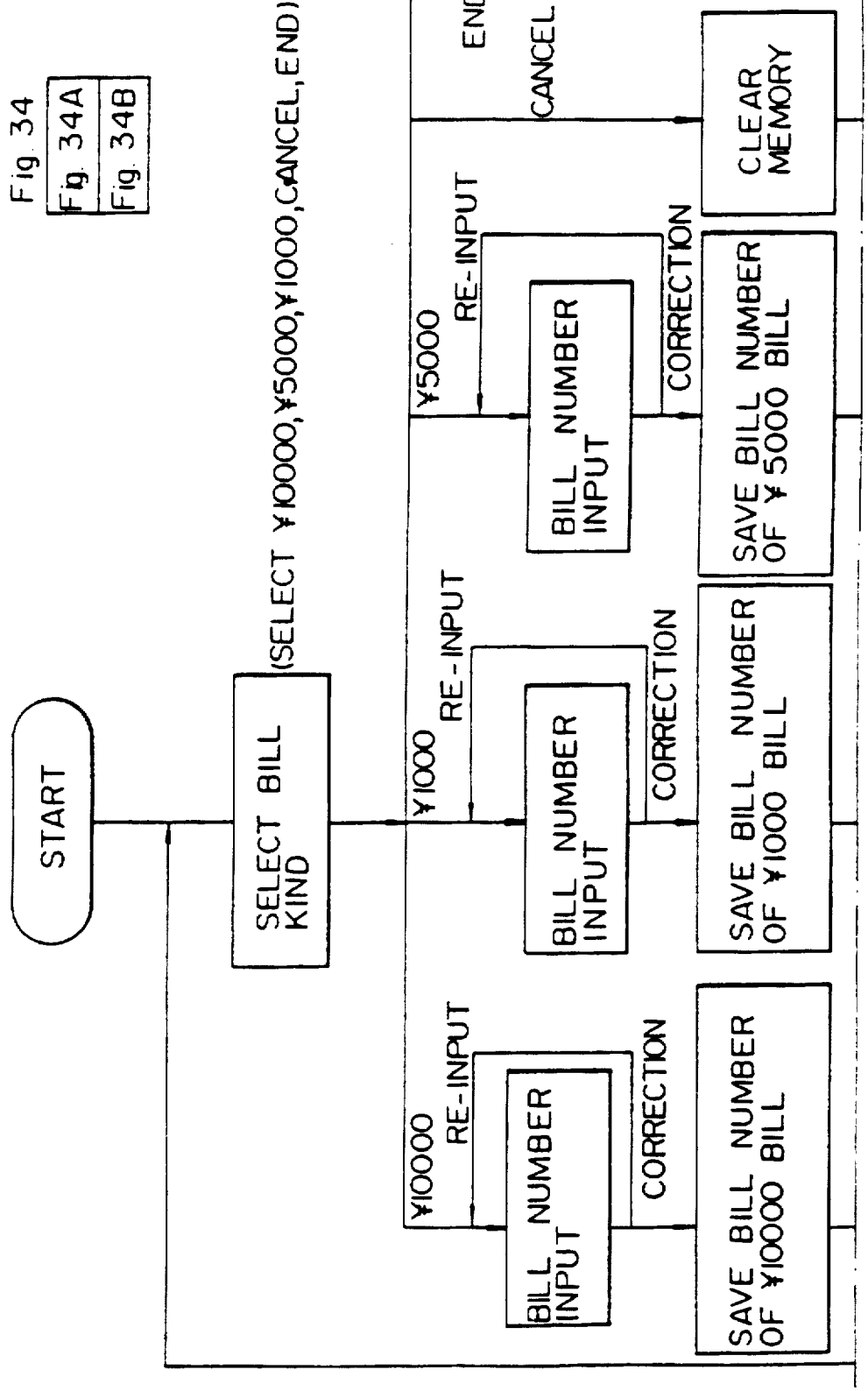

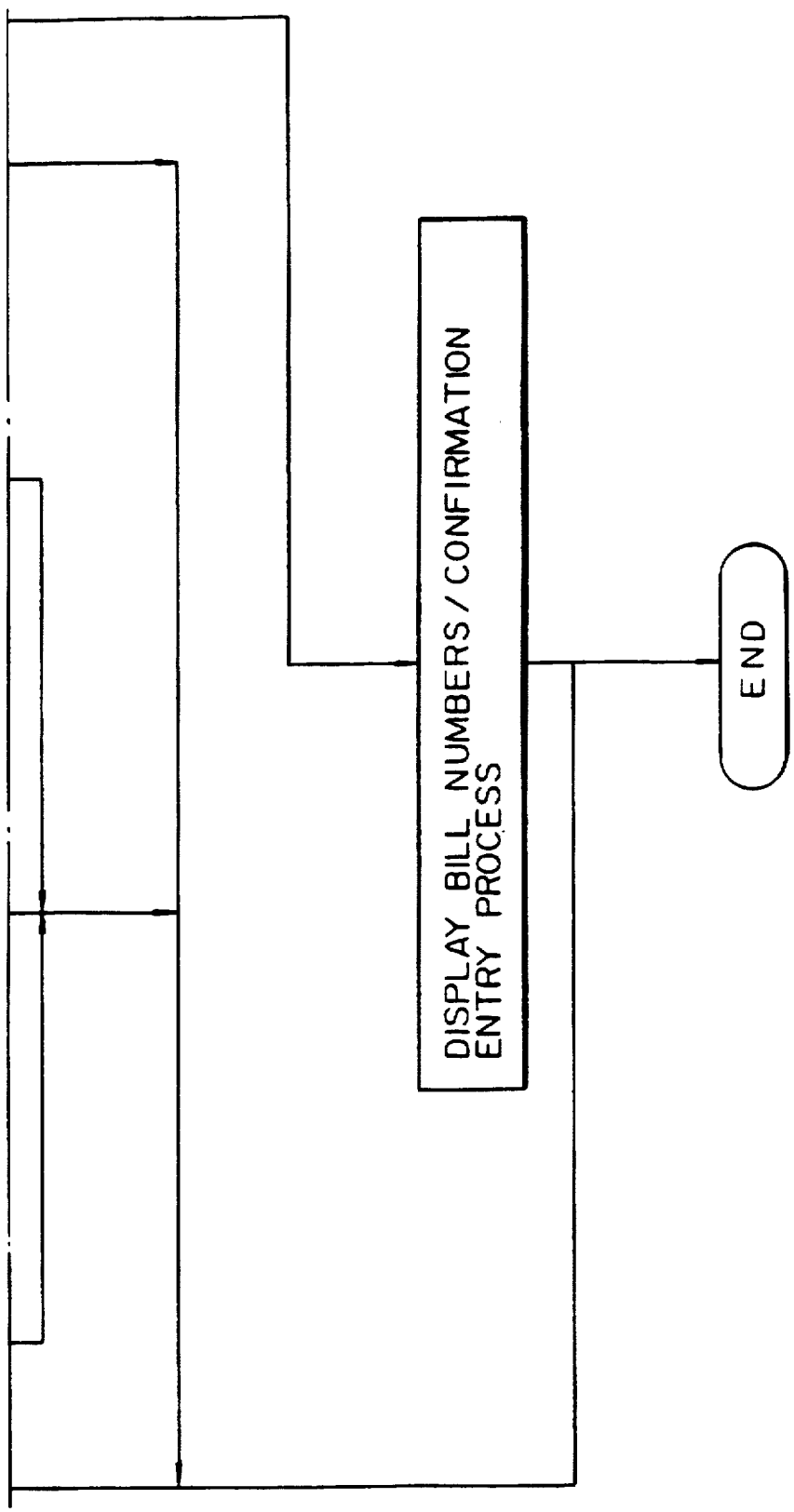

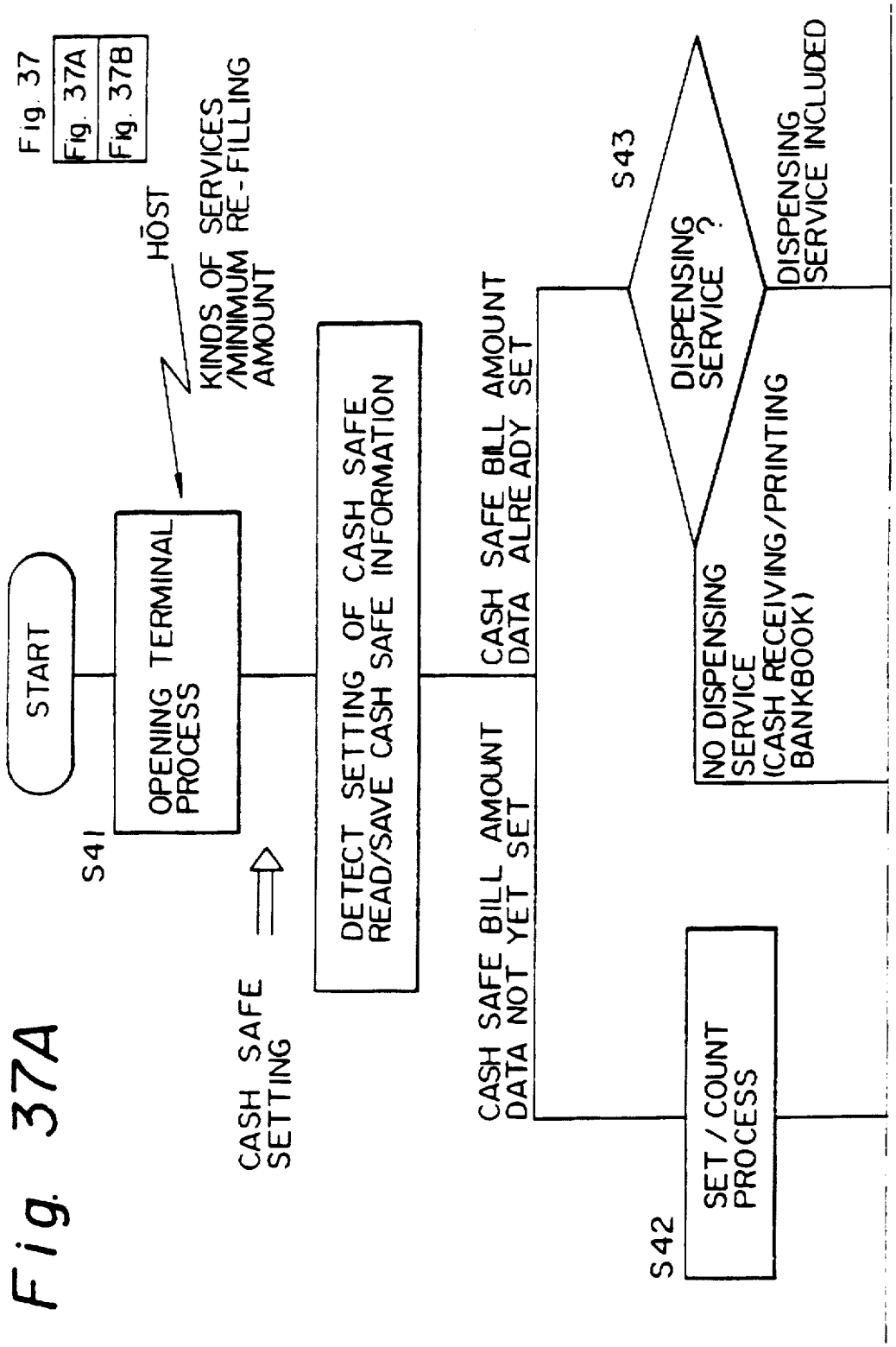

| Fig. 44A |
|----------|
| Fig. 44B |

```
         START
           │
    ┌──────────────┐
S53 │ CUSTOMER     │
    │ OFFERS LEFT  │
    │ CASH         │
    └──────┬───────┘
           │
    ┌──────────────┐
    │ READ         │
    │ PERSONNEL    │
    │ CARD         │
    └──────┬───────┘
           │
          ╱ ╲
         ╱   ╲
        ╱CASH ╲
       ╱ SAFE  ╲     NO
      ╱ SET IN  ╲─────────────────┐
      ╲CASH HAND╱                 │
       ╲ING APP╱                  │
        ╲ARATUS╱                  │
         ╲  ? ╱                   │
          ╲ ╱                     │
         YES│                     │
           │                      │
    ┌──────────────┐       ┌──────────────────────┐
S54 │ CONFIRM LEFT │   S55 │ CONNECT ADAPTER TO   │
    │ CASH INFORMA-│       │ CASH SAFE FOR        │
    │ TION BY MOP/ │       │ CONFIRMING           │
    │ UOP          │       │ INFORMATION THROUGH  │
    └──────┬───────┘       │ TERMINAL OR          │
           │               │ CONFIRM LEFT CASH    │
           │               │ INFORMATION BY       │
           │               │ DISPLAY SECTION      │
           │               │ OF THE CASH SAFE     │
           │               └──────────┬───────────┘
           │                          │
    ┌──────────────┐       ┌──────────────────────┐
S56 │ ENTRY LEFT   │       │ ENTER LEFT CASH      │
    │ CASH STRONG  │       │ STORING ORDER        │
    │ ORDER NUMBER │       │ NUMBER AND DEPRESS   │
    │ AND DEPRESS  │       │ RETURNING KEY        │
    │ RETURNING KEY│       └──────────┬───────────┘
    └──────┬───────┘                  │
           │                          │
           └──────────────┬───────────┘
```

Fig. 48

DISPLAY 1

LEFT CASH INFORMATION SEARCH

PLEASE SELECT ITEM FOR ENTRY AND MAKE ENTRY AS DISPLAYED

| NAME | P.I.N. | PERSONAL INDIFI- CATION NUMBER |

OOOOO CONFIRM         OOOO CONFIRM

| SERVICE AMOUNT |   | SERVICE DATE AND TIME |

¥OOOOO CONFIRM       OYOMODOT CONFIRM

DISPLAY 2

CONFIRM

| A | B | C | D | E |
| F | G | H | I | J |
| K | L | M | N | O |
| P | Q | R | S | T |
| U | V | W | X | Y |
| Z |   |   |   |   |

| 0 | 1 | 2 | 3 | 4 |
| 5 | 6 | 7 | 8 | 9 |

[¥] [Y] [M] [D] [T]

CASH PROCESSING SYSTEM FOR AUTOMATICALLY PERFORMING CASH HANDLING OPERATIONS ASSOCIATED WITH BANKING SERVICES

CROSS-REFERENCE TO RELATED APPLICATION

The present application is a division of U.S. application Ser. No. 07/813,733 dated Dec. 27, 1991, now pending, in which one of the assignees is the same as the assignee of the present application.

BACKGROUND OF THE INVENTION

1. Field of the Invention

The present invention relates generally to a cash processing system that automatically performs cash handling operations associated with banking services and so forth. More specifically, the invention relates to a cash processing system that performs automatic stacking of cash in a safe, manages the said safe, dispenses cash from the safe and holds cash that the user has inadvertently not retrieved and other banking associated operations.

2. Description of the Related Art

In recent years, cash handling apparatuses such as automatic teller's machines (ATM), cash dispensers and so forth have been widely used in banking services and so forth. Such cash handling apparatuses include a detachable cash safe that feeds cash from the safe set therein to a cash stacker for dispensing the same. Filling of the cash safe is labor intensive work and requires very high security. Furthermore, because of manual operation, there is the possibility of errors or theft occurring during placement of the cash in the cash safe. Therefore, there is the need for the reduction of labor and the maintenance of a high level of security.

The conventional practice for placing cash in the cash safe for access to the cash handling apparatus involves a responsible worker obtaining the necessary amount of cash from a cashier, manually setting the cash in the cash safe and then performing a key input (through a key array of the cash handling apparatus) for the set amount of cash.

Similarly, for recovering cash, the said worker manually withdraws the cash from the cash safe, performs a counting operation, issues a receipt and returns the cash to the cashier.

Because of the nature of handling the cash, complete security and error free operation is desired. In the prior art, Japanese Unexamined Patent Publication 2-21393 proposes a cash safe incorporating a memory. The cash safe is connected to a computer for inputting an amount of money set in the safe thus making the amount of cash in the safe definite to prevent theft or error from occurring. However, even in the proposed system, management of the safe is still performed by the responsible person having a key. In other words, the person possessing the key still has access to the cash in the safe thereby maintaining the possibility of error or theft, occurring. Especially, in view of the current trend for holiday banking services that require authorization of the management of the cash safe to a third party, such as security services, the possibility of the above problems occurring has increased.

On the other hand, from the viewpoint of service to customers, manual operation of placing cash in the safe, and setting the cash safe in the cash handling apparatus can cause inconvenience during service time. Namely, when the safe and cash handling apparatus are empty, the apparatus becomes inoperative until additional cash is placed within the same. Resetting the filled cash safe is performed by a process identical to that set forth above. Such process is clearly time consuming and thus can cause unnecessary inconvenience for the customer.

Also, when customer forgets retrieve the cash from the cash handling apparatus, it is the current practice to restore the cash in the apparatus and place the unretrieved cash in cash storage with identification of the customer. However, in current practice, checking identification is very cumbersome and time consuming work when the customer returns to retrieve the money.

In addition, it is also possible that the cash safe will be set to the incorrect cash handling apparatus. When the cash safe is set to incorrect cash handling apparatus a discrepancy between the existing cash in the safe and the recorded amount can result in confusion, and, when management of the cash safe is authorized to a third party, such as security services, incorrect placement of a safe in a cash handling apparatus having different banking services is a strong possibility.

In view of the various inconveniences associated with the currently available cash processing systems in the banking services and so forth, improvement measures ensuring greater efficiency, higher security and enhanced services are clearly required.

SUMMARY OF THE INVENTION

Therefore, it is an object of the present invention to provide a cash processing system that can reduce manual operation in placing and collecting cash from a cash handling apparatus, such as ATM's, cash dispensing machines and so forth and thus can eliminate the possibility of error or theft occurring.

Another object of the invention is to provide a cash processing system that can assure security even when cash placement and cash collection are authorized to the third party, such as security services without error and/or theft occurring.

A further object of the invention is to provide a cash processing system that can prevent incorrect placement of funds in the cash handling apparatus by enabling a check to take place to determine if the funds are properly placed in the intended cash handling apparatus.

A still further object of the present invention is to provide a cash processing system that enables efficient setting of cash in the cash handling apparatus for reducing customer waiting time during restoring operations during service hours.

A yet further object of the present invention is to provide a cash processing system that facilitates the return of cash inadvertently left in the cash handling apparatus.

According to one aspect of the invention, a cash processing system comprises:

a detachable safe;
 a cash processing apparatus that receives the detachable cash safe for automatically placing a commanded amount of cash therein; and
 a cash handling apparatus that receives the safe, in which the commanded amount of cash is placed for performing services including a cash dispensing service.

In the preferred construction, the cash processing apparatus comprises a personnel accessible input and output unit, through which a command for cash processing is entered, and an automatic cash processing unit (also termed a setting (i.e., placing) and recovery unit) in response to the command from the personnel accessible input and output unit for automatically placing cash in the cash safe. In this case, the personnel accessible input and output unit may check the content of a person's card and a secret code entered by the personnel for permitting entry for the cash processing command only if the result of the check confirms the authenticity of the personnel. Also, the cash handling unit may be responsive to a cash recovering command from the personnel accessible input and output unit to perform cash recovery from the cash safe. In addition, the personnel accessible input and output unit may permit entry of kinds of and number of bills to be set in the cash safe, and the cash processing unit may be responsive to the entered kinds of and amount of each kind of bill for placing the commanded number of bills in the cash safe. In this case, the automatic cash processing unit (also termed a setting (i.e., placing) and recovery unit) may initially recover funds remaining in the cash safe, if any, and subsequently performs placement of the commanded amount of cash therefor. In the preferred process, the automatic cash processing unit (also termed a setting (i.e., placing) and recovery unit) alternatively places different bills of given denomination when a plurality of bills are to be placed in the cash safe.

It is also possible for the automatic cash processing unit (also termed a setting (i.e., placing) and recovery unit) to store the content of cash processing in the personnel accessible input and output unit after completion of the commanded cash processing. Furthermore, the personnel accessible input and output unit preferably issues a receipt upon completion of cash processing of the cash processing unit.

In the preferred construction, the cash safe comprises a memory for storing cash safe information, the cash processing apparatus reads out the said safe information from the memory upon setting of the cash safe therein and performs a check to determine consistency. Also, the cash safe may comprise a memory, and the cash processing apparatus writes cash setting information in the memory upon placing cash in cash safe. The cash handling apparatus reads out the safe information from the memory upon setting of the cash safe therein and performs a check for consistency.

The cash handling apparatus may read out the cash setting information from the memory upon setting of the cash safe therein. The cash handling apparatus and the cash processing apparatus may be connected to an upper level unit, and the cash processing apparatus may transfer cash setting information to the cash handling apparatus through the upper level unit.

According to another aspect, a cash processing system comprises:

a detachable cash safe;

a cash processing apparatus receives the detachable cash safe for automatically placing a commanded amount of cash therein; and a cash handling apparatus that receives the cash safe and is connected to an upper level unit, in which the commanded amount of cash is placed, for performing services including a cash dispensing service, the cash handling apparatus being provided with presence and absence of recovery process information at the occurrence of incorrect setting of the cash safe and enabling use of the mis-matched cash safe by a recovery process according to a command from the upper level unit.

A further aspect of the invention, a method for managing a cash safe in a cash handling apparatus includes:

a detachable cash safe;

a cash handling apparatus for receiving the cash safe and performing services including a cash dispensing service, wherein the managing method comprises the steps of:

storing available apparatus information in a memory in the cash safe;

reading out the available apparatus information in the memory upon setting of cash safe in the cash handling apparatus and determining whether the set cash safe is available for use; and inhibiting use of the cash safe if not available for use.

If the available apparatus information contains information for more than one available apparatus, the apparatus information of the cash handling apparatus, to which the cash safe is set, may be written in the memory of the set cash safe after a check is performed in the cash handling apparatus. The available apparatus information may be read out from the memory of the cash safe when the cash counting checking process for the cash safe is performed. The read out available apparatus information may be displayed on a display section of the cash safe. The cash safe is connected to a cash processing apparatus and the read available apparatus information may be input to the cash processing apparatus. The cash processing apparatus may feed out the cash in the cash safe for counting.

According to a further aspect, a cash handling apparatus comprises:

a cash handling unit for performing services including a cash dispensing service;

a detachable cash safe to be set in the cash handling unit for feeding out cash stored therein; the cash safe including an input section, a card reader, a door lock mechanism and a control section, the input section accepts entry of a secret code and the card reader receives personnel cards for reading the content therein; and the door lock mechanism being controlled for unlocking depending upon the result of a comparison of the secret code and the content of the personnel card.

The control section may include a memory and cash setting information entered through the input section and stored in the memory.

According to yet a further aspect of the present invention, a cash handling apparatus comprises:

a detachable cash safe;

a cash handling unit receiving the cash safe and dispensing cash from the cash safe; the cash handling unit includes a control section for controlling the cash handling unit;

a memory incorporated in the cash safe and storing safe information; and the control section reading out the safe information from the memory upon setting of the cash safe at the cash handling apparatus for checking consistency.

According to a further aspect of the invention, a method for placing cash in a cash handling apparatus that includes a detachable cash safe, a cash handling unit including a stacker for a dispensing operation, the cash handling unit including a control section and placing cash from the cash safe to the stacker, the method comprising the steps of:

inputting set bill amount in the cash safe to the control section; and controlling placing of cash from the cash safe to the stacker so that a predetermined minimum amount of cash is placed from the cash safe to the stacker.

A method for placing cash in a cash handling apparatus that includes a detachable cash safe, a cash handling unit including a stacker for a dispensing operation; the cash handling unit includes a control section and places cash from the cash safe to the stacker, the method comprising the steps of:

inputting set bill amount in the cash safe to the control section; and setting available services for the cash handling apparatus excluding a cash dispensing service by the control section; and directly placing the cash handling apparatus in a ready state for service without performing the cash placing operation, and performing a cash placing operation from the cash safe to the stacker during the ready state.

The different kinds of bills may be placed in the cash safe in alternative fashion for given numbers, and placing of cash to the stackers is performed in an alternating fashion. The method may include a detachable cash safe, a cash handling unit including a stacker for a dispensing operation, the cash handling unit includes a control section and places cash from the cash safe to the stacker, the method comprising the steps of:

inputting set bill amount in the cash safe to the control section; and if only one denomination of bill is contained in the cash safe, performing a cash dispensing service directly from the cash safe without performing a cash placing operation to the stacker.

A memory may be provided in the cash safe, and the method may comprise storing bill amount set in the cash safe in the memory and reading out the set bill amount stored in the memory by the control section.

According to a further aspect of the invention, a method for handling funds left in a cash handling apparatus that includes a left cash storage section for storing the cash left in the cash handling apparatus, a cash handling unit for dispensing cash from a cash stacker, and a control section for controlling the cash handling unit; the cash handling unit transferring the left cash to the left cash storage section, the method comprising the steps of:

storing left cash information associated with the left cash in a left cash storage file in a memory upon occurrence of cash being left in the cash handling apparatus; and displaying the left cash information stored in the memory upon returning the left cash.

The method may further comprise a step of storing left cash returning information in a left cash return file in the memory upon return of the left cash. Also, the method may further comprise outputting the left cash return information and erasing the output left cash return information from the left cash return file.

The left cash storage section and memory may be provided in a cash safe detachably set in the cash handling apparatus. The method may further comprise a step of displaying the left cash information on a display section of the cash handling apparatus. Alternatively, the method may further comprise displaying the left cash information on a display section or a display section connected to the cash safe.

In addition, the method may further comprise performing a search in the left cash file in the memory in terms of part of the left cash information entered through an input section for accessing corresponding left cash information. Also, the method may further comprise performing a search in the left cash return file in the memory in terms of part of the left return cash information entered through an input section for accessing corresponding left cash information.

BRIEF DESCRIPTION OF THE DRAWINGS

The present invention will be more fully understood from the detailed description given herebelow and from the accompanying drawings of the preferred embodiment of the invention. Note that the specific embodiment is for the purpose of explanation and illustration only, and in no way limits the present invention.

In the drawings:

FIG. 5A is a block diagram showing an embodiment of a personnel accessible input and output unit to be employed in the embodiment of the cash processing system of FIG. 4;

FIGS. 11A and 11B are flowcharts of one embodiment of a process for cash placement, cash recovery and cash count checking performed in the shown embodiment of the cash processing system of FIG. 4;

FIG. 17 is an illustration showing a receipt to be issued during a process in the cash processing system of FIG. 4;

FIGS. 25 to 28 are illustrations showing examples of information to be registered for management to be entered through the process of FIG. 24;

FIGS. 32A and 32B are flowcharts showing another embodiment of cash placement for the cash handling apparatus in the embodiment of FIGS. 30 and 31;

FIGS. 34A and 34B are flowcharts showing one embodiment of a process for the entry of a number of set bills;

FIGS. 37A, 37B, 38A and 38B are flowcharts showing one embodiment of a sequence of a process associated with refilling cash during operation of the cash handling apparatus;

FIG. 48 is an explanatory illustration showing another embodiment of a display for searching left cash information.

DESCRIPTION OF THE PREFERRED EMBODIMENT

Figure 1:
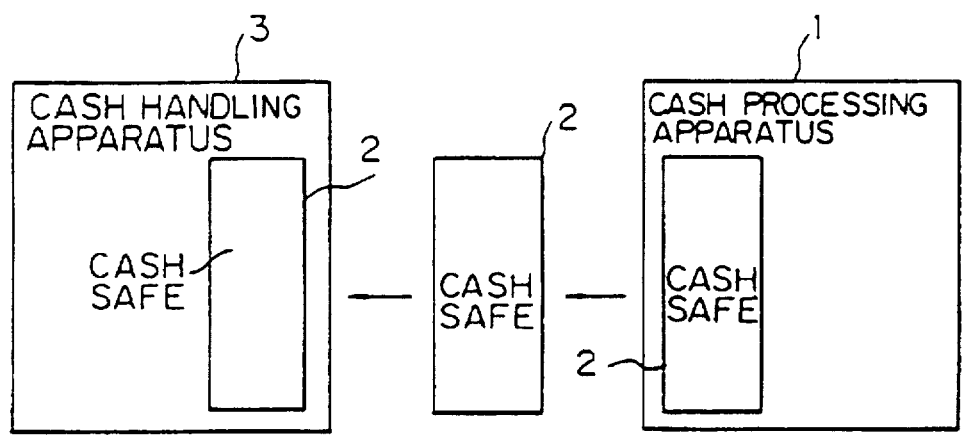
FIGS. 1, 2 and 3 are schematic block diagrams showing general and overview constructions of a cash processing system according to the present invention.
Figure 2:
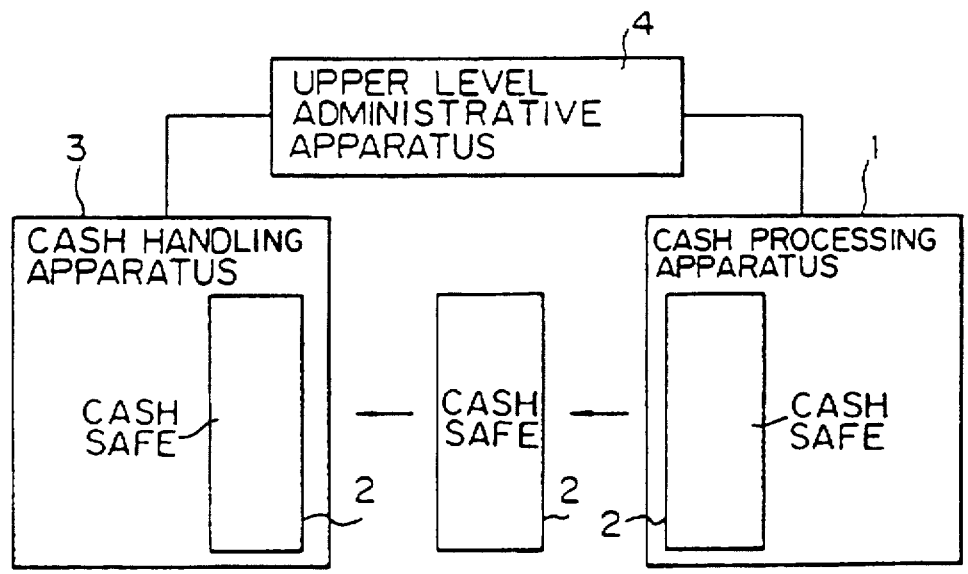
Figure 3:
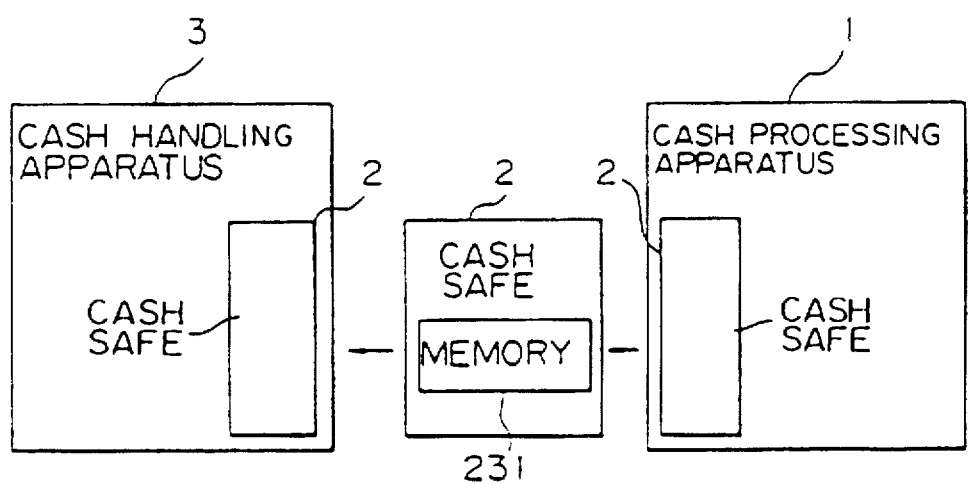

FIGS. 1 to 3 briefly show the general and overview construction of a cash processing system, according to the present invention. FIG. 1 shows the fundamental construction of the cash processing system of the invention. In FIG. 1, the cash processing system includes a cash processing apparatus 1 that sets (i.e., places) a demanded amount of cash in a cash safe 2. The cash safe 2 is detachably installed in the cash processing apparatus 1 to provide the demanded amount of cash. The cash safe 2 is removed from the cash processing apparatus 1 and carried to a cash handling apparatus 3, which comprises an ATM, cash dispenser and so forth. The cash safe 2 is set in the cash handling apparatus 3 for service to the customer.

The cash processing apparatus 1 is interfaced by responsible personnel through an input/output unit so that personnel may perform entry of the demanded amount to be set in the cash safe 2 installed therein. The cash processing apparatus 1 is responsive to the entered demand and automatically places the demanded amount in the cash safe. For the purpose of security, the cash processing apparatus 1 may function to prompting a registered identification code and/or secret code for identifying and confirming the authority of the personnel attempting to activate a cash placing operation so that the said cash placing operation is accessible only to authorized personnel. The input/output unit may permit entry of the demanded amount of cash and also the demand of denommation and number of bills to be placed in the cash safe. The cash processing apparatus 1 is responsive to said demand for the denommation and number of bills for selectively placing the appropriate funds.

The cash processing system, according to the present invention is also operative for recovering or collecting cash received in the cash safe through the cash handling apparatus 3 during services. For recovering the cash received in the cash safe 2, the cash safe is removed from the cash handling apparatus and carried to the cash is processing apparatus 1. The cash processing apparatus 1, to which the carried cash safe is installed, performs a count of the funds in the cash safe and recovers the cash therefrom. The above-mentioned operation for placing cash is subsequently performed for additional services.

FIG. 2 shows another aspect of the invention, in which an upper level administrative apparatus 4 is provided in addition to the fundamental construction of FIG. 1. The upper level administrative apparatus 4 is connected to the cash processing apparatus 1 and the cash handling apparatus 3. The upper level administrative apparatus 4 receives information concerning placing cash in the cash safe 2 and transferring the received information to the relevant cash handling apparatus 3. In such cases, the cash handling apparatus 3 may check the content of the cash safe 2 upon setting of the latter therein in view of the preliminarily received cash placing information via the upper level administrative apparatus 4 so that it may accept setting of the cash safe 2 only when the content of the cash safe 2 is coincident with the information provided from the upper administrative apparatus 4 and will reject the setting of the cash safe otherwise. When a discrepancy is found during a check in the cash handling apparatus 3, the upper level administrative apparatus 4 is responsive to the cash handling apparatus for providing instructions for a recovery process.

FIG. 3 shows a further aspect of the cash processing system according to the present invention, in which the cash safe 2 is provided with a memory 231. The memory 231 is designed for storing information concerning the cash setting condition of the cash safe 2. The information on the cash setting condition is written in the memory 231 by the cash processing apparatus 1 during the cash setting operation. On the other hand, the information in the memory 231 is read out by the cash handling apparatus 3. Therefore, without requiring a manual information entry operation, the information concerning placing cash in the cash safe 2 can be transferred to the cash handling apparatus 3.

Detailed construction of the preferred embodiment of the cash processing system according to the present invention will be discussed herebelow with reference to FIG. 4 and subsequent drawings. In the following discussion, the same or similar elements will be represented by the reference numerals throughout the disclosure.

Figure 4:
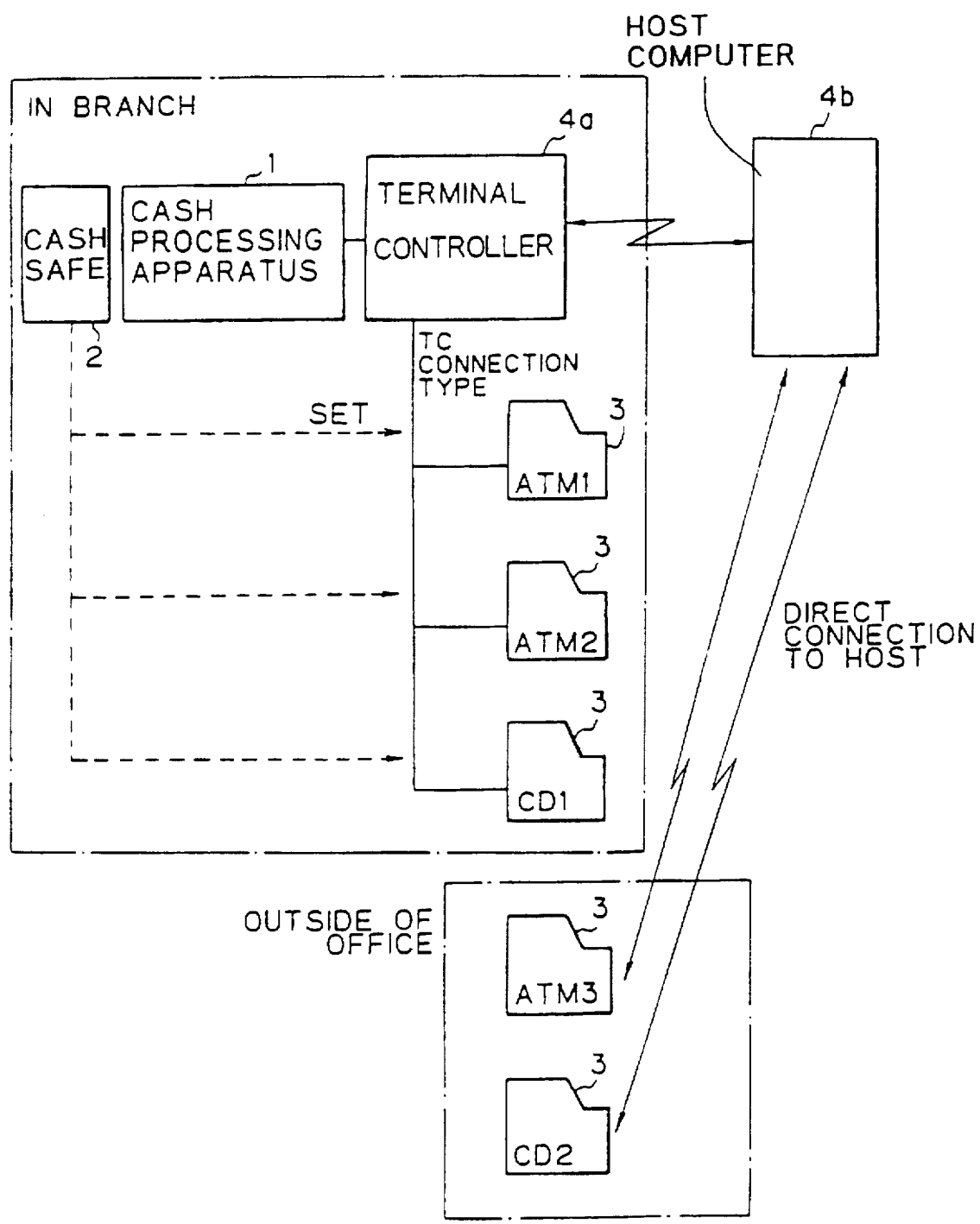
FIG. 4 is a schematic block diagram of one embodiment of the cash processing system according to the invention, showing one example of the layout of a component apparatus forming the embodiment of the cash processing system.

FIG. 4 shows overall system construction of the preferred embodiment of the cash processing system according to the present invention. The cash processing apparatus 1 comprises a cash setting and recovery apparatus (i.e., automatic cash placing and recovery unit) for setting (i.e., placing) cash in and recovering cash from the cash safe 2. The cash processing apparatus 1 is connected to a terminal controller 4a. On the other hand, the cash handling apparatus 3 comprises ATM's and cash dispensers (CD's) connected to the terminal controller 4a or a host computer 4b.

Once the cash is set in the cash safe 2 by the cash processing apparatus 1, the cash safe is carried to the cash handling apparatus 3 and installed in the cash handling apparatus for service. When service is terminated, the cash safe 2 is removed from the cash handling apparatus 3 and carried to the cash processing apparatus 1 for recovering the cash and cash count check.

Transportation of the cash safe 2 is performed by responsible indigenous personnel and also by a third party, such as security services. Complete security is thus highly required.

Figure 5B:
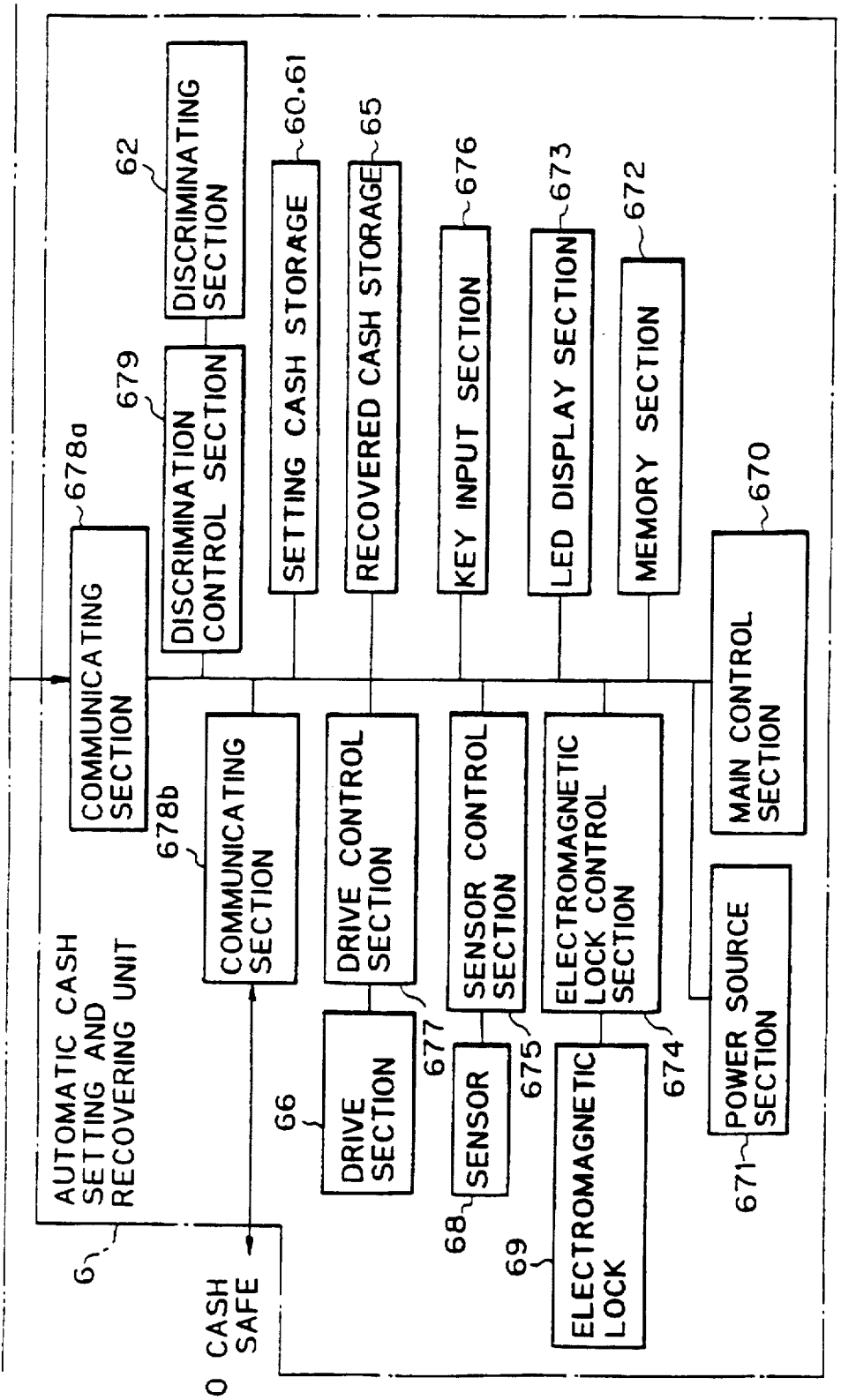
FIG. 5B is a block diagram showing an embodiment of an automatic cash setting and recovering or collecting apparatus to be employed in the shown embodiment of the cash processing system of FIG. 4.
Figure 6:
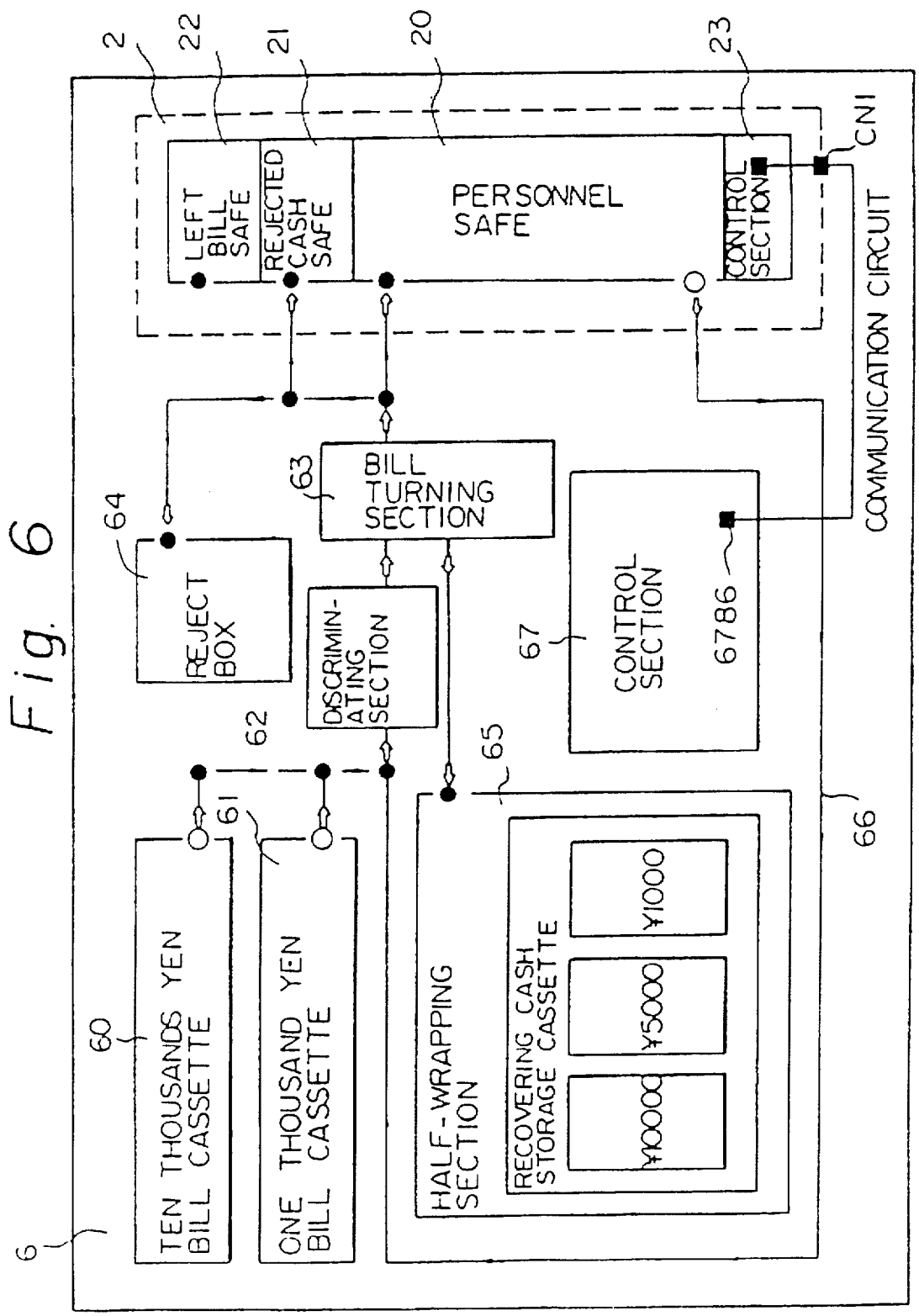
FIG. 6 is an explanatory illustration showing construction of an automatic cash setting and recovering unit in the automatic cash setting and recovering apparatus of FIG. 5.

FIGS. 5A and 5B are block diagrams of one embodiment of an automatic cash setting and recovering apparatus applicable for the preferred embodiment of the cash processing system according to the invention. FIG. 6 shows physical construction of the automatic cash setting and recovering unit.

As shown in FIGS. 5A and 5B, the automatic cash setting and recovering apparatus comprises a personnel accessible input and output unit or managing unit 5 and an automatic cash setting and recovering unit 6.

The personnel accessible input and output unit 5 includes a card reader 50, a card reader control section 51, a keyboard 52, a printer 53, a main system control section 54, a display section 55, and a secondary or large capacity memory device 56, such as hard disk drive and so forth. The personnel accessible input and output unit 5 is connectable with an adapter 57. The card reader 50 accepts the identification (ID) card of responsible personnel and reads the information stored therein. The card reader control section 51 controls the operation of the card reader 50. The keyboard 52 is accessible by personnel for entry of a P.I.N. (Personal Identification Number) and for selection of a desired process to be performed. The painter 53 is used for printing slips and so forth. The main system control section 54 is connected to the terminal controller 4a and performs a control for the peripheral components including the card reader control section 51, the printer 53 and display 55. The display 55 as controlled by the main system control section 54, displays various information. The secondary memory device 56 stores various data and so forth. The adapter 57 includes communicating sections 571 and 572 and a main control section 570 for communication between the input and output unit 5 and the cash safe 2.

On the other hand, the automatic cash setting and recovering unit 6 includes a ten thousand yen bill feeding cassette 60 for setting ten thousand yen bills, a thousand yen bill feeding cassette 61 for setting one thousand yen bills, a bill discriminating section 62 for discriminating bills, a bill turning section 63 for turning the discriminated bills so that the bills are arranged in relation to their surface sides, a reject box 64 for storing bills that are determined to be defective, a half-wrapping device 65 for half-wrapping and storing recovered bills, a bill drive section 66 for transferring the bills, a control section 67 for controlling the components set forth above, and an optical connector CN1 for electrically connecting the cash safe 2 and the control section 67, as shown in FIG. 6. It should be noted, in FIG. 6, black dots in the drive section 66 represent gates and white dots in the drive section 66 represent feed rollers.

As shown in FIG. 5B, the control section 67 of the automatic cash setting and recovering unit 6 includes a main control section 670, a power source section 671, a memory section 672, an LED display section 673, an electromagnetic lock control section 674 for controlling electromagnetic lock 69 of the automatic cash setting and a recovering unit 6, a sensor control section 675 for controlling sensors 68 provided in the drive section 66 and so forth, a key input section 676, a drive control section 677 for controlling the drive section 66, a communicating section 678a for communication with the main system control section 54 of the personnel accessible input and output unit 5, a communicating section 678b for communication with the cash safe 2, and a discrimination control section 679 for controlling the discriminating section 62.

As shown in FIG. 6, the cash safe 2 includes a personnel safe 20 for storing cash, a rejected bill safe 21 for storing the rejected bills, a left cash storage safe 22 for storing cash inadvertently left by the customer in the cash handling apparatus, and a control section 23, which will be discussed later.

The operation of the automatic cash setting and recovering unit 6 constructed as set forth above will be discussed herebelow. When a command for feeding cash is entered through the personnel accessible input and output unit 5, the desired bills are fed from the ten thousand yen bill cassette 60 and the one thousand yen bill cassette 61 under the control of the main control section 670. The fed bills are transferred to the discriminating section 62. The discriminating section 62 performs a discrimination operation 62 for each bill and feeds the accepted bills to the personnel safe 20 of the cash safe 2 through the bill turning section 63.

On the other hand, when cash recovery is commanded, the bills are fed from the personnel safe 20 of the cash safe 2 under the control of the main control section 670. The fed bills are discriminated by the discriminating section and fed to the half-wrapping section 65 through the bill turning section 63, except for the rejected bills. Then, the half-wrapped bills are stored in the half-wrapping section 65.

When a cash count check is commanded, the bills are fed from the personnel safe 20 of the cash safe 2 under the control of the main control section 670. The discriminating section 62 performs a discrimination operation for the fed bills to reject defective bills and feeds the accepted bills to the personnel safe 20 of the cash safe via the bill turning section 63.

Figure 7:
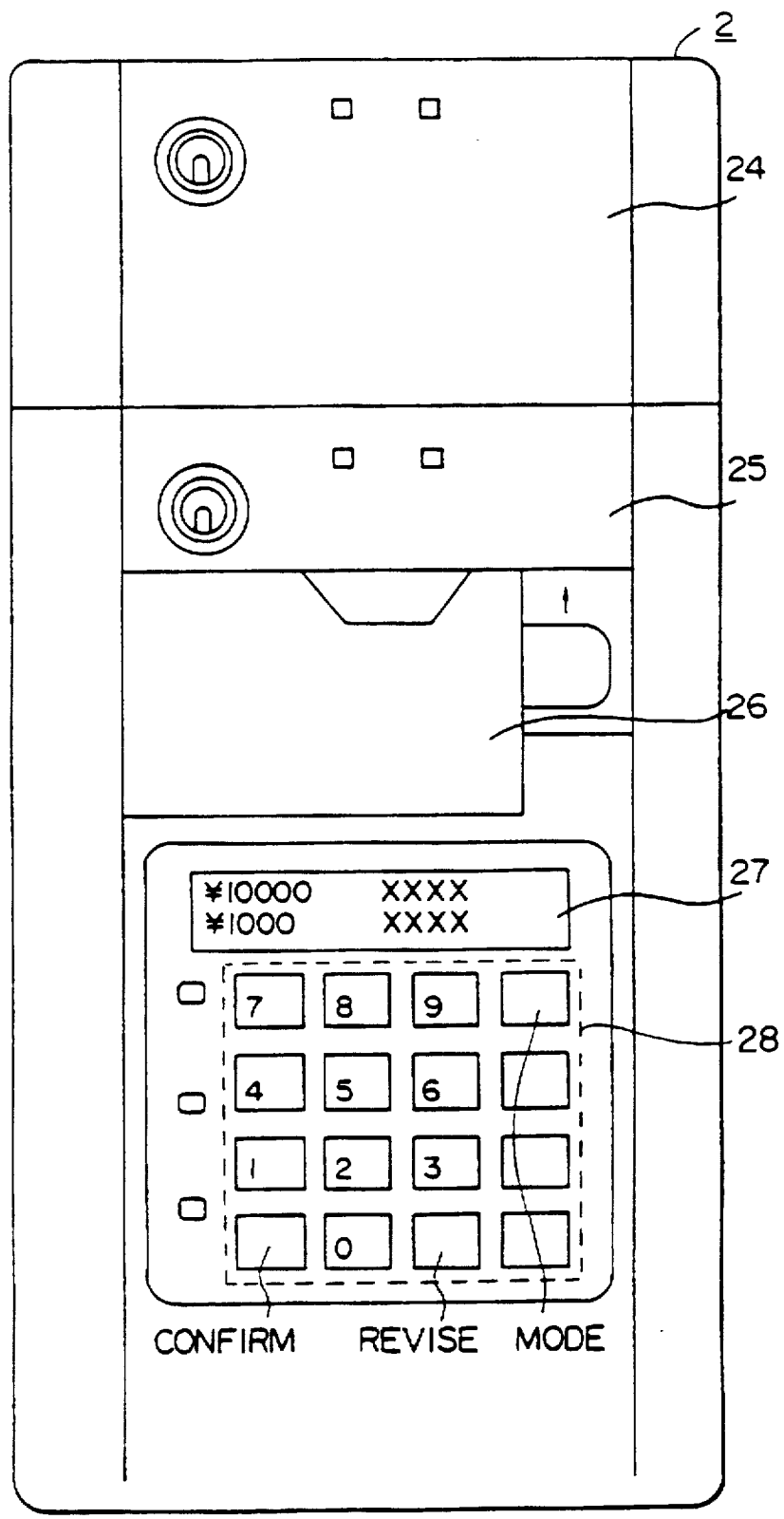
FIG. 7 is a front elevation of one example of a cash safe to be employed in the shown embodiment of the cash processing system of FIG. 4.
Figure 8:
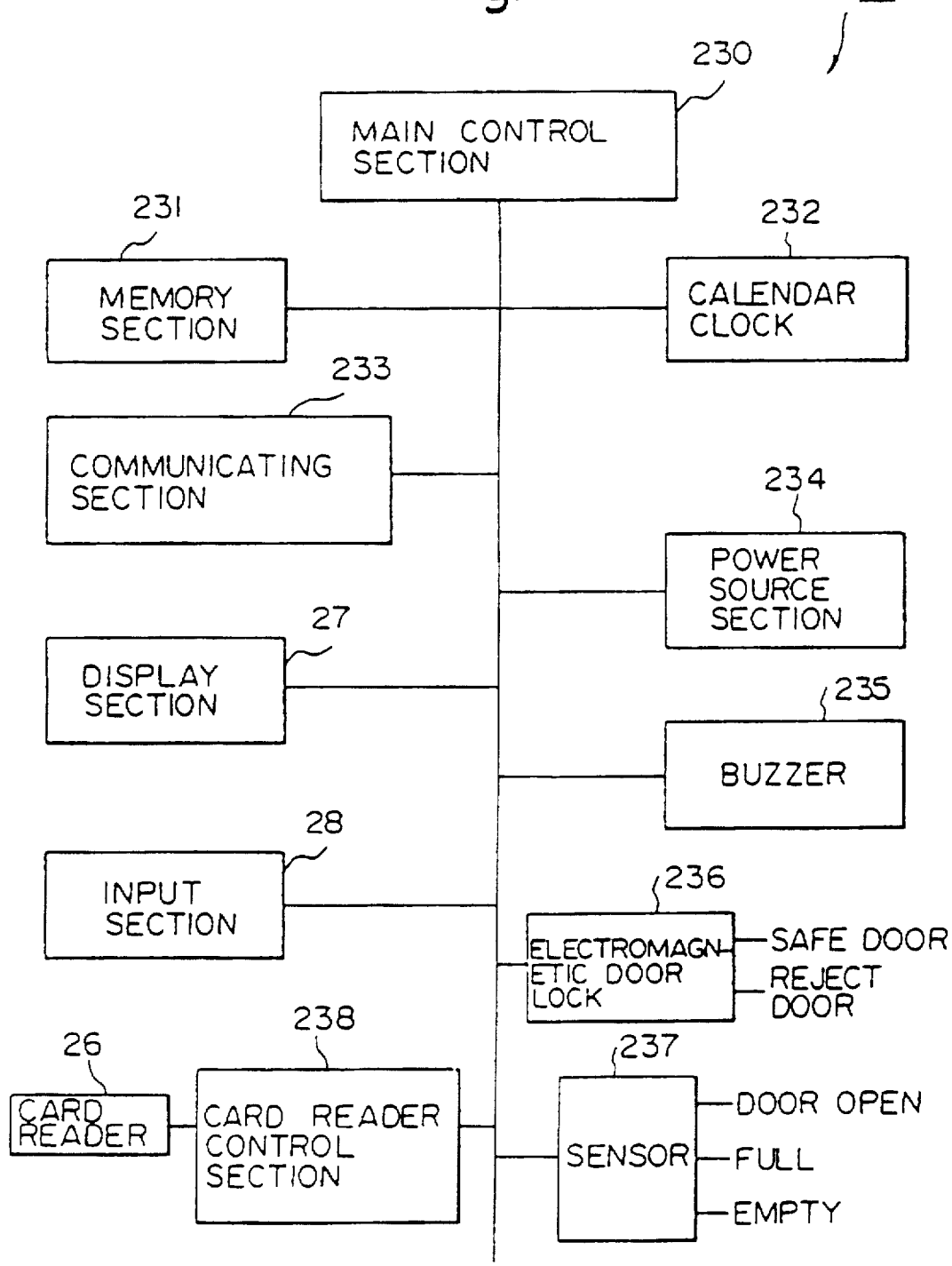
FIG. 8 is a block diagram of an example of a circuit in the cash safe of FIG. 7.

FIG. 7 shows the front elevation of one embodiment of the cash safe 2 applicable to the preferred embodiment of the cash processing system according to the invention. FIG. 8 is a block diagram of the circuit of the cash safe 2. As shown in FIG. 7, the cash safe 2 includes a reject door 24 for the rejected bill safe 21, a safe door 25 for the personnel safe 20, the card reader 26 for reading information from the personnel identification card, a display section 27 and a key input section 28. These components are arranged on the front face of the cash safe 2.

As shown in FIG. 8, the control section 23 of the cash safe 2 includes a main control section 230, a memory section 231 for storing safe information, such as available ATMID and so forth, a clock 232, a communicating section 233 for communication with the automatic cash setting and recovering unit 6 or with the cash handling apparatus 3, a power source section 234, a buzzer 235, a door electromagnetic lock 236 for locking the safe door 25 and a reject door 24, a sensor detecting section 237 for detecting the opening of the safe door 25 and the reject door 24 and the cash availability condition of the personnel safe 20, and a card reader control section 238 for controlling the card reader 26.

Figure 9:
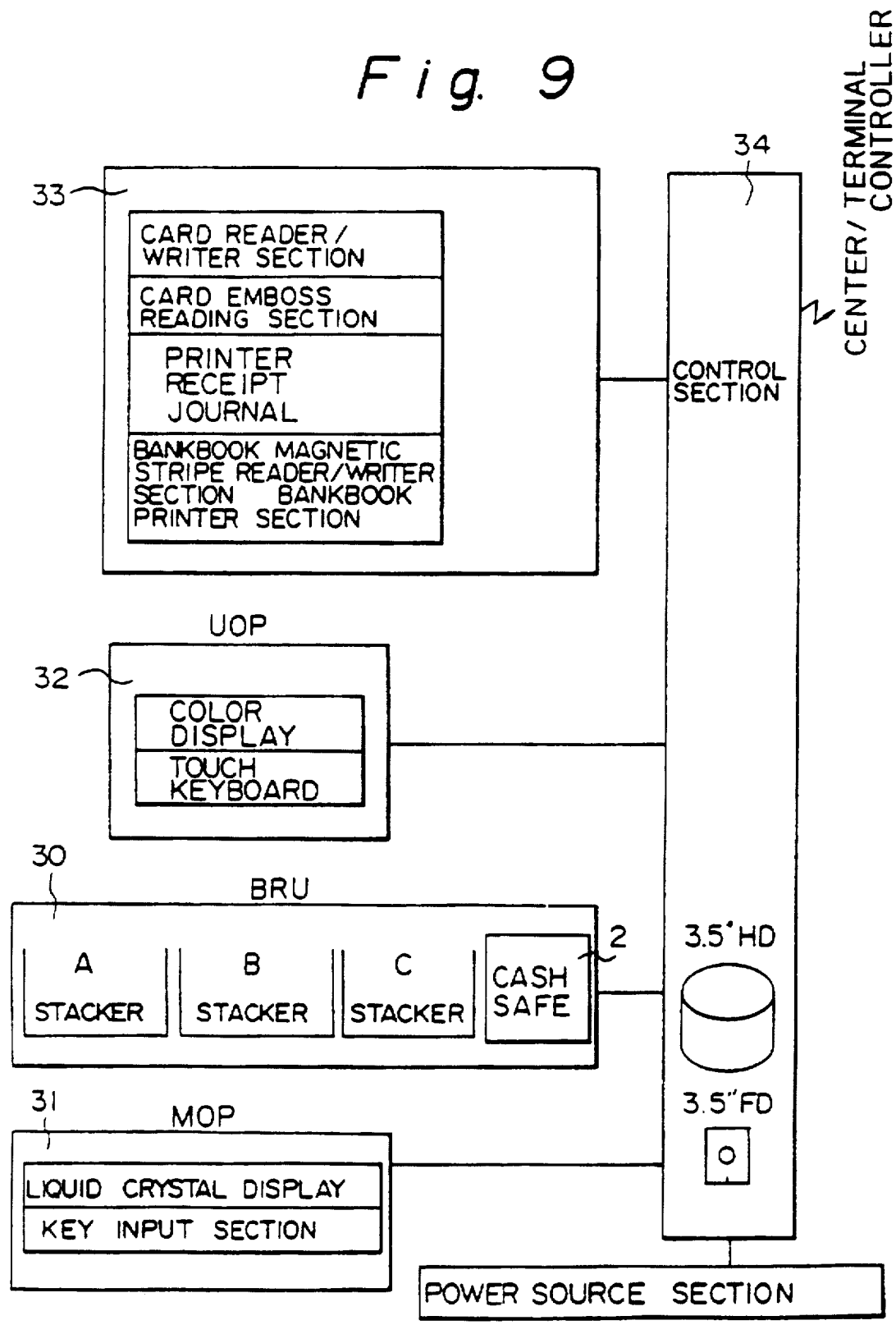
FIG. 9 is a block diagram of one embodiment of an automatic teller machine (ATM) employed in the shown embodiment of the cash processing system of FIG. 4.
Figure 10:
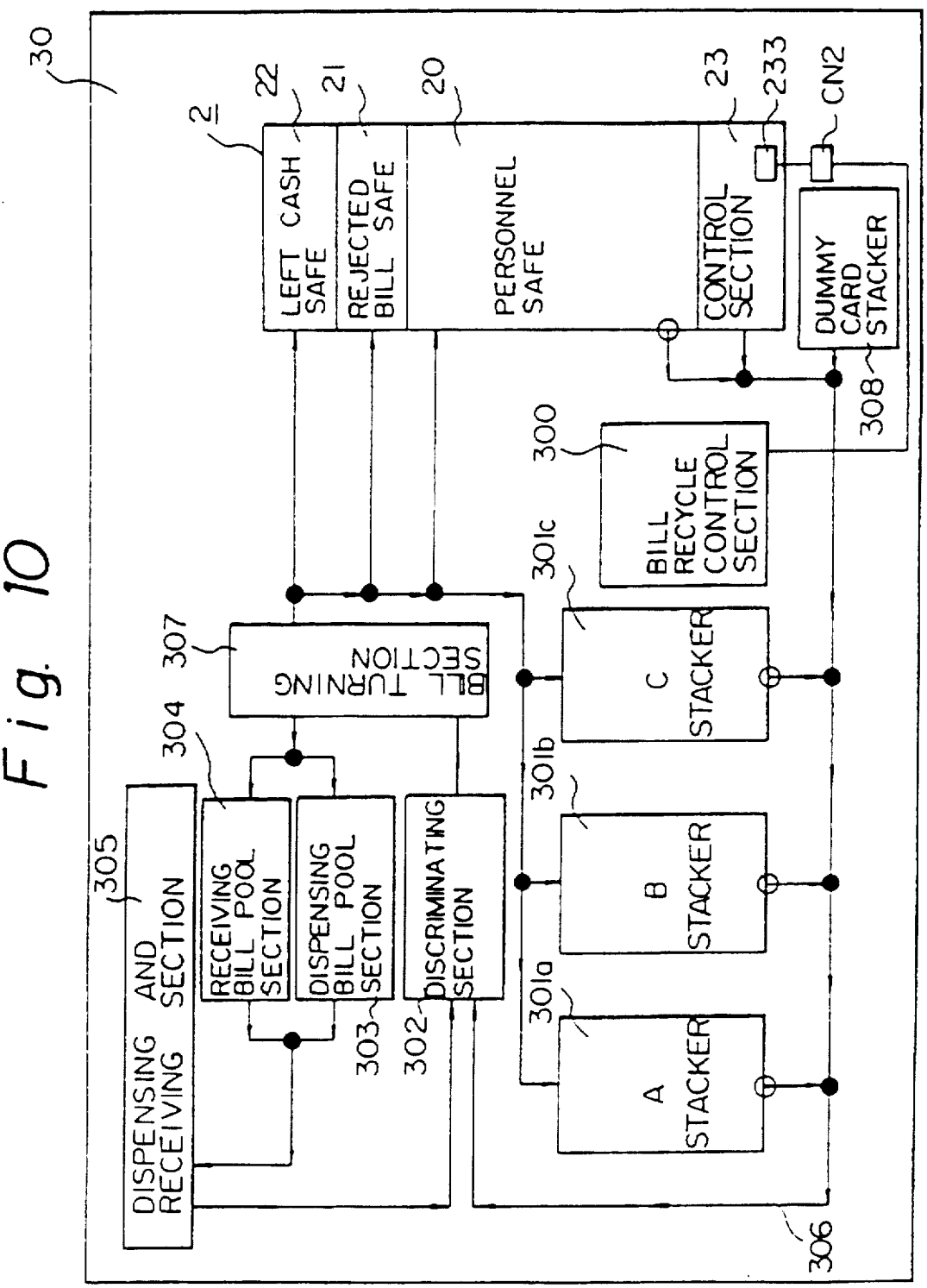
FIG. 10 is a block diagram of one embodiment of a bill or paper money recycling unit employed in the shown embodiment of the cash processing system of FIG. 4.

FIG. 9 shows construction of one embodiment of the ATM applicable to the preferred embodiment of the cash processing system according to the invention. FIG. 10 shows one embodiment of a bill recycle unit to be employed in the preferred embodiment of the cash processing system of the invention.

In FIG. 9, the reference numeral 30 denotes a bill recycle unit (BRU), which will be discussed later with reference to FIG. 10. 31 denotes a maintenance operation section that includes a liquid crystal display for displaying machine condition, and a key input section for a manual entry operation, and 32 denotes a reader/writer section including a reader/writer for reading from and writing in information on a card of the customer, an emboss reader for reading embossed information on the card of the customer, a printer for printing receipt/journal, a stripe reader/writer for reading from and writing in magnetic strips on a bankbook of the customer, and a bankbook printer. The reference numeral 33 denotes a customer accessible operating section that includes a color display for displaying operation guidance for the customer and so forth, a touch keyboard for entry of a customer's P.I.N., kinds of services, amounts on services and so forth, 34 denotes a system control section connected to a computer center (or the terminal controller) for controlling the operations of the bill recycle unit 30, the maintenance operation section 31, the reader/writer section 32 and the customer accessible operating section 33.

Since the operation of ATM is Per se well known in the art, a detailed explanation of the operation is not necessary for understanding the present invention. Therefore, an explanation of the operation of an ATM is omitted.

As shown in FIG. 10, the bill recycle unit 30 includes a cash stacker 301a for ten thousand yen bills a cash stacker 301b for five thousand yen bills and a cash stacker 301c for one thousand yen bills, to which the bills are supplied from the personnel safe 20 of the cash safe. The bill recycle unit 30 also includes a bill discriminating section 302, a dispensing cash pool section 303, which temporarily stores dispensing cash, a receiving cash pool 304 for storing returned cash, a cash withdrawing and inserting section 305 serving as a cash inlet and outlet, a cash transferring section 306, a bill turning section 307 for turning bills and arranging stacks of bills by directing surface sides, a dummy card stacker 308 for issuing a dummy card and a bill recycle control section 300 for controlling the above-mentioned components. The bill recycle unit 30 further includes an optical connector CN2 for communication between the communicating section 233 of the control section 23 of the cash safe and the control section 300. It should be noted that, in the transferring section 306, the black dots represent gates and white dots represent feed rollers.

In the operation of the bill recycle unit 30, the bills are fed out from the personnel safe 20 of the cash safe 2 and transferred to the discriminating section 302 through the transferring section 306. After discrimination in the discriminating section 302, the bills are stacked in respective cash stackers 301, 301b and 301c depending upon the denomination thereof. The rejected bills are temporarily stored in the receiving cash pool 304 and subsequently ejected to the withdrawing and inserting section 305.

Figure 11B:
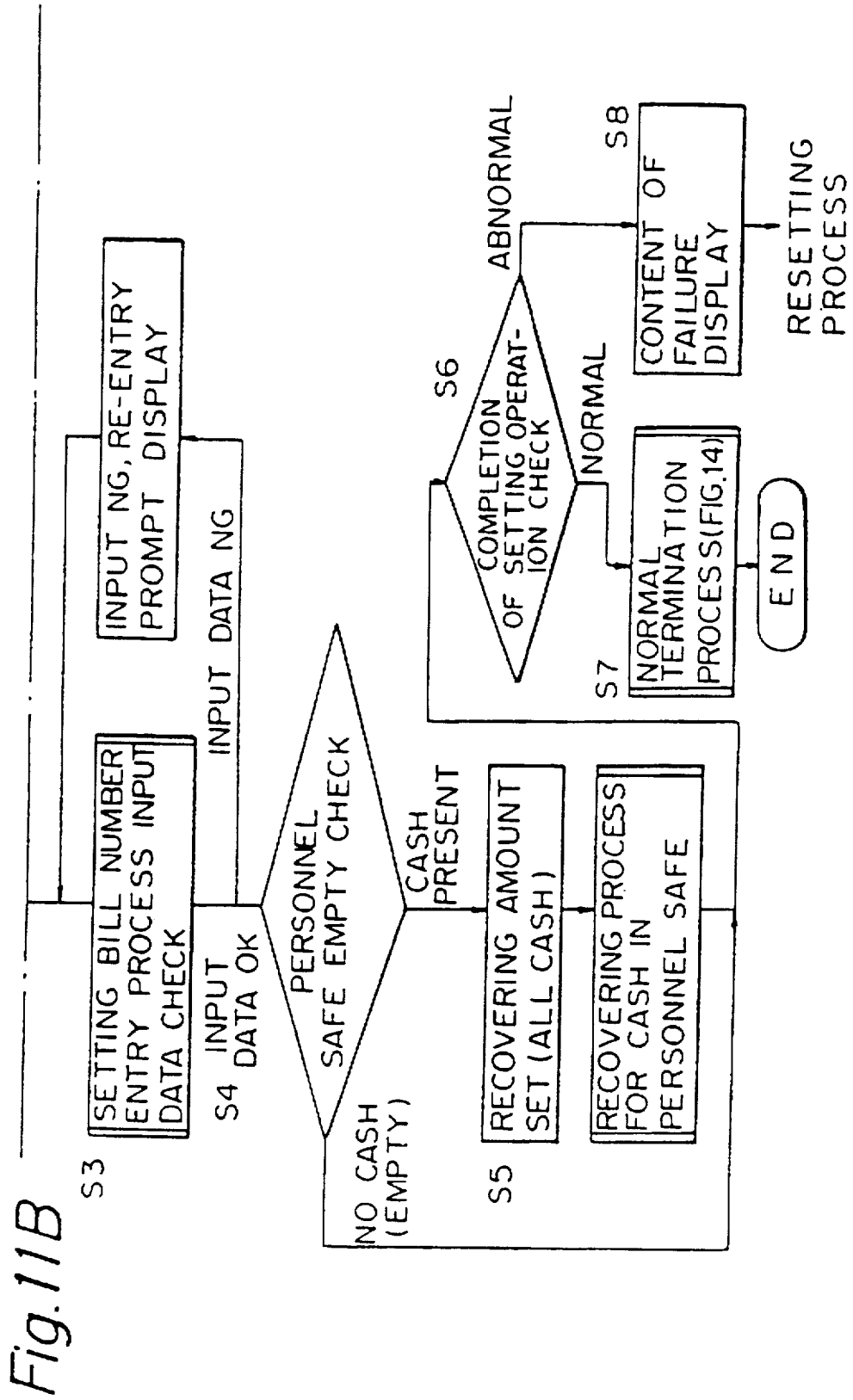
Figure 13:
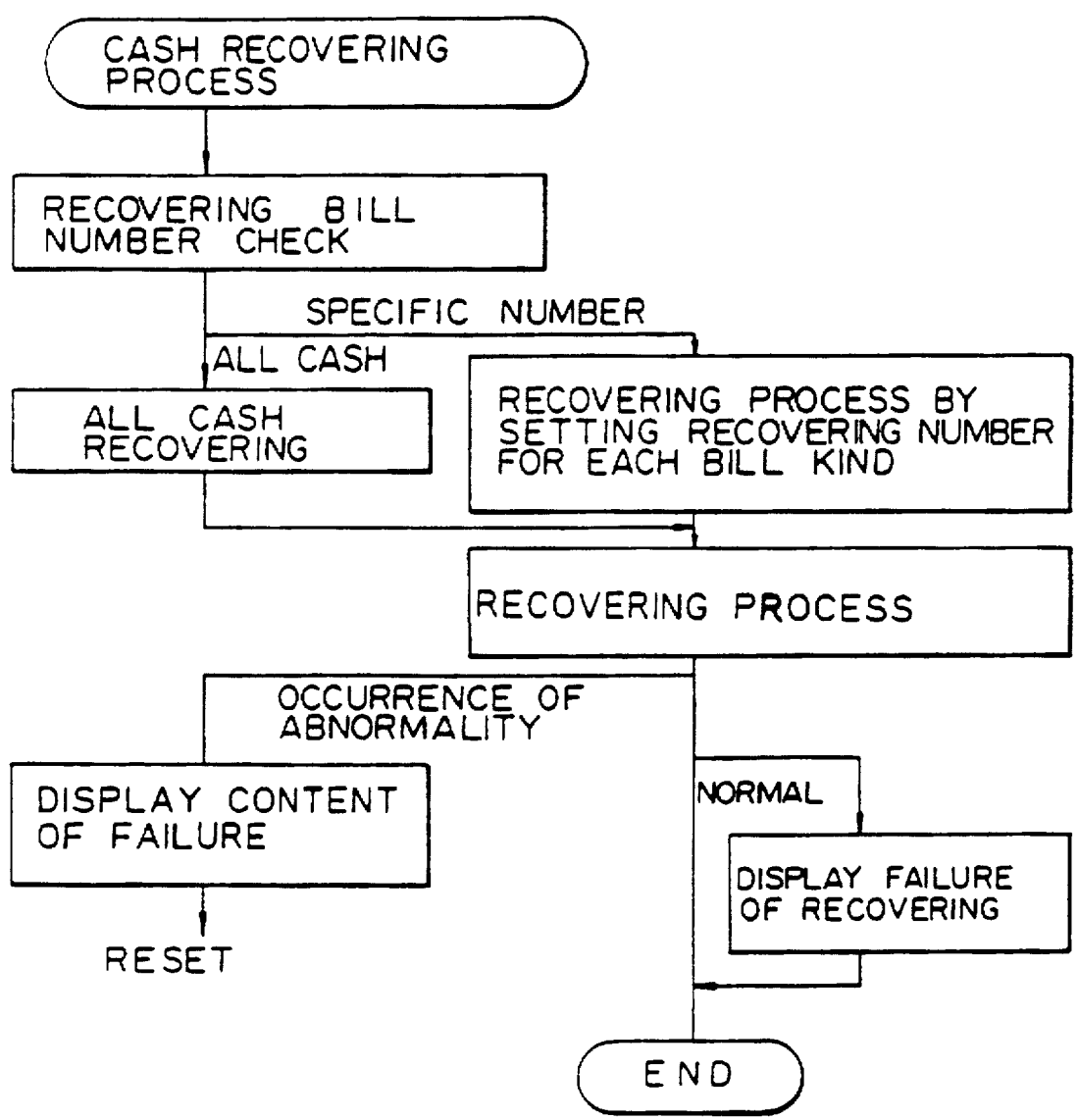
FIG. 13 is a flowchart showing one embodiment of a process for cash recovery to be performed in the shown embodiment of the cash processing system of FIG. 4.
Figure 14:
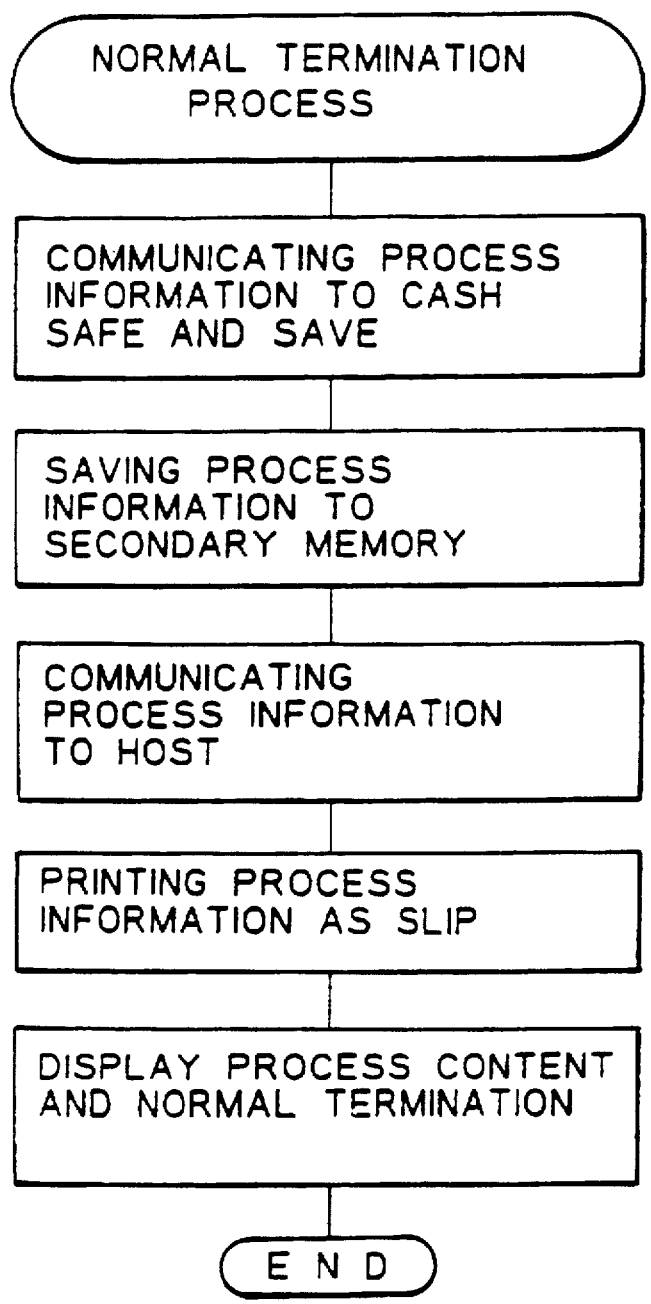
FIG. 14 is a flowchart showing one embodiment of a process for normal termination of processes in the shown embodiment of the cash processing system of FIG. 4.

Operation of the above-mentioned construction of the preferred embodiment of the cash processing system according to the invention will be discussed herebelow with reference to FIGS. 11 to 17. FIG. 11 is a flowchart of one embodiment of a processing for cash setting, cash recovery and cash count checking processes to be performed in the shown embodiment of the cash processing system, FIG. 12 is a flowchart of one embodiment of a process for cash placing in a personnel safe to be performed in the shown embodiment of the cash processing system, FIG. 13 is a flowchart showing one embodiment of a process for cash recovery to be performed in the shown embodiment of the cash processing system, FIG. 14 is a flowchart showing one embodiment of a process for normal termination of processes in the shown embodiment of the cash processing system, FIG. 15 is an explanatory illustration showing one embodiment of a procedure for entering input for selecting process, FIG. 16 is an explanatory and simplified illustration showing one example of placing cash, and FIG. 17 is an illustration showing a receipt to be issued during a process in the cash processing system.

In the process of FIG. 11, responsible personnel insert the personnel card storing personnel identification (ID) code, P.I.N. and so forth to the card reader 50 and enter the P.I.N. through the keyboard 52 in the initial processes S1 of cash placing, recovery and cash count checking. To facilitate the above-mentioned initial process, operational guidance as illustrated in FIG. 15 is displayed on the display section 55 of the personnel accessible input and output unit 5. The main system control section 54 checks the read content of the personnel card and the P.I.N. for confirming authority of the personnel gaining access.

Figure 15:
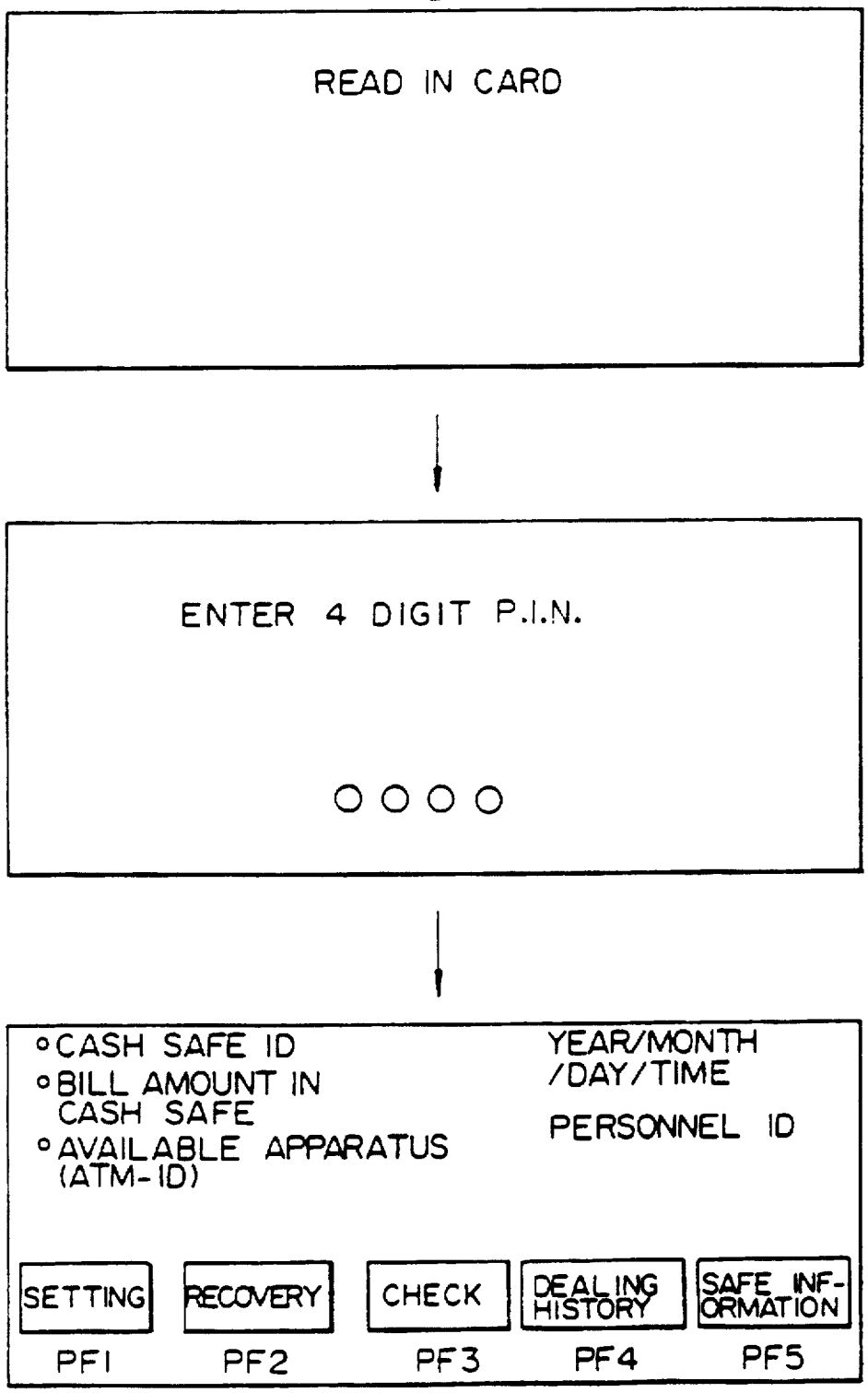
FIG. 15 is an explanatory illustration showing one embodiment of a procedure for entering input for a selecting process.
Figure 16:
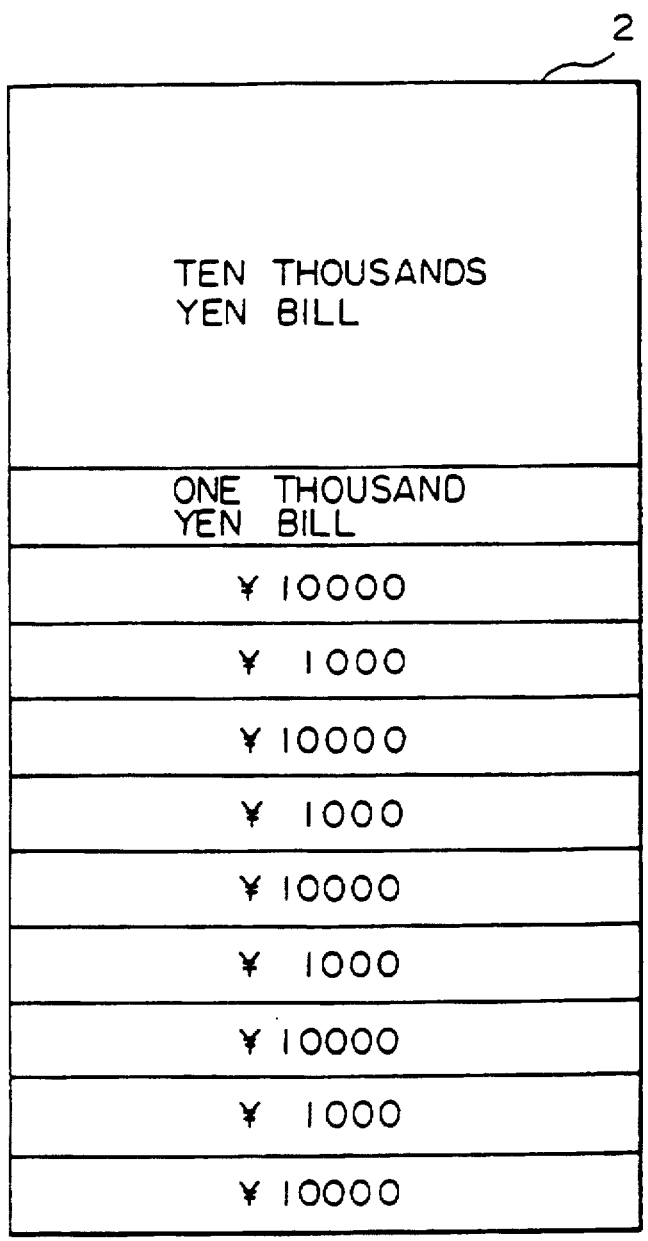
FIG. 16 is an explanatory and simplified illustration showing one example of cash placement.

When the authority of the personnel is confirmed as a result of the said check, the third. i.e. lowermost guidance of FIG. 15 is displayed on the display section 55 for prompting entry of a selection command for a desired process. Personnel then enter the personnel safe (or cash safe) identification (ID), the available cash handling apparatus (ID ATM-ID) and selection command for cash supply/recovery/check/ dealing history, or safe information.

Figure 12:
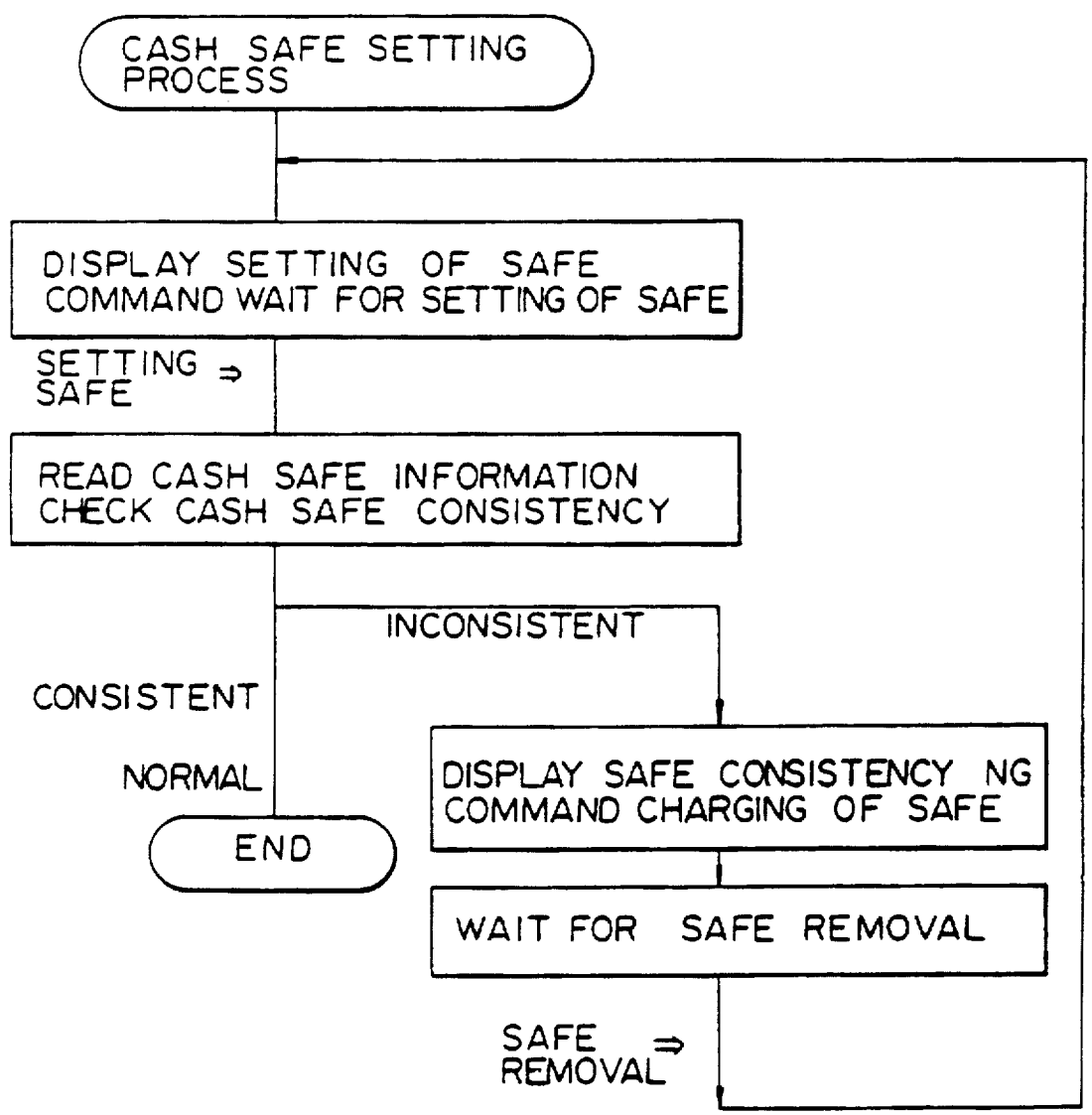
FIG. 12 is a flowchart of one embodiment of a process for cash placement to be performed in the shown embodiment of the cash processing system of FIG. 4.

At this step, if the cash supply process (entry of key PF1) is complete, the process for setting of personnel safe as shown in FIG. 12 is performed at S2 of FIG. 11. Initially, the display section 55 displays the commanded process, i.e. setting of safe. Then, the cash processing apparatus is put in stand-by status waiting for the setting of the cash safe to the automatic cash setting and recovering unit 6. The stand-by state of the cash processing apparatus is maintained until the cash safe 2 is set in the automatic cash setting and recovering unit 6. The main control section 670 of the automatic cash setting and recovering unit 6 monitors the state with the output of the sensor 68. Once the safe 2 is set in the automatic cash setting and recovering unit 6, the main control section 670 is responsive to the output of the sensor 68 to read out the safe information, e.g. cash safe ID and so forth, stored in the memory section 231 of the cash safe through the communication section 678b. The read out safe information is transferred to the main system control section 54 of the personnel accessible input and output unit 5 to check if the cash safe ID read from the cash safe is coincident with that entered by the personnel.

When the cash safe ID's are coincident with each other, the process goes to END, and otherwise un-matching of the cash safe is displayed on the display section 55 requiring the cash safe to be set in the automatic cash setting and recovery unit 6. Then, the cash processing apparatus is put on stand-by status to wait for the removal of the unmatched safe. When the main control section 670 of the automatic cash setting and recovering unit 6 detects removal of the unmatched cash safe through the output of the sensor 68, the main system control system 54 of the personnel accessible input and output unit 5 again displays the demand for setting the cash safe on the display section 55. Then, the cash processing apparatus 1 is put on stand-by status.

When matching of the cash safe ID's is confirmed through the process of FIG. 12, the main system control section 54 of the personnel accessible input and output unit 5 informs the personnel entry of the number of bills to be supplied at S3 of FIG. 11. Then, the personnel enters the necessary number of bills through the keyboard 52. In response to entry of the number of the bills, the main system control section 54 of the personnel accessible input and output unit 5 performs a check for the total number of the demanded number of bills to be supplied against the known capacity of the personnel safe 20, and thus for the input data at S4 of FIG. 11. When the demanded number of bills is in excess of the capacity of the personnel safe 20, the input data is rendered no good (NG) and then input error is displayed on the display section 55 requiring re-entry of the demanded number of bills to be supplied.

When entry of the input data is completed, the main control section 670 of the automatic cash setting and recovering unit 6 checks with the control section 23 of the cash safe 2 whether the cash safe 2 is empty or not. When the control section 23 of the cash safe detects that the personnel safe is empty, the process goes directly to S6 of FIG. 11. On the other hand, when the personnel safe 20 is not empty, the process is advanced to S5 of FIG. 11.

At S5 of FIG. 11, when cash is left in the personnel safe 20, the main system control section 54 displays the available number of bills for recovery and then prompts to the personnel to enter the number of bills to be recovered.

In response to entry of the number of bills to be recovered, the main control section 670 of the automatic cash setting and recovering unit 6 enters the cash recovery process of FIG. 13.

Namely, the main control section 670 checks the demanded number of bills to be recovered. When the recovery of all bills is demanded, bills are fed out from the personnel safe 20 to the discriminating section 62 for discrimination and stores the bills in the half-wrapping section 65. This process is repeated until the personnel safe 20 becomes empty so that all cash in the personnel safe can be recovered.

On the other hand, when the number of bills to be recovered is specified, the bills are fed out from the personnel safe 20 of the cash safe 2 so that the demanded number of different denomination of bills can be collected. The fed out bills are fed to the discriminating section for discrimination and then stored in the half-wrapping section 65. This process is repeated until the number of bills recovered reaches the demanded specific number.

The main system control section 54 of the personnel accessible input and output unit 5 checks termination of the cash recovering process of the main control section 670 of the automatic cash setting and recovering unit 6. When failure is detected, then the fact is displayed on the display section 55, and then process is transferred to a resetting process. When the recovered number of bills does not reach the demanded number, display on the display section 55 indicates that the recovery has failed and the process is terminated. On the other hand, when recovery process is successful, the process is terminated directly.

At S6 of FIG. 11, the main control section 670 of the automatic cash setting and recovering unit 6 performs an operation for setting or supplying cash to the personnel safe 20 of the cash safe 2 in response to the command from the main system control section 54. A setting operation is performed by feeding the bills from the ten thousand bill cassette 60 and the thousand bill cassette 61 through the discriminating section 62 and then storing in the personnel safe 20 of the cash safe. At this time, as shown in FIG. 16, every one hundred of the ten thousand yen bills and the one thousand yen bills are fed alternately. This contributes to uniform feeding of a variety of bills and thus shortens the required period for setting the cash.

The main system control section 54 of the personnel accessible input and output unit 5 checks for information indicative of completion of the cash setting operation from the main control section 670 of the automatic cash setting and recovering unit 6.

At S7 of FIG. 11, when the setting of cash is successfully completed, the main system control section 54 of the personnel accessible input and output unit 5 performs edition of cash setting information, such as number of each kind of bills set in the personnel safe 20, and the ID of the automatic cash setting and recovering unit, the ID of the personnel and so forth, and writes in such cash setting information to the memory section 231 of the cash safe 2 through the automatic cash setting and recovering unit 6.

Then, the main system control section 54 of the personnel accessible input and output unit 5 performs edition for process data, such as set number of bills for each kind of bill, the ID of the cash safe, the ID of the automatic cash setting and recovering unit, processed date and time, the ID of the personnel and so forth, and writes in and saves the same in the secondary memory device 56.

Furthermore, the main system control section 54 transmits the process data to the host computer 4b so that the host computer 4b may administrate or manage the history. In addition, the main system control section 54 drives the printer 53 for preparing a print out of the process information and for issuing a receipt, as shown in FIG. 17. Then, the main system control section 54 drives the display section 55 to indicate successful termination of the demanded process and content of the completed process to terminate said process.

At S8 of FIG. 11, when a setting operation is abnormally terminated, the main system control section 54 displays the type of failure on the display section 55 and transfers the process to the resetting process.

As set forth above, automatic placing of the cash in the cash safe 2 can be performed.

Figure 18:
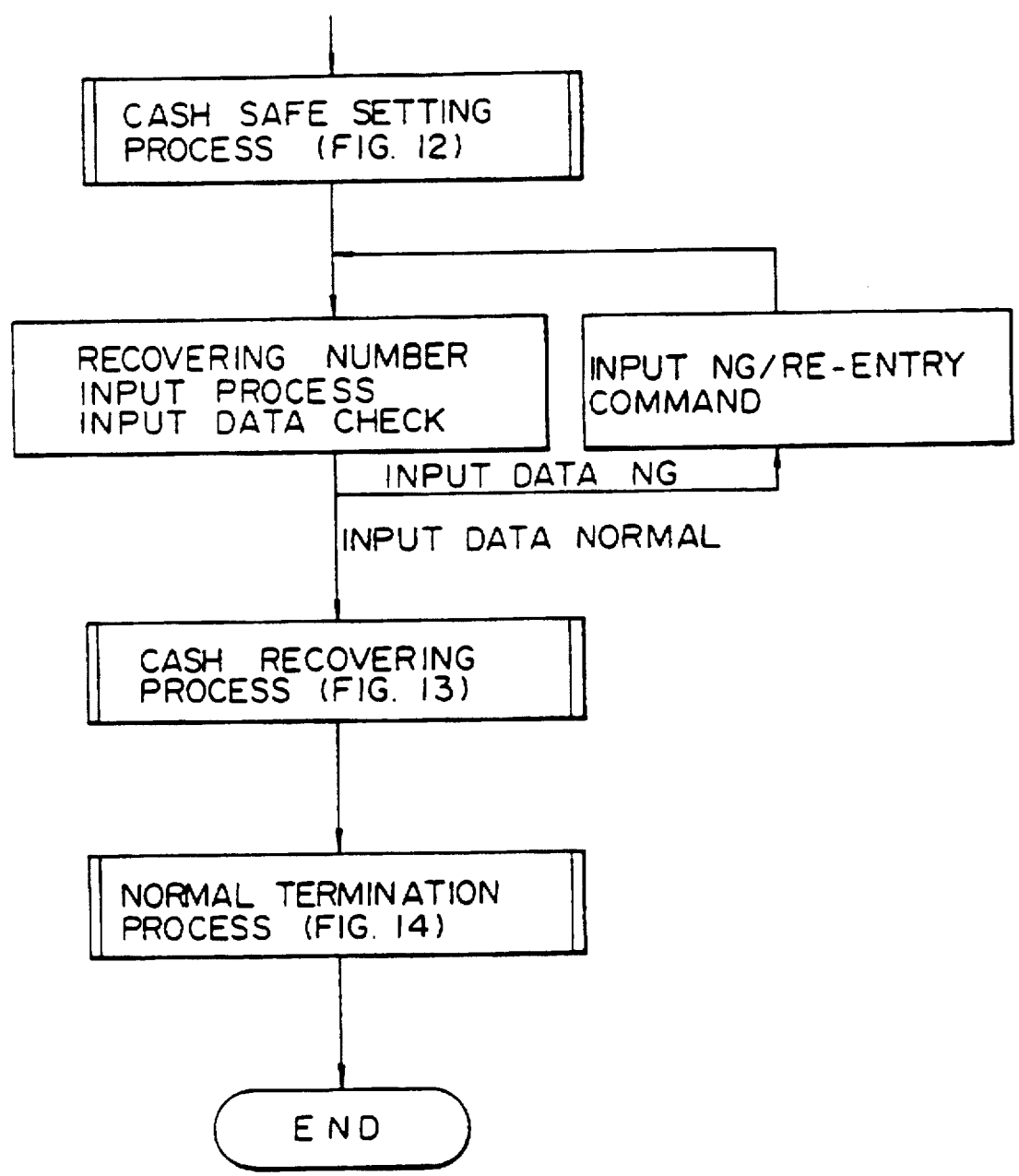
FIG. 18 is a flowchart showing one embodiment of a process for recovery of cash.
Figure 19:
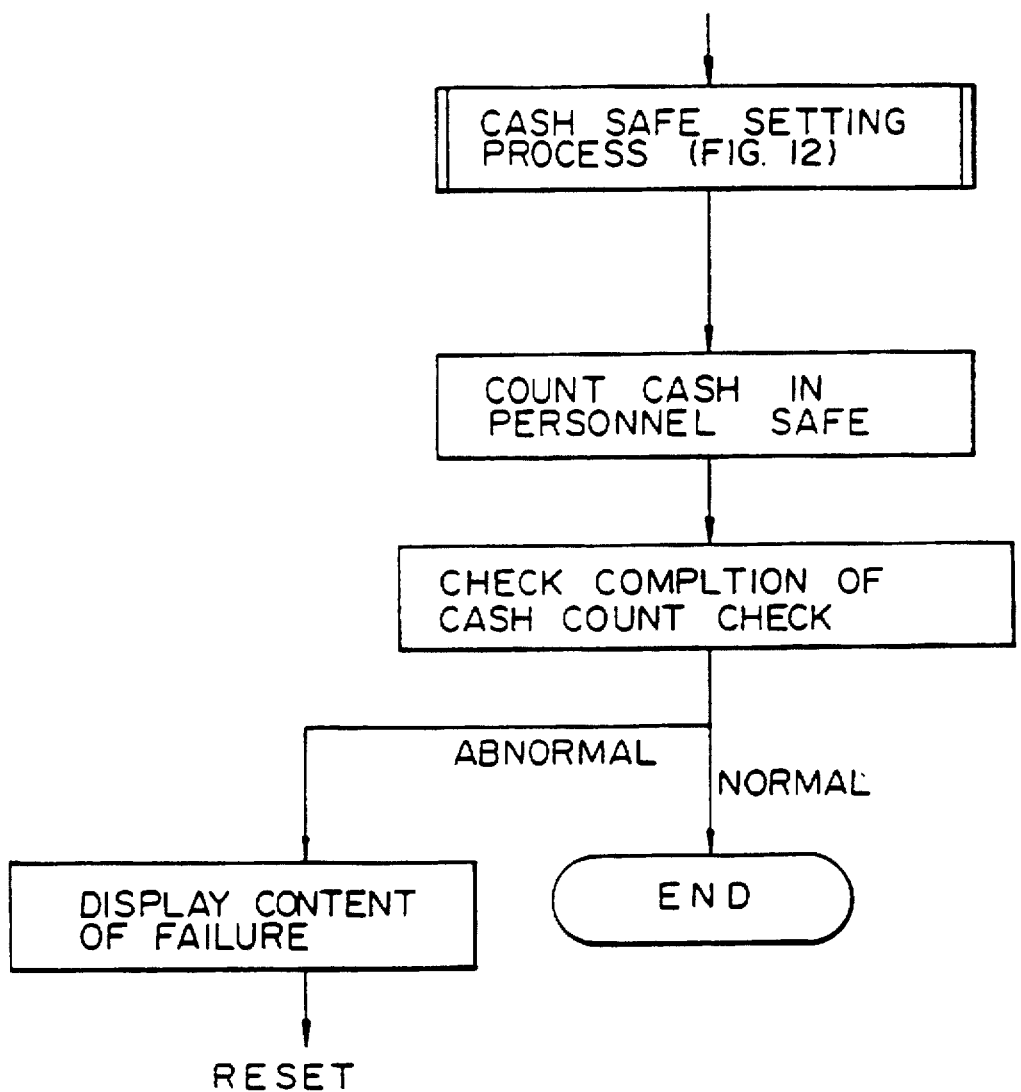
FIG. 19 is a flowchart showing one embodiment of a process for cash count checking.

FIG. 18 is a flowchart of one embodiment of a process for cash recovery and FIG. 19 is a flowchart of one embodiment of a process for cash count checking of the cash in the cash safe.

If the cash recovering process is commanded at S1 of FIG. 11, the process illustrated in FIG. 18 is performed.

Namely, the main system control section 54 of the personnel accessible input and output unit 5 initially performs the cash safe setting process of FIG. 12. Subsequently, the personnel is prompted to enter the number of bills to be recovered. In response to entry of the demanded number of bills to be recovered by the personnel through the keyboard 52, the main system control section 54 of the personnel accessible input and output unit 5 performs a check for the demanded number of bills to be recovered against the number of bills existing in the cash safe 2. When the demanded number of bills is greater than that actually in the cash safe, the entered input data is judged as NG data and then NG input data is indicated on the display section 55. In such cases, the personnel is prompted to re-enter the demanded number of bills to be recovered. When normal input data is entered, cash recovering process of FIG. 13 is performed and the subsequent normal termination process of FIG. 13 is performed. Then, the cash recovering process is terminated.

On the other hand, when cash count checking of the cash in the cash safe is commanded at S1 of FIG. 11, then the process for cash count checking of FIG. 19 is performed.

In the process of FIG. 19, the main system control section 54 of the personnel accessible input and output unit 5 initially performs the safe setting process of FIG. 12. Then, the main system control section 54 commands cash count checking for the main control section 670 of the automatic cash setting and recovering unit 6. The main control section 670 is responsive to this command for feeding the bills from the personnel safe 20 of the cash safe 2 and transferring to the discriminating section 62. After discrimination in the discriminating section 62, the bills are returned to the personnel safe 20 of the cash safe 2 through the bill turning section 63. During this process, the number of bills for each denommation is counted.

The main system control section 54 of the personnel accessible input and output unit 5 checks completion of the cash count checking process of the automatic cash setting and recovering unit 6. When failure in the cash count checking is detected, the failure is indicated on the display section 55 and the process is transferred to the resetting process. On the other hand, when the process is successful, the process is terminated directly.

Figure 20:
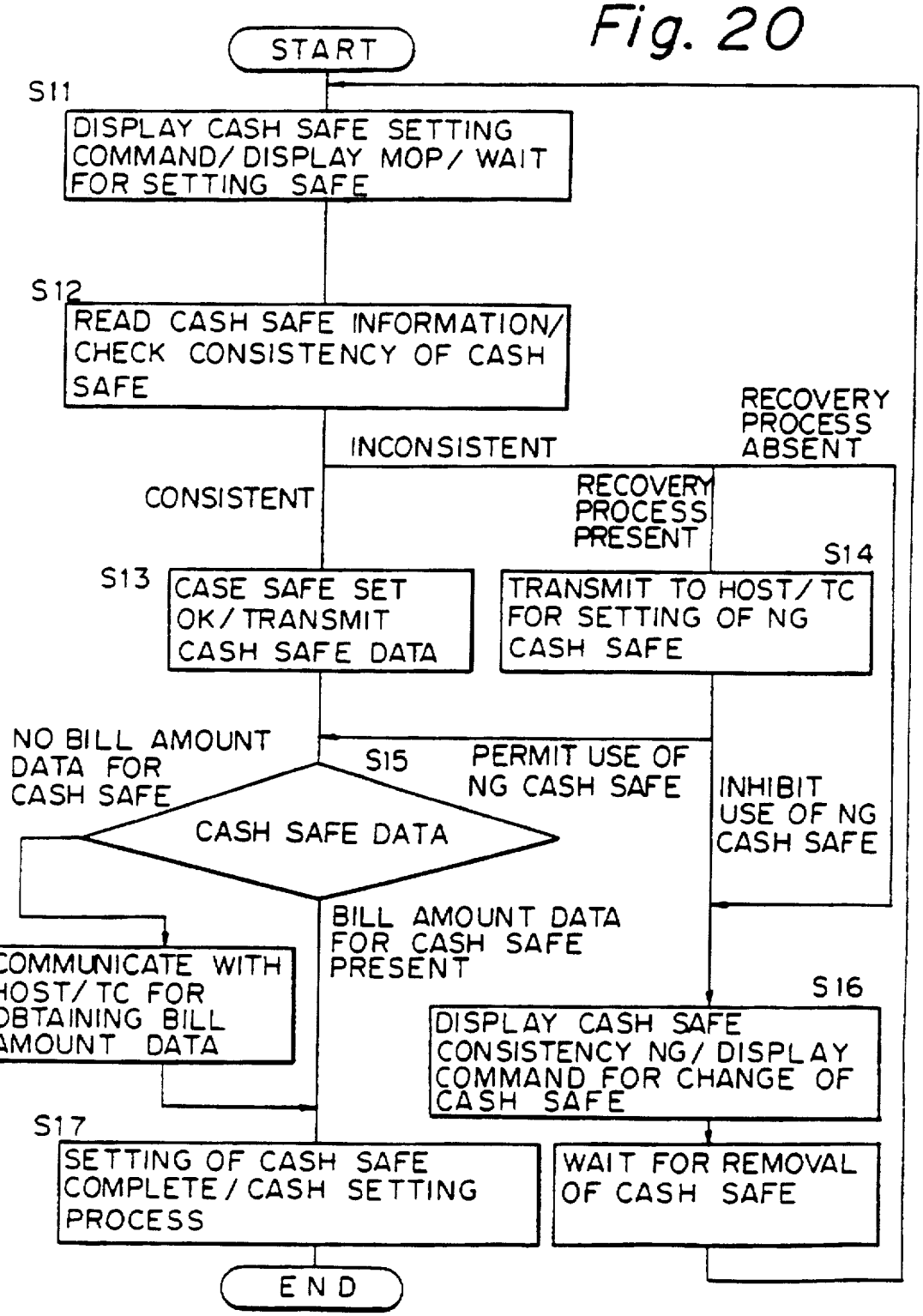
FIG. 20 is a flowchart showing one embodiment of a process for setting a safe.

FIG. 20 shows one embodiment of the process for setting the cash safe 2 for the ATM.

At S11 of FIG. 20, the control section 34 of the ATM displays a demand for setting of the cash safe 2 on the liquid crystal display of the maintenance operation section 31. Then, an ATM is placed in stand-by status wait for setting of the cash safe.

At S12, once the cash safe 2 is set in the bill recycle unit 30 of the ATM, the control section 300 detects the same and reads out information stored in the memory section 231 of the control section 23 of the cash safe 2 through the optical connector CN2. The read out information is then transferred to the control section 34.

The control section 34 is responsive to the information from the control section 300 of the bill recycle unit 30 by comparing the available machine ID contained in the read out information with the ATM-ID of itself to check if the ID's match each other. Also, the control section compares the cash safe ID in the read out information with the available cash safe ID stored in the control section 34 to check if the cash safe set therein is available for use.

At S13, when both IDs' match, the control section transmits set OK indication and process information, e.g. information about the cash safe 2, ATMID, the personnel ID performing the process, process date and time and so forth) to the terminal controller 4a or the host computer 4b so that the host computer may perform management of the history. Then, the process is advanced to S16 of FIG. 20.

On the other hand, when it is determined that the IDs' do not match each other and if there is no recovery process, the process is advanced to S14 of FIG. 20, if there is a recovery process, the control section 34 transmits information indicating mis-matching of the cash safe (case safe setting NG) and requests instructions concerning whether the set cash safe is available for use with the cash safe ID, ATM-ID and so forth from the terminal controller 4a or the host computer 4b.

The terminal controller 4a or the host computer 4b, or, in the alternative, the ATM per se determines whether the cash safe now set in an ATM can be used or not. Instructions either permitting or inhibiting use of the set cash safe are issued by the terminal controller 4a or the host computer 4b.

In case that the set cash safe 2 can be used, the control section 34 commands initiation of operation for an ATM and simultaneously the information associated with the un-matching (NG) cash safe is transmitted to the automatic cash setting and recovering unit 6 of the cash processing apparatus 1 and saves the fact that the unmatched cash safe is set and used in an ATM as historic data. Also, updating of the management information associated with the cash safe intended to be set in the ATM but actually did not, is performed in the secondary memory device 56 so that said cash safe can be used in another ATM.

At S16, the control section 34 displays cash matching NG and demand for changing the set cash safe on the liquid crystal display of the maintenance operation section 31. Then, an ATM is placed in a stand-by status to wait for the removable of the un-matching cash safe. When the control section 300 of the bill recycle unit 30 detects removal of the un-matching cash safe, the process returns to S11.

At S15, the control section 34 checks whether the information read out from the set cash safe includes data indicative of the bill number in the cash safe. When the bill number data is present, the process is advanced to S17. On the other hand, when the information read from the cash safe 2 does not contain the bill number data, the control section 34 communicates with the terminal controller 4a or the host computer 4b, or, as an alternative, with the automatic cash setting and recovering unit 6 of the cash processing apparatus 1 to obtain data indicative of the number of bills within the cash safe. After this, the process is advanced to S17.

At S17, the control section 3 performs a bill supply process in response to the completion of setting of the cash safe. Namely, in the process, the bill recycle unit 30 supplies respective kinds of bills to respective bill stackers 301a, 301b and 301c. Upon completion of supplying the stackers, the ATM is ready to provide service to the customers.

At this time, as shown in FIG. 14, since a variety of bills are set in the cash safe in an alternating fashion, each of the stackers 301a, 301b and 301c can be supplied in a substantially uniform manner. This contributes to shortening the time required to fill the stackers. This is advantageous because the ATM is ready earlier.

The present invention is not specified in the embodiment set forth above but can be implemented in an alternating fashion.

In FIG. 17, the information of the intended cash safe 2 to be set in the ATM 3 is preliminarily given to the ATM 3 through the automatic cash setting and recovering unit 6 of the cash processing apparatus 1 (or through the terminal controller 4a or the host computer 4b). When the cash safe 2 is set to the ATM 3, it becomes possible to check whether the set cash safe 2 is the intended cash safe by comparing the information read out from the cash safe 2 with the previously provided information.

In a further alternative, as shown in FIG. 1, the cash processing apparatus 1 can be designed as an off-line unit and the memory in the cash safe is not always required. Also, as shown in FIG. 2, the cash processing apparatus 1 can be designed as an on-line unit and the memory in the cash safe 2 can be neglected. Furthermore, as shown in FIG. 3, the cash processing apparatus 1 can be of off-line use and the memory in the cash safe is provided. Further variation in the arrangement of the components in practical implementation should be obvious to those skilled in the art with the teaching of the present invention.

In addition, though the forementioned detailed discussion has been given as an example, in which the cash handling apparatus comprises an ATM, the invention is equally applicable when the cash handling apparatus comprises cash dispensers.

One embodiment of the cash handling apparatus applicable to the shown embodiment of the cash processing system according to the present invention will be discussed blow with reference to FIGS. 21 to 29.

Figure 21:
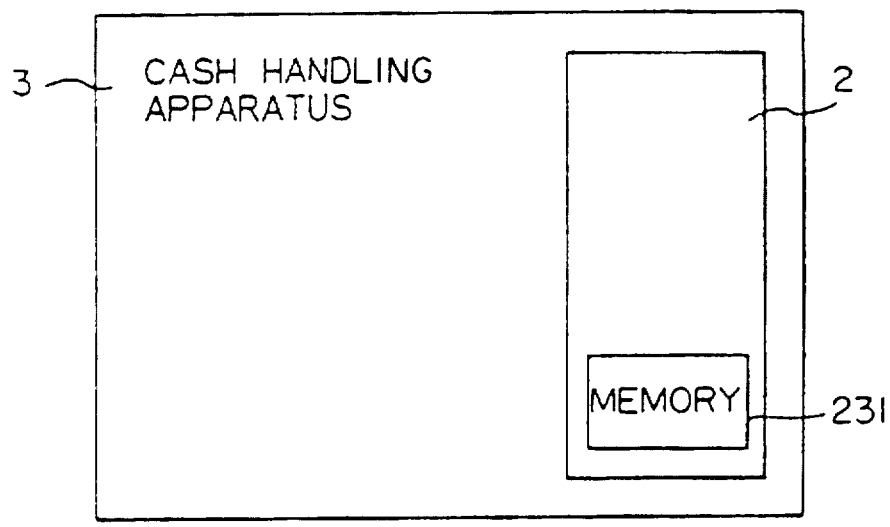
FIG. 21 is a schematic block diagram showing another embodiment of the cash handling apparatus that can be employed in the shown embodiment of the cash processing system of FIG. 4.

FIG. 21 shows a general construction of the cash handling apparatus 3 incorporated in the preferred embodiment of the cash processing system, according to the present invention. In this embodiment, the cash handling apparatus 3 includes the installed detachable cash safe 2. The cash handling apparatus 3 is designed for among other services dispensing cash. As in the former embodiment, the cash safe 2 includes a memory section 231 for storing information including the available apparatus to which the cash safe is intended to be installed. When the cash safe 2 is set in the cash handling apparatus 3, the cash handling apparatus 3 performs a check to determine whether the set cash safe 2 is available for use or not. Depending upon the result of the check, the cash handling apparatus 3 permits or inhibits the use of the set cash safe.

Figure 22:
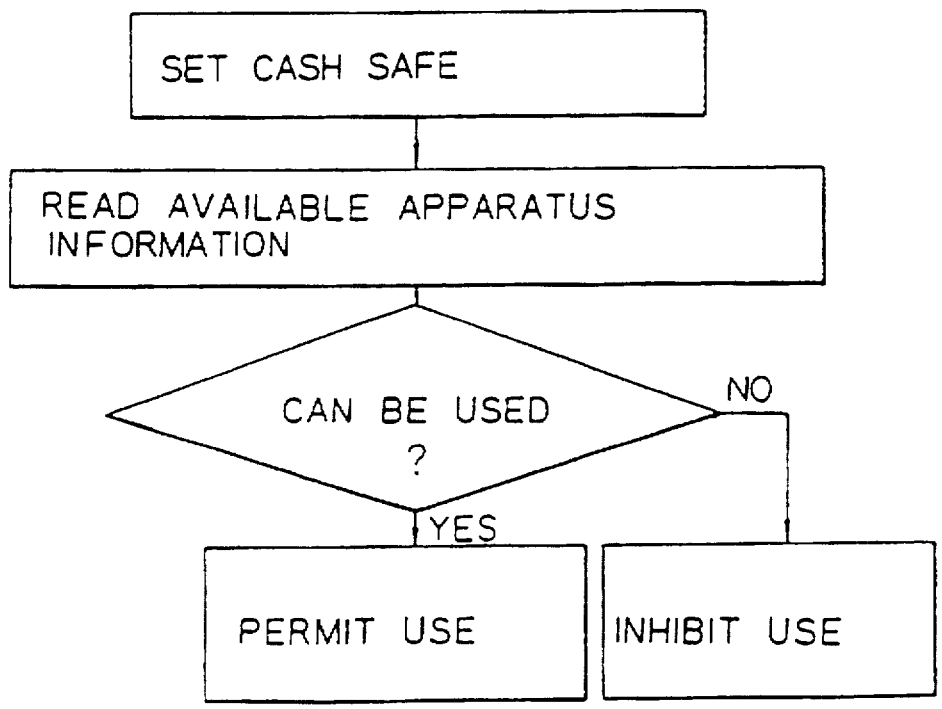
FIG. 22 is a flowchart showing one embodiment of a process for cash placement to be performed in the cash handling apparatus of FIG. 21.

Namely, as shown in FIG. 22, the information concerning the available apparatus in the memory section 231 of the cash safe 2 is read out by the cash handling apparatus 3 upon setting of the cash safe therein. Then, the cash handling apparatus 3 determines whether the set cash safe is available for use. If so, use of the cash safe 2 for services is permitted, and use otherwise is inhibited.

Figure 23:
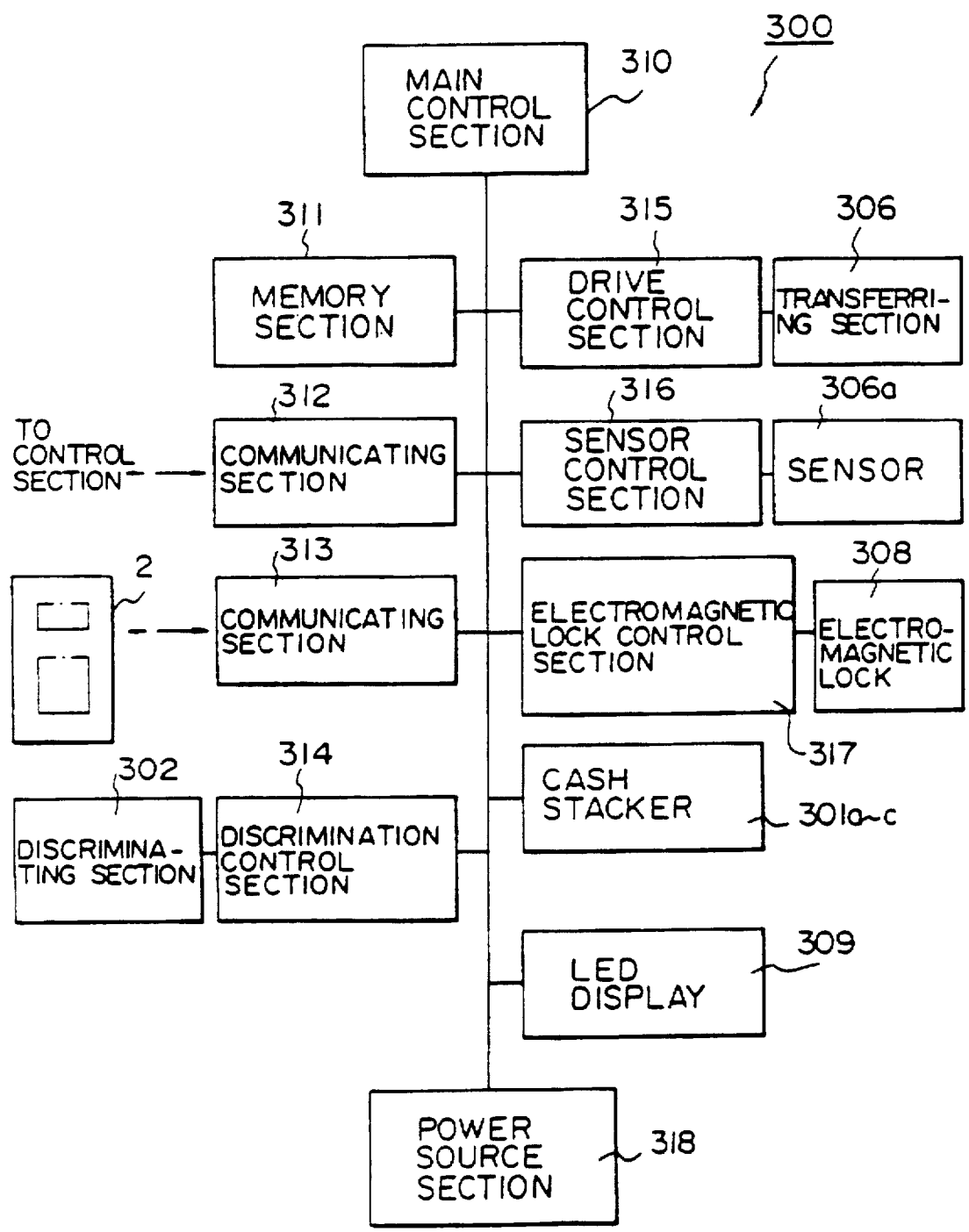
FIG. 23 is a block diagram showing another embodiment of a bill recycling unit to be employed in the cash handling apparatus of FIG. 21.

In the shown embodiment, as shown in FIG. 23, the cash handling apparatus 3 includes a unit control section 300. The unit control section 300 includes a main control section 310, a memory section 311, a communicating section 312 for communication with the main control section 34 of the cash handling apparatus 3, a communicating section 313 for communication with the communicating section 233 of the control section 23 of the cash safe 2, a discrimination control section 314 for controlling the operation of the discriminating section 302, a drive control section 315 for controlling the operation of the transferring section 306, a sensor control section 316 for controlling sensors 306a in the transferring section 306 and so forth, an electromagnetic lock control section 317 for controlling lock of said electromagnetic lock 308 in the bill recycle unit 30, a LED display section 309 and a power source section 318.

Figure 24:
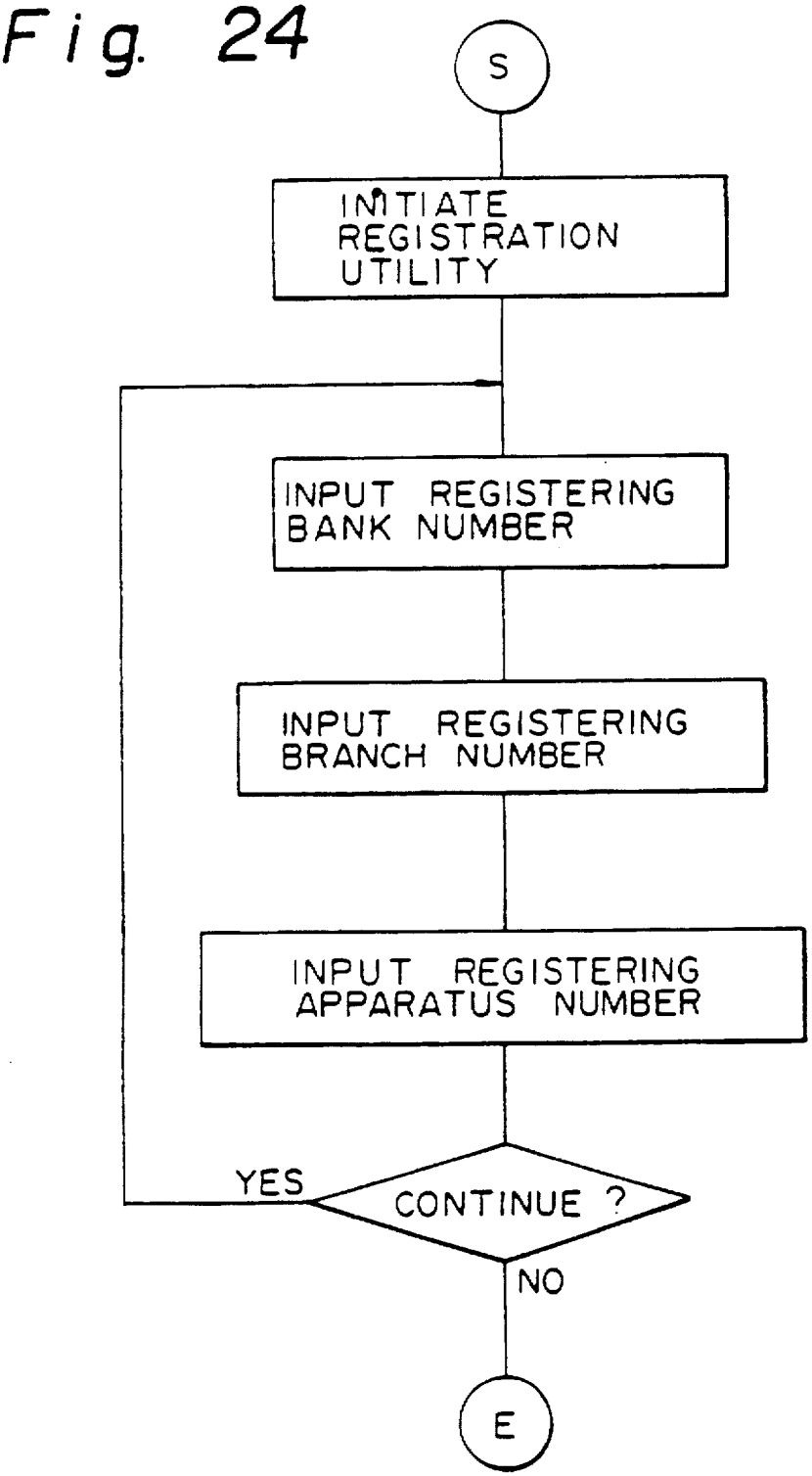
FIG. 24 is a flowchart showing one embodiment of a process for registering authorities in managing the cash handling apparatus of FIG. 21.

FIG. 24 is a flowchart of one embodiment of the process for registering available apparatus information, and FIGS. 25 to 28 show possible data in the available apparatus information to be registered.

In the process of FIG. 24, the user initially inserts the personnel card containing the personnel ID, the P.I.N. and so forth, to a card reader 50, and enter the P.I.N. through the keyboard 52, according to the guidance displayed on the display section 55. The main system control section 54 of the personnel accessible input and output unit 5 of the cash processing system 1 checks the information read from the personnel card and the P.I.N. entered through the keyboard.

When approval of the accessing personnel is confirmed, and the user commands a registering process for the available apparatus for the memory 231 of the cash safe 2, a registration utility of FIG. 24 is triggered for process.

The user sets the cash safe 2 to the adapter 57 to the automatic cash setting and recovering unit 6. Thereafter, through the keyboard 52, a registering bank number is input. The entered registering bank number is displayed on the display section 55 for confirmation. Through a similar process, the registering branch number, the registering apparatus number and so forth are input.

As shown in FIG. 25, it is possible to set a plurality of available apparatuses. Also, as shown in FIG. 26, it is possible to perform setting by leaving the apparatus number "free" or, as an alternative, by leaving the branch number and the apparatus number "free". As a further alternative, it is possible to set the bank number, branch number and the apparatus number "free". The number set as "free" is not subject to check matching of the cash handling apparatus and the cash safe.

After completing the entry of numbers to be registered, the main system control section 54 writes the information in the memory 231 of the cash safe 2 as available apparatus information.

The cash safe for which registration for the available apparatus information is performed, is filled with cash. As in the prior art, the placing of cash can be done manually. However, it is preferable to place the cash by the automatic cash placing and recovering unit 6 through the process set forth above.

Figure 29:
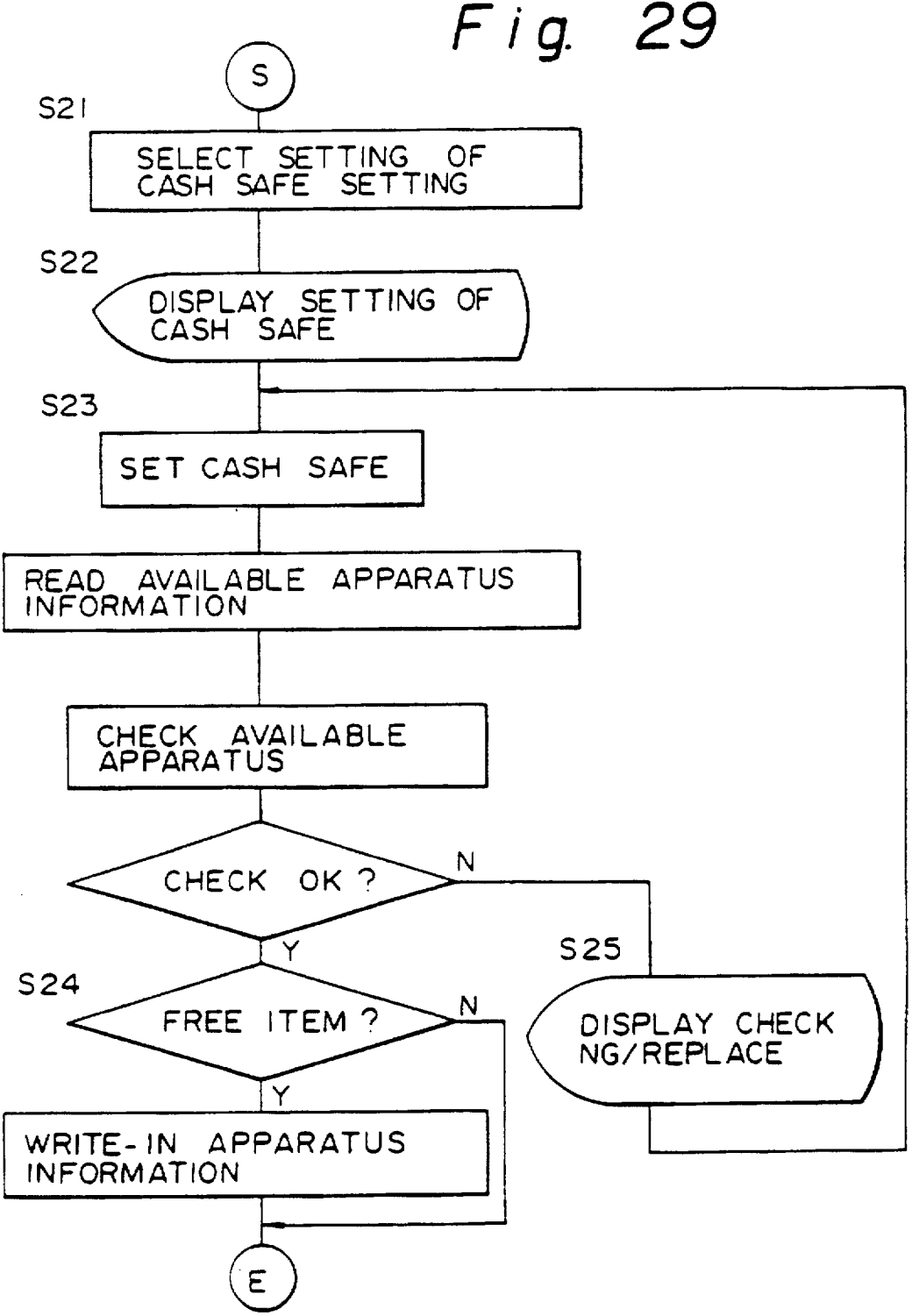
FIG. 29 is a flowchart showing one embodiment of a process for setting a safe.

The cash safe 2 is then set or installed to the cash handling apparatus 3 in the manner set forth above. FIG. 29 shows the process of installing the cash safe to the cash handling apparatus 3, i.e. ATM.

At S21 of FIG. 29, initially, the control section 34 of the ATM prompts, on the liquid crystal display of the maintenance operation section 31, entry of selection command for the desired process. At S22, when setting of the cash safe 2 is selected through the key input section of the maintenance operating section 31, the type of process, i.e. safe setting, is displayed on the liquid crystal display and the ATM is placed on stand-by for setting the cash safe 2.

At S23, when the cash safe 2 is set in the bill recycle unit 30 of the ATM, the bill recycle control section 300 detects setting of the cash safe 2 and reads out the information stored in the memory 231 of the control section 23 of the cash safe 2 through the optical connector CN2. Then, the read information is transferred to the control section 34.

The control section 34 is responsive to the information from the bill recycle control section 300 to compare the available apparatus information with the information of the ATM itself to check if the information matches each other.

When the information, as checked, matches, the control section transmits a set OK indication and the process information, e.g. information on the cash safe 2, ATMID, the user ID who performs the process, process date and time and so forth) to the terminal controller 4a or the host computer 4b so that the host computer may perform management of the history. In the case that the information contained in the memory section 231 of the cash safe, has a free item, the information is updated with the information of the apparatus in which the cash safe is used at S24.

At S25, on the other hand, when judgement is made that the information does not match each other, the control section 34 displays cash matching NG and demand for changing of the set cash safe on the liquid crystal display of the maintenance operation section 31. Then, ATM is placed on stand-by for waiting removal of the unmatched cash safe. When the control section 300 of the bill recycle unit 30 detects removal of the un-matched cash safe, the process returns to S23.

The cash recovery and cash count checking can be processed substantially as discussed hereabove. However, it is also possible to perform cash recovery and cash count check simultaneously. In such cases, the main system control section 54 of the personnel accessible input and output unit 5 is responsive to the recovery/cash count check command for transferring the command to the main control section 670 of the automatic cash setting and recovering unit 6. The main control section 670 reads out the available apparatus information and transfers the read information to the main system control section 54 for display on the display section 55 for confirmation. After entry of confirmation by the user, the bills in the personnel safe 20 of the cash safe 2 are fed out and transferred to the discriminating section 62. After discrimination in the discriminating section 62, the bills are fed to the half-wrapping section 65 via the bill turning section 63. Counting of the fed bills and half-wrapping of the bills are performed by the half-wrapping section 65. The half-wrapped bills are stored in the half-wrapping section 65. At the same time, the counted value indicative of the number of bills recovered from the cash safe 2 is transferred to the main system control section 54. The main system control section 54 displays the counted value on the display section 55. Also, the main system control section 54 writes in the available apparatus information and counted value to the secondary memory device 56 for saving. Furthermore, if necessary, the same information is transmitted to the host computer 4b.

Although the foregoing is directed to the automatic cash recovery and cash count checking to be performed by the preferred embodiment of the cash processing system of the invention, the cash count checking can, of course, be done by manual operation. In this case, the cash safe 2 is initially connected to the adapter 57 so that the main system control section 54 can read out the available apparatus information from the memory 231 of the cash safe 2. Then, the main system control section 54 drives the display section 55 for displaying the read out information for confirmation. After confirmation, the user withdraws the cash from the personnel safe 20 of the cash safe and performs a counting operation by another cash counting machine or so forth. After completing the counting, the counted value is entered via the keyboard.

In an alternative embodiment, the available apparatus information may be input through the key input section 28 of the cash safe 2 without using the cash processing apparatus 1. In such cases, the available apparatus information set in the memory 231 of the cash safe 2 may be read out and displayed on the display section 27 of the cash safe through a manual key entry operation on the key input section 28 upon cash count checking.

Figure 30:
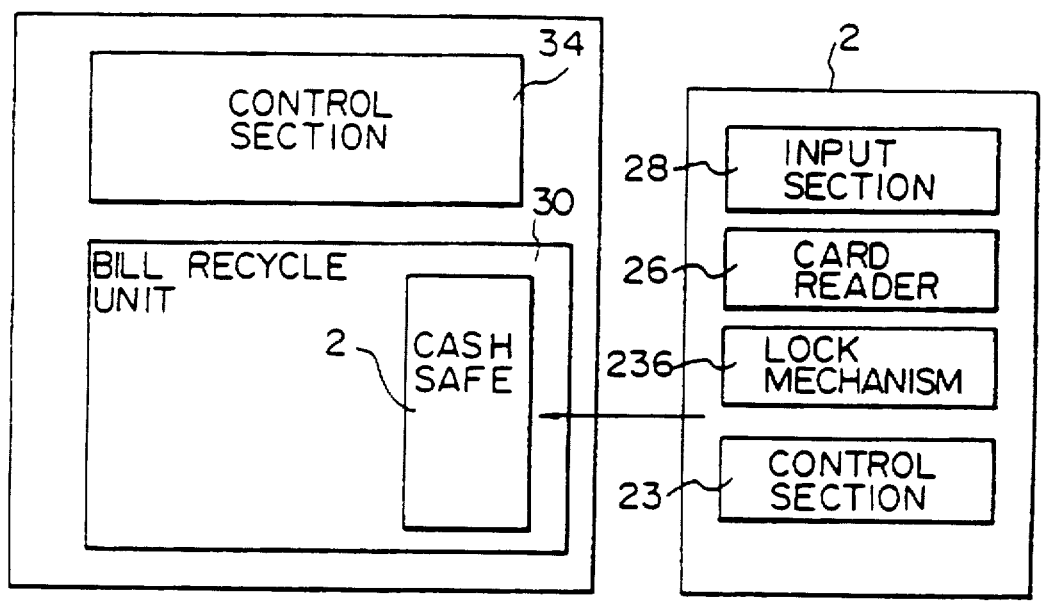
FIGS. 30 and 31 are schematic block diagrams showing another embodiment of cash placement for the cash handling apparatus according to the present invention.

FIGS. 30 to 34 show one embodiment of the cash safe applicable for the preferred embodiment of the cash processing system according to the present invention. In FIG. 30, the shown embodiment of the cash safe 2 is featured having a capability of maintaining high security. The cash safe 2 is used by installing in the bill recycle unit 30 of the cash handling apparatus 3, which can deal with dispensing of the cash. The bill recycle unit 30 is controlled by the control section 34. The cash safe 2 includes the key input section 28, the card reader 26, a door lock mechanism 236 and the control section 23. Through the key input section 28, the P.I.N. is entered. The entered P.I.N. is compared with the content of the personnel card read by the card reader 26 so that the door lock mechanism 236 is controlled for locking and unlocking.

Figure 31:
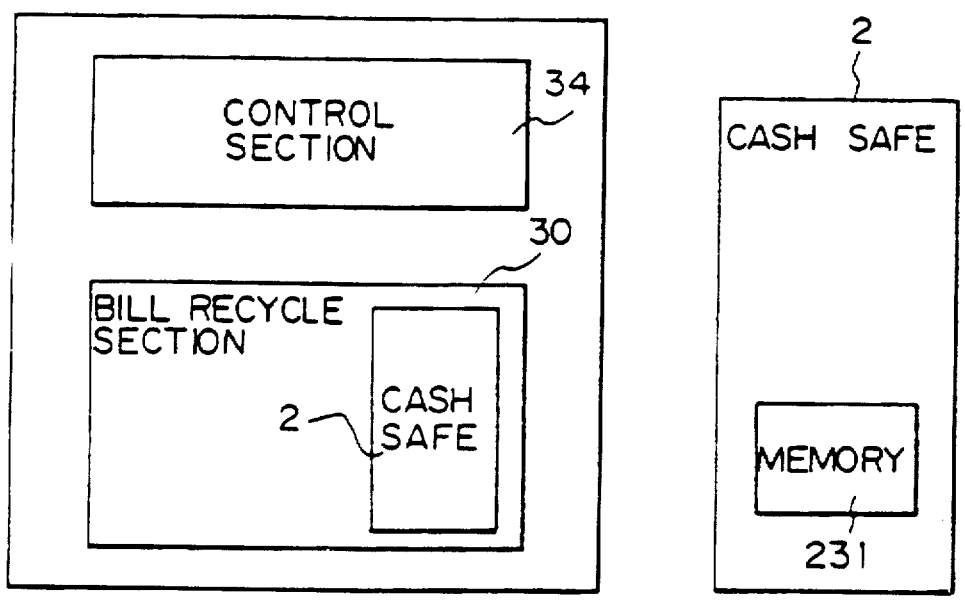

FIG. 31 shows another embodiment in which the memory 231 is provided in the cash safe. Since construction of the cash safe has already been discussed, it may not be necessary to give further discussion.

Figure 33:
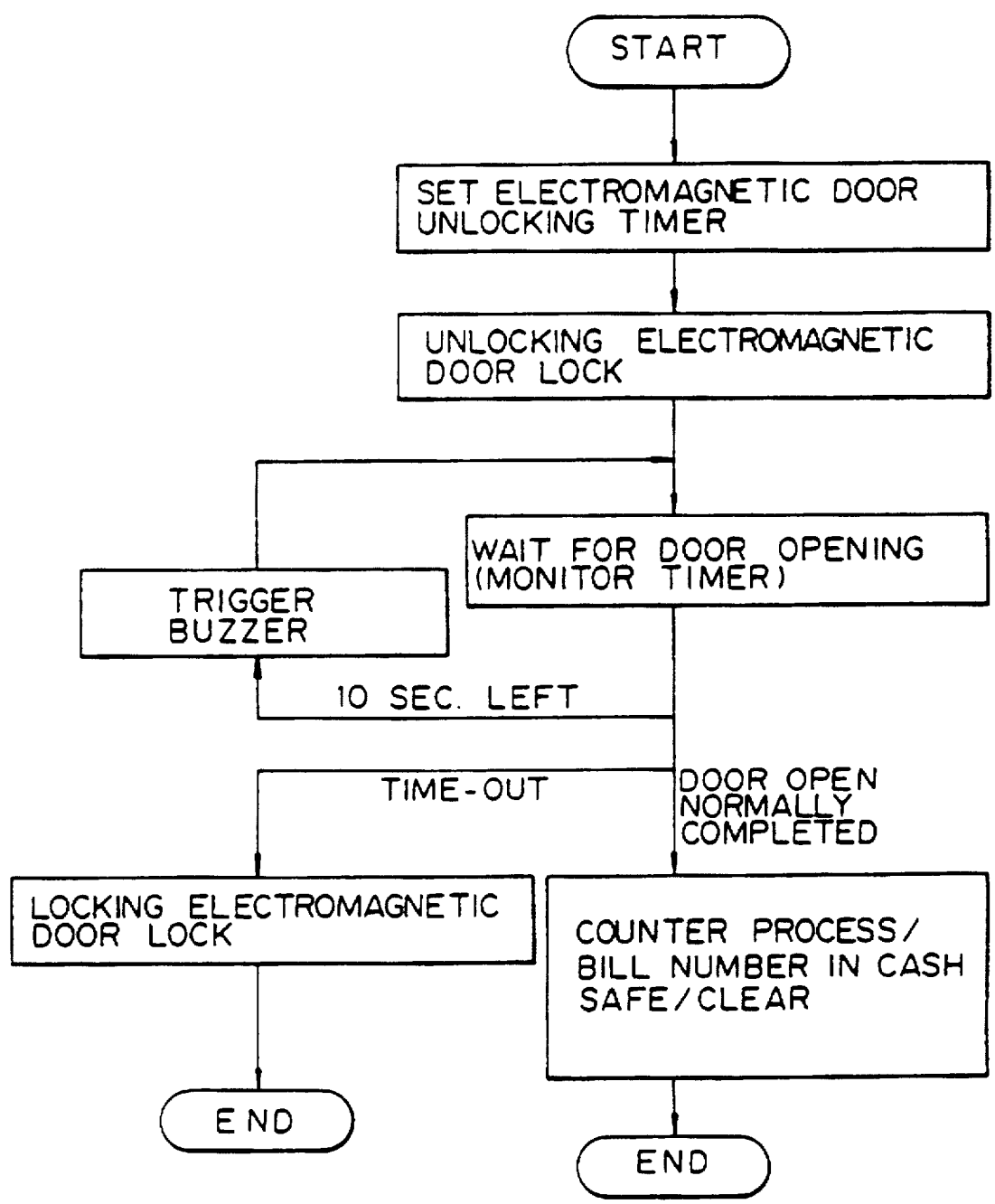
FIG. 33 is a flowchart showing one embodiment of a process for unlocking an electromagnetic door lock in the cash handling system of FIGS. 30 and 31.

Operation of the embodiment will be discussed with reference to FIGS. 32 to 34, in which FIG. 32 shows another embodiment of a process of cash setting, FIG. 33 shows one embodiment of a process for unlocking the electromagnetic door lock and FIG. 34 shows one embodiment of the process for setting cash for the cash safe.

In the process of FIG. 32, the user inserts the personnel card storing personnel identification (ID) code, P.I.N. and so forth to the card reader 26 and enters the P.I.N. through the key input section 28 in the initial process S31. The main control section 230 checks the read content of the personnel card and the P.I.N. for confirming the authority of the personnel accessing.

At S32, if the results of checking cannot confirm authority of the personnel, card NG or P.I.N. NG is displayed on the display section 27. Subsequently, when a re-entry process is commanded through the key input section 28, the process returns to S31; otherwise the process goes to abnormal termination.

At S33, when the authority of the user (personal) is confirmed as the result of check, the user then enters selection of the desired process, e.g. cash setting or cash recovering.

At S34, if the cash setting process is selected, an electromagnetic door lock process of FIG. 33 is triggered. At first, the main control section 230 sets an electromagnetic door lock open timer and unlocks the electromagnetic door lock 236. By this, the door is enabled to open by means of a mechanical key so as to permit access to the inside of the cash safe 2.

Then the main control section 230 is placed on stand-by for waiting time of the electromagnetic door lock open timer. At a predetermined time, e.g. 10 seconds before a predetermined set period in the electromagnetic door lock open timer expires, a buzzer 235 is activated for alerting time-up for the personnel.

On the other hand, when the door is not opened and time-up occurs, the main control section 230 operates the electromagnetic door lock 236 to terminate the process.

Conversely, when door opening is detected by a door opening detecting section 237, the main control section 230 performs a counter process, clears the number of bills in the cash safe stored in the memory section 231 and terminates the process. By opening the door, the user is able to access the personnel safe 20 for recovering the cash therein.

Then, the main control section 230 is placed on stand-by for waiting for the setting of the cash in the cash safe 2. Once the user sets the cash in the personnel safe 20 of the cash safe and closes the door, the main control section 230 activates the electromagnetic door lock 236 to lock. In setting of the cash in the personnel safe 20, the variety of bills, e.g. ten thousand yen bills and one thousand yen bills, are set in the personnel safe in alternating fashion for a predetermined quantity, e.g. every hundred. As set forth in the former embodiment, such alternating setting of the cash enables alternate feeding of different kinds of bills for a uniform supply and a shorter feeding period.

At S36, the main control section 230 performs a set bill number input process as shown in FIG. 34. Namely, the user selects kinds of bills (one thousand yen bill, five thousands yen bill, one thousand yen bill, cancel, end), enters the set number for each kind of bill. When no correction is commanded, the entered number is written in the memory 231 for saving. On the other hand, when a cancel command is entered through the key input section 28, the memory 231 is cleared. On the other hand, when an end command is entered through the key input section 28, the bill number data in the memory 231 is displayed on the display section 27 for confirmation. In this condition, when a cancel command is entered through the key input section 28, the process returns to selection of the kinds of bills for re-entry of the bill numbers. On the other hand, if confirmation is entered, the process is terminated.

Then, the main control section 230 writes in the personnel card data, the P.I.N., performed process information (withdrawn bill number, set bill number, process date and time and so forth in the memory 231 for saving as the historic data of the process.

In the shown embodiment, since the unlocking of the electromagnetic door lock is performed with the entry of a correct or authorized P.I.N., theft prevention can be assured.

In addition, at the same time as the above process, the user should register the content of the process to the terminal controller 4a or the host computer 4b through the cash handling apparatus 3, such as an ATM.

FIGS. 35 to 38 show another embodiment particularly adapted for re-filling cash for the cash safe during service hours.

Before discussion is given for the embodiment of FIGS. 35 to 38, a brief discussion will be given for the prior art system with reference to FIG. 39 in order to facilitate an understanding of the advantages of the present invention.

Figure 39:
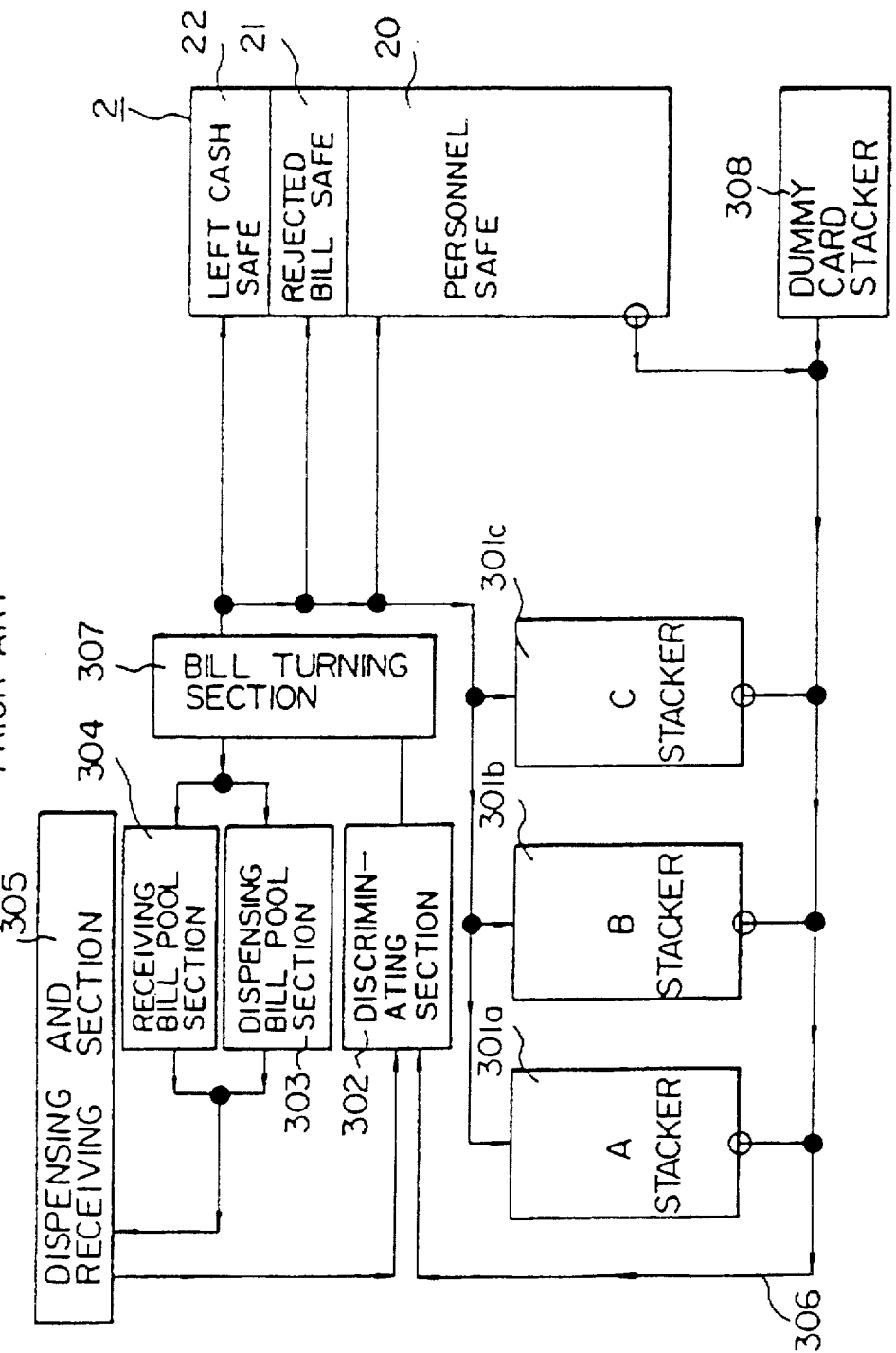
FIG. 39 is a schematic block diagram showing one example of the conventional cash handling apparatus.

As is clear from a comparison between FIG. 39 and FIG. 10, the only difference between the prior art bill recycle system and the bill recycle unit of the invention is presence and absence of the control section 300 in the construction.

It is a typical practice in the prior art that in filling the cash for respective cash stackers 301a, 301b and 301c of the cash handling apparatus the user sets the cash safe 2 in the bill recycle unit 30 of a conventional cash handling apparatus. The cash handling apparatus detects setting of the cash safe to transfer the bills to respective corresponding stackers 301a, 301b and 301c. Counting for the left cash in the cash safe 2 is simultaneously performed.

Through this process, set bill kinds and set number of bills of each kind and the remaining cash amount in the cash safe are made clear. Also, during this process, the historic data is printed out.

After completing all processes, the cash handling apparatus, such as an ATM, is on stand-by for waiting for a service for the customer. Therefore, such cash handling apparatuses become available for service.

In such prior art systems, since re-filling of stackers, bill counting are performed after setting the cash safe and the printing operation is subsequently performed, the process is very time intensive. Long process period results in a long wait for the customer when necessity of re-filling of the cash handling apparatus occurs during service hours. This clearly degrades service.

Furthermore, once the re-filling process is initiated, the responsible user should stay at the cash handling apparatus until the process is completed. This causes substantial work load on the personnel of the financial institute and so forth.

Figure 35:
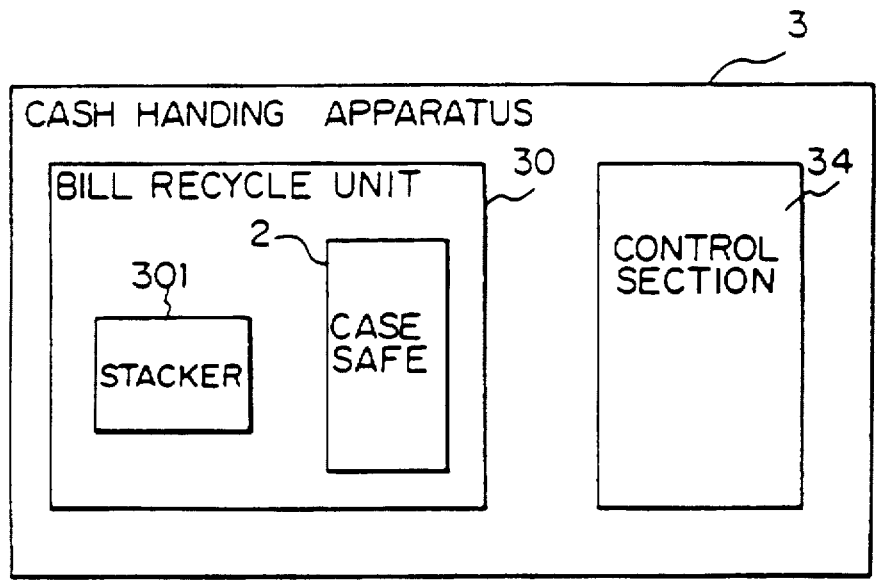
FIG. 35 is a schematic block diagram of another embodiment of a cash handling apparatus according to the invention.

Such problems in the prior art can be resolved by the embodiment of FIGS. 35 to 38. Discussion is now prorated for the embodiment of the cash re-filling process according to the invention. FIG. 35 shows general construction of the cash handling apparatus which can implement the preferred cash re-filling process.

In FIG. 35, the cash safe 2 is detachably installed in the bill recycle unit 30 in the cash handling apparatus 3 which performs a cash dispensing operation. The cash handling apparatus 3 also includes the control section 34 for controlling the bill recycle unit 30. The stackers 301 in the bill recycle unit 6 is fed the corresponding kinds of bills from the cash safe 2. The control section 34 is input the number of bills stored in the cash safe and controls feeding of the bill to the stacker 301 from the cash safe 2 so that a preset minimum re-filling amount of bills set for the stackers, are filled in the stackers.

In the shown embodiment, it is possible that the control section 34 detects that the amount of bills in one of the stackers is greater than the preset minimum re-filling amount and neglects re-filling said stacker.

Figure 36:
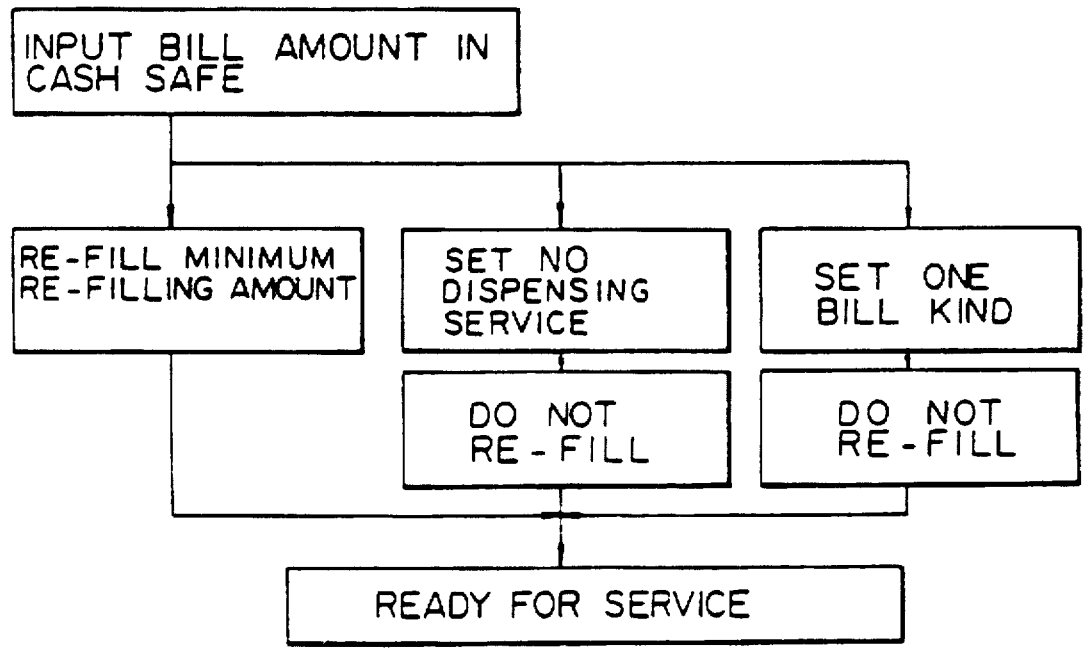
FIG. 36 is a flowchart showing one embodiment of a process for re-filling cash during operation.

FIG. 36 briefly shows the process to be performed in the shown embodiment. As can be seen, in the shown embodiment, the control section 34 checks the condition of the stackers and the cash safe for selecting a re-filling process. When more than one stacker has fewer bills than the preset minimum re-filling amount, a re-filling process is performed for feeding the corresponding kinds of bills until the amount of bills in respective stackers reaches the preset minimum re-filling amount. When the available service does not include the dispensing of cash, the control section 34 sets no dispensing service and does not perform re-filling. On the other hand, when a single kind of bill is present in the cash safe, the control section 34 does not initiate a re-filling process and performs a dispensing service directly from the cash safe.

Figure 37B:
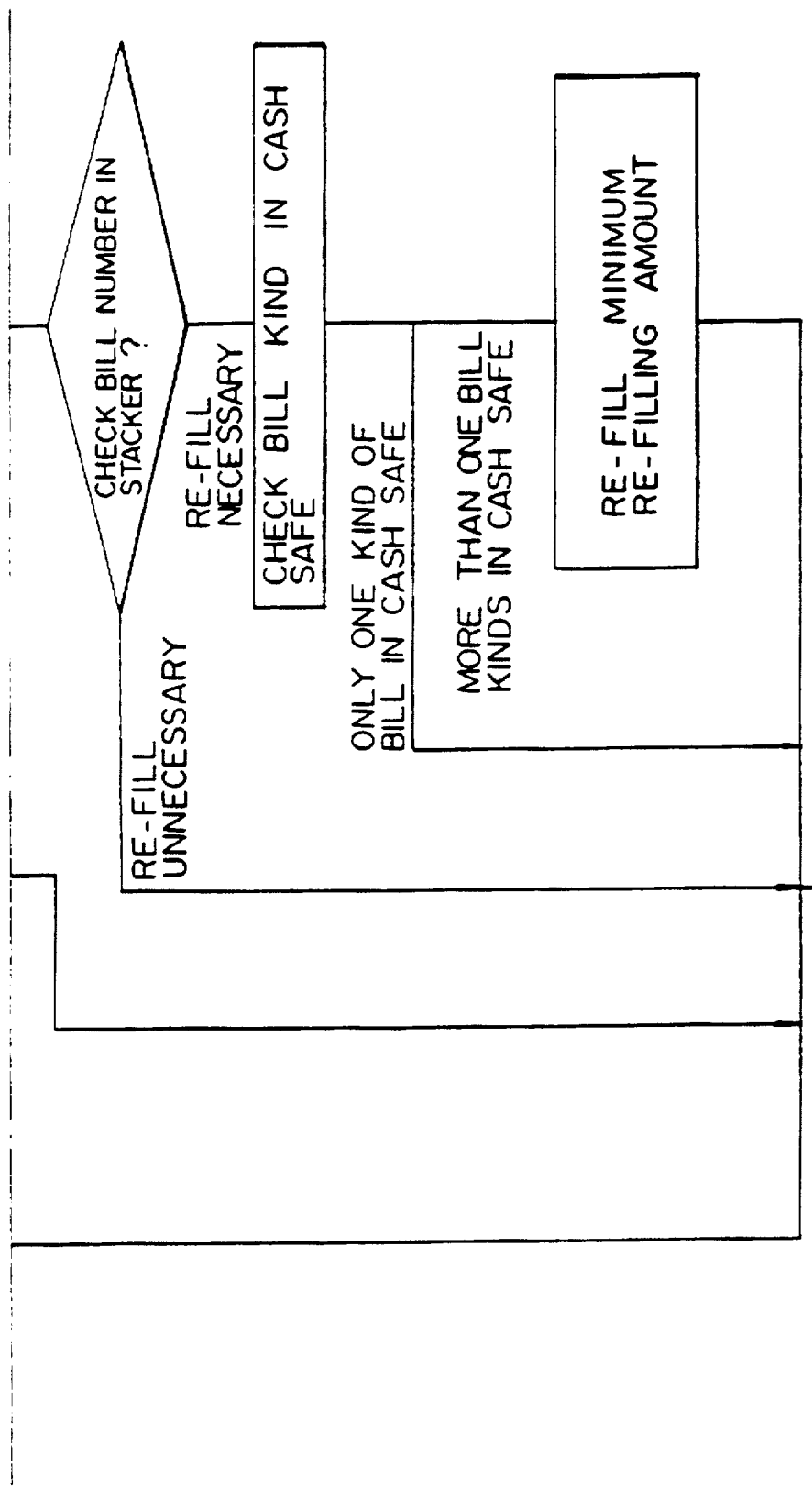

Further details of the re-filling operation will be discussed herebelow with reference to FIGS. 37 and 38.

At S41, from the host computer 4b, opening of the terminal is commanded to the cash handling apparatus 3, such as an ATM. Also, the kind of services to be performed and minimum re-filling amount are given from the host computer 4b to the cash handling apparatus 3. Then the cash handling apparatus 3 initiates the operation.

When the cash safe 2 is set in the bill recycle unit 30 of the cash handling apparatus 3, the sensor 306a detects the presence of the cash safe 2. The control section 300 reads out the cash safe information (e.g. bill amount stored in the cash safe and so forth) from the memory 231 of the cash safe and transfers the read out information to the control section 34.

At S42, the control section 34 performs a normal cash filling and counting process when the cash amount data is not set in the cash safe information in the memory section 231, and subsequently place the cash handling apparatus at a ready state for services at S44 of FIG. 38.

At S43, on the other hand, when the bill amount data is already set in the cash safe information in the memory 231, the control section 34 checks the commanded kinds of services to determine whether the commanded services include a cash dispensing service. When the commanded services do not include the cash dispensing service (e.g. only cash receiving and entry for the bankbook), the control section 34 does not perform filling and counting and places the cash handling apparatus 3 in a state ready for service at S44 of FIG. 38.

When the cash dispensing service is included in the commanded services, the control section 34 checks the amounts of bills in respective managing stackers to determine whether the amounts of bills in respective stackers are greater than the minimum re-filling amount. When all stackers have amounts of bills greater than the minimum re-filling amount, the control section 34 does not perform a filling and counting process and places the cash handling apparatus 3 in a state ready for service at S44 of FIG. 38.

When the amount of bills in the stacker is less than the minimum re-filling amount, the control section 34 checks the bill number data of the cash safe 2 for checking the kinds of bills stored in the cash safe 2. When only one kind of bill is stored in the cash safe 2, the control section 34 does not perform a cash filling and counting and places the cash handling apparatus 3 in a state ready for service at S44 of FIG. 38.

On the other hand, when the cash safe contains more than one kind of bill, the control section 34 performs a filling operation to the stackers 301a, 301b and 301c from the cash safe 2 for the minimum amount. Thereafter, the control section 34 places the cash handling apparatus 3 at a ready state for services at S44 of FIG. 38. At this time, as set forth in the former embodiments, by setting different kinds of bills in an alternating fashion, cash filling can be done efficiently by shortening the required period for filling.

Figure 38A:
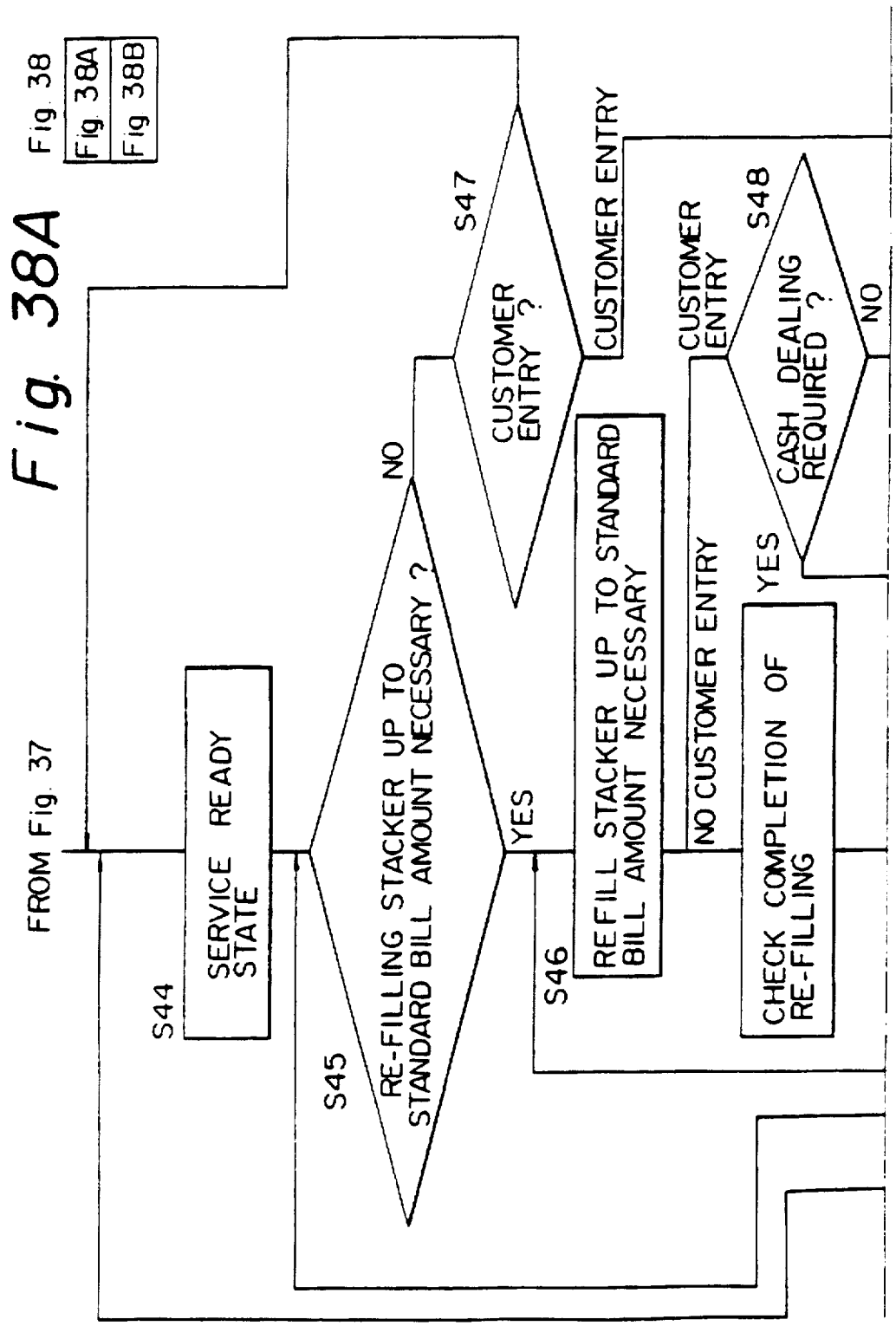
Figure 38B:
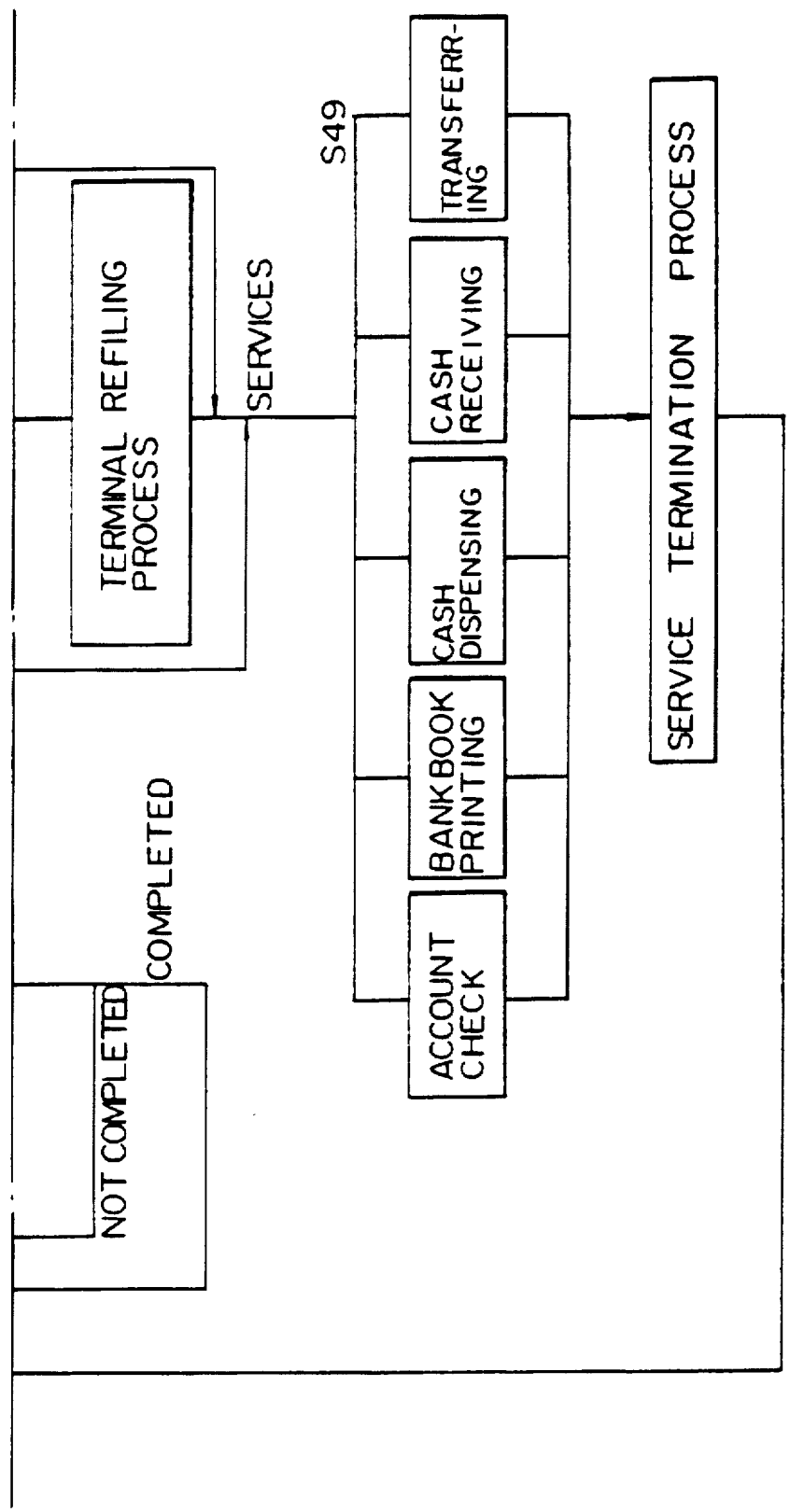

At 44 of FIG. 38, the control section 34 is then ready for services. In this condition, a service menu is displayed on the display screen and selection of services and insertion of the customer's card or bankbook is expected.

At S45, the control section 34 checks the amount of bills in each of the managing stackers and thus determines whether filling with the standard amount of bills is necessary or not.

At S46, when the control section 34 determines that it is necessary to fill the stackers with the standard bill amount thereof, the control section 34 controls the bill recycle unit 30 to a fill the stackers up to the standard bill amount. During this period, a check is performed to determine whether an entry is made by the customer. If so, the process is advanced to S48.

On the other hand, when there is no entry by the customer, a check is performed to determine whether completion of the filling process is noticed from the bill recycle unit 30. If not yet completed, filling of the cash up to the standard bill amount is continued, and otherwise, the process is terminated to return the process to S45.

At S47, when it is determined that filling of cash up to the standard bill amount is unnecessary at S45, the control section 34 checks the entry of the customer. If no customer entry is made, the process returns to S44. On the other hand, when the entry of the customer is detected, the process is advanced to S49 for performing demanded services.

At S48, when entry by the customer is detected at S46, the control section 34 checks whether the cash dealing process is required for the service selected by the customer. When the demanded service requires cash dealing, such as dispensing of cash, receiving of cash or performing a transfer, the filling of cash is terminated and the process is advanced to S49 for performing demanded services. On the other hand, when the demanded service does not require cash dealing, such as account check printing in the bankbook, the cash filling operation is continued and the process is advanced to S49.

Once the control section 34 completes the service process demanded by the customer, e.g. account check, printing of bankbook, dispensing cash, receiving cash, transferring, the process for services is terminated by returning to S44.

As set forth above, when entry for the bill amount in the cash safe 2 is performed and when the cash dispensing service is not included in the commanded services, filling of the stacker from the cash safe 2 is not performed. Therefore, the cash handling apparatus 3 is instantly put in a ready state for service. During the ready state, filling of the stacker from the cash safe is performed to make the cash handling apparatus available for cash dispensing service.

On the other hand, when the bills stored in the cash safe 2 are only of one kind, filling of the stacker by feeding the bills from the cash safe instantly make the cash handling system ready for services. In such cases, the cash dispensing service is performed directly from the cash safe 2.

Furthermore, when the cash safe contains more than one kind of bill, the filling of stackers is performed for the minimum re-filling amount and immediately thereafter the cash handling apparatus is ready for services.

In the alternative embodiment, entry of the bill amount data for the cash handling apparatus 3 is not necessarily read out from the memory 231 of the cash safe 2, but can be performed by directly inputting the cash handling apparatus 3 by key entry, by key entry through the cash safe 2 or by transmission of the data from the host computer 4b.

As can be appreciated from the discussion given hereabove, the preferred process of filling the stackers in the bill recycle unit does not require a counting process for the bill amount in the cash safe 2, only a necessary minimum amount of bills are filled. This shortens the period required for filling the stackers so as to place the cash handling apparatus in the ready state for services earlier thereby enhancing services. Furthermore, by shortening the process period required for re-filling stackers, the work load for personnel can also be reduced.

FIGS. 40 to 48 show a further embodiment of the cash handling apparatus adapted for efficiently handling cash inadvertently left in the apparatus by the customer. Hereafter, the inadvertently left cash by the customer will be referred to as "left cash". Said function is provided even in the currently available cash handling apparatus and operates satisfactory in terms of assuring storage of the left cash with identification of the customer who left the cash. In the prior art, it is a typical practice to store the left cash separately from other cash so that the left cash is transferred from the cash dispensing and receiving section 305 to the left cash safe 22 in the cash safe 2 through the discriminating section 302. When cash is left in the cash handling apparatus, the dummy card stacker 308 feeds one dummy card as a separator for respective left cash. The dummy card is thus inserted between the left cash for separating formerly left cash. At the same time, information is printed on the journal for identification of the customer who left the cash.

When the customer appears to recover the left cash, the left cash safe 22 is checked for picking up the left cash left by the customer and the journal is checked to confirm left cash and the identification of the customer. Said process is time intensive requiring the customer to wait for a long period. Also, such time intensive work should increase the work load of the personnel of the banking service.

Such problems in the prior art can be solved by the cash handling apparatus 3 of FIGS. 40 to 48.

Figure 40:
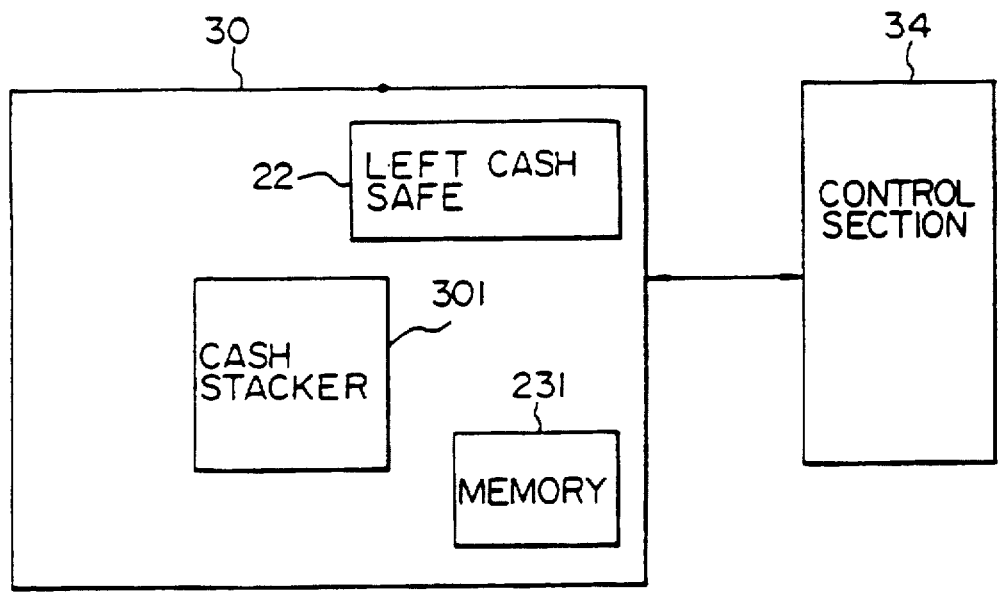
FIG. 40 is a schematic block diagram of a further embodiment of a cash handling apparatus incorporating a function for storing inadvertently left cash.
Figures 41A, 41B:
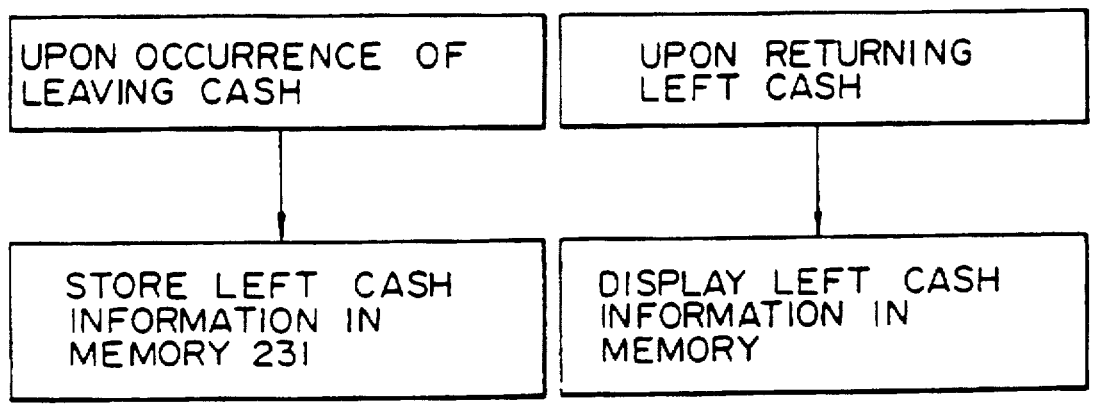
FIGS. 41(A) and 41(B) showing a flowchart showing processes for storing information associated with left cash and for reproducing information for returning the left cash to the customer.

FIG. 40 briefly shows the general construction of the shown embodiment of the cash handling apparatus 3. The cash handling apparatus 3 includes the cash safe 22 in the cash safe 2, which also includes a memory section 231. The cash handling apparatus 3 includes a bill recycle unit 30, in which the cash safe 2 including the left cash safe 22 is set. The control section 34 of the cash handling apparatus 3 operates the apparatus to store the left cash in the left cash safe 22 whenever cash is left in the apparatus. For quick and accurate confirmation of the identity of the customer who left the cash, the memory section 231 of the cash safe 2 includes a left cash file for storing information associated with the left cash upon occurrence of left cash in the apparatus as shown in FIG. 41(A). Upon returning the left cash to the customer, the information in the memory section 231 can be accessed and displaced so that the customer can be easily and quickly identified, as shown in FIG. 41(B).

Figure 42:
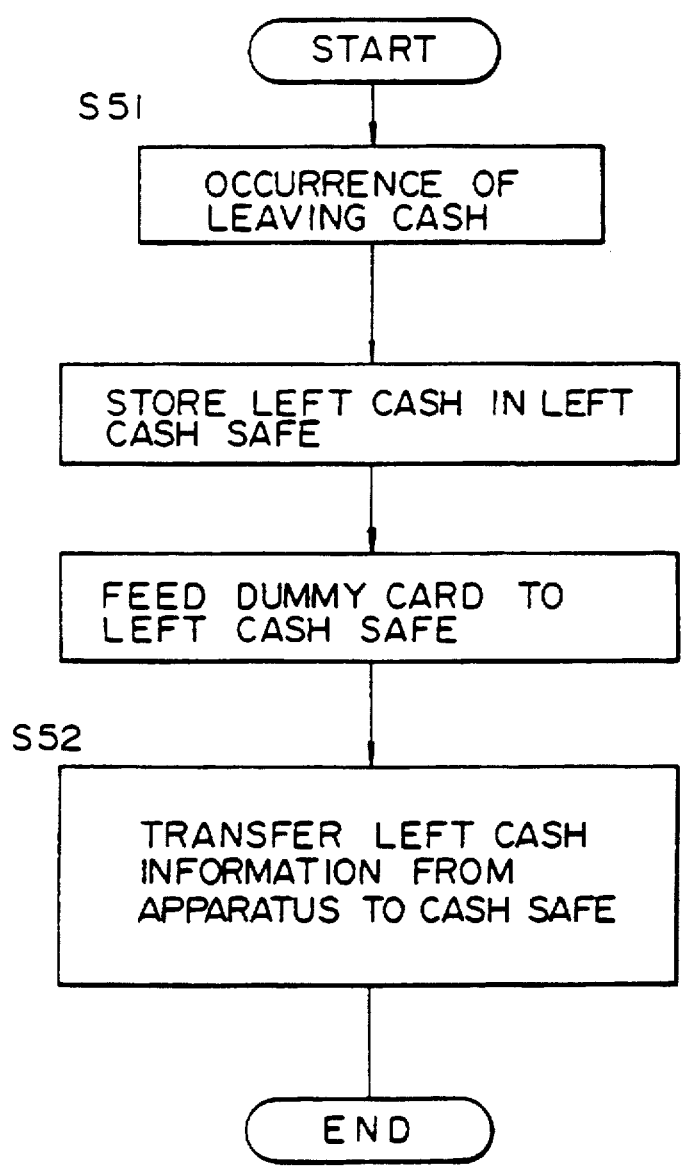
FIG. 42 is a flowchart showing one embodiment of a process for handling inadvertently left cash.

Further details of the process of handling the left cash will be discussed herebelow with reference to FIGS. 42 to 48. FIG. 42 shows a process for handling left cash, and FIG. 43 explains information associated with the left cash.

At S51, the bill recycle unit 30 detects a predetermined period in which the dispensed cash is maintained within the cash dispensing and receiving section 305 after dispensing the cash, to determine that the cash is left. Then, the bill recycle unit 30 feeds the left cash to the left cash safe 22 of the cash safe 2 through the discriminating section 302. Then, the left cash is stored in the left cash safe 22. Subsequently, the dummy card stacker 308 feeds one dummy card to the left cash safe 22 to place the fed dummy card on the top bill of the left cash as a separator for separating the particular left cash from another left cash, which may be fed from the bill recycle unit 30 at the subsequent occurrence of left cash.

Figure 43:
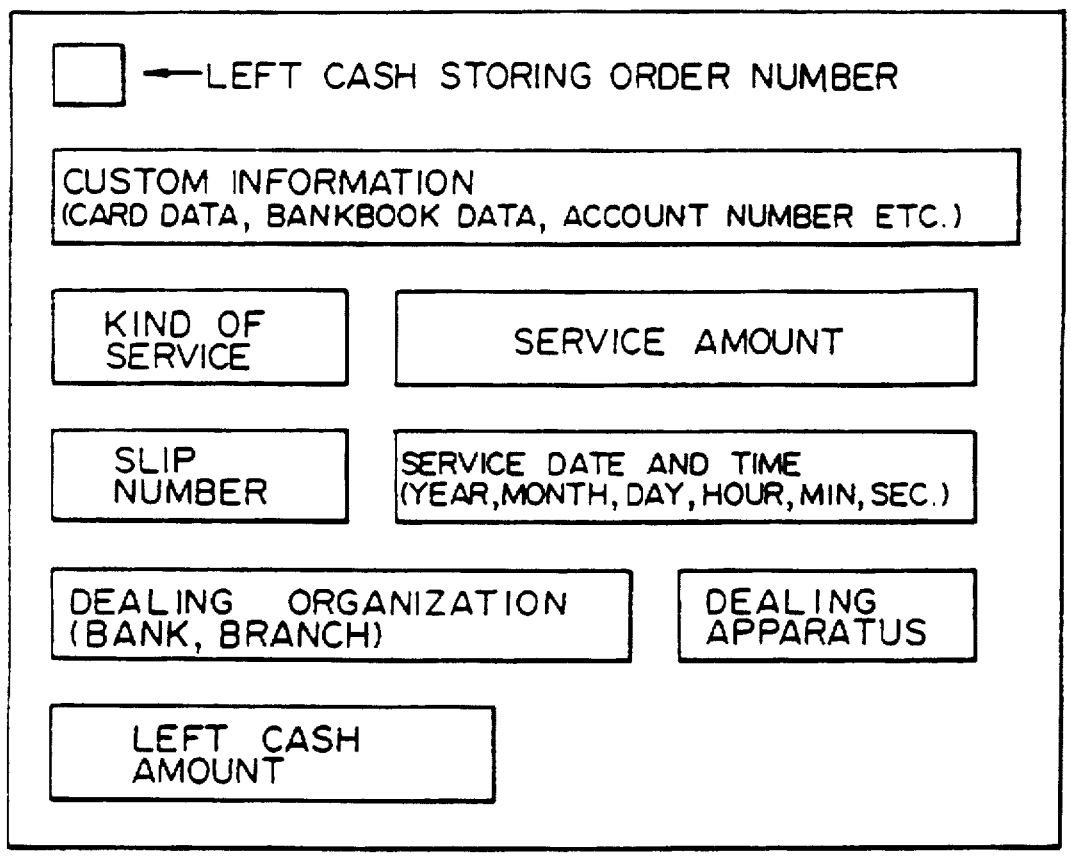
FIG. 43 is an explanatory illustration showing an example of information associated with left cash, to be stored.

At S52, the control section 34 is responsive to the occurrence of left cash in the cash handling apparatus 3 and performs an editing process of left cash information which includes stacked order number of the particular left cash, customer information, e.g. card data, bankbook data, account number and so forth, kind of done service, e.g. dispensing, receiving, transferring or so forth, amount on service, e.g. total amount, number of bills of each kind, slip number, service date and time, dealing organization, e.g. bank name, branch name and so forth, service machine, left amount, e.g. total left amount, number of bills of each kind, and so forth, as shown in FIG. 43. The control section 34 transfers such left cash information to the control section 300 of the bill recycle unit 30. The control section 300 transmits the received information to the control section 23 of the cash safe 2 for writing in the information associated with the left cash stored in the left cash safe in the memory section 231 thereof.

Figure 44:
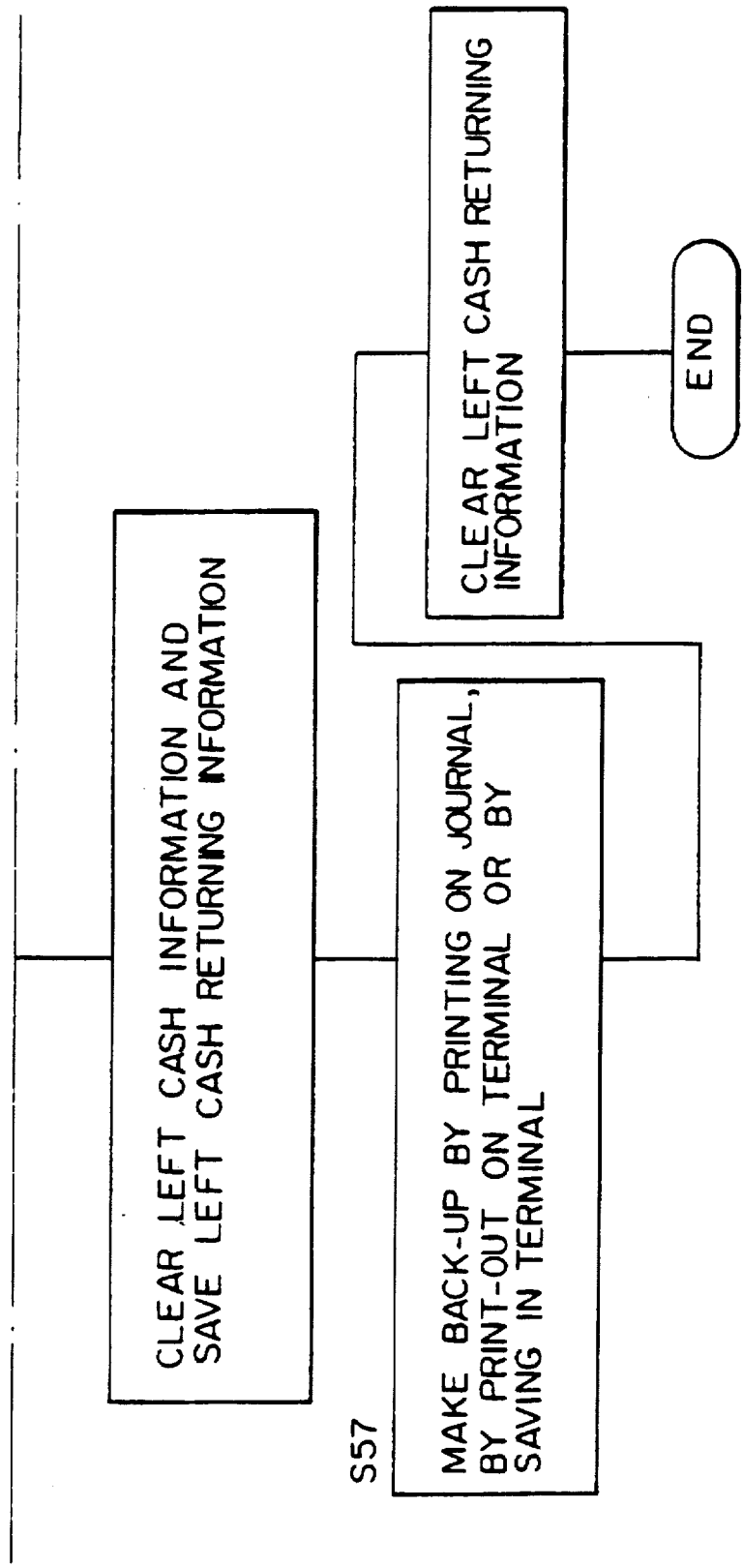
FIGS. 44A and 44B are flowchart showing one embodiment of a process for returning the left cash.
Figure 45:
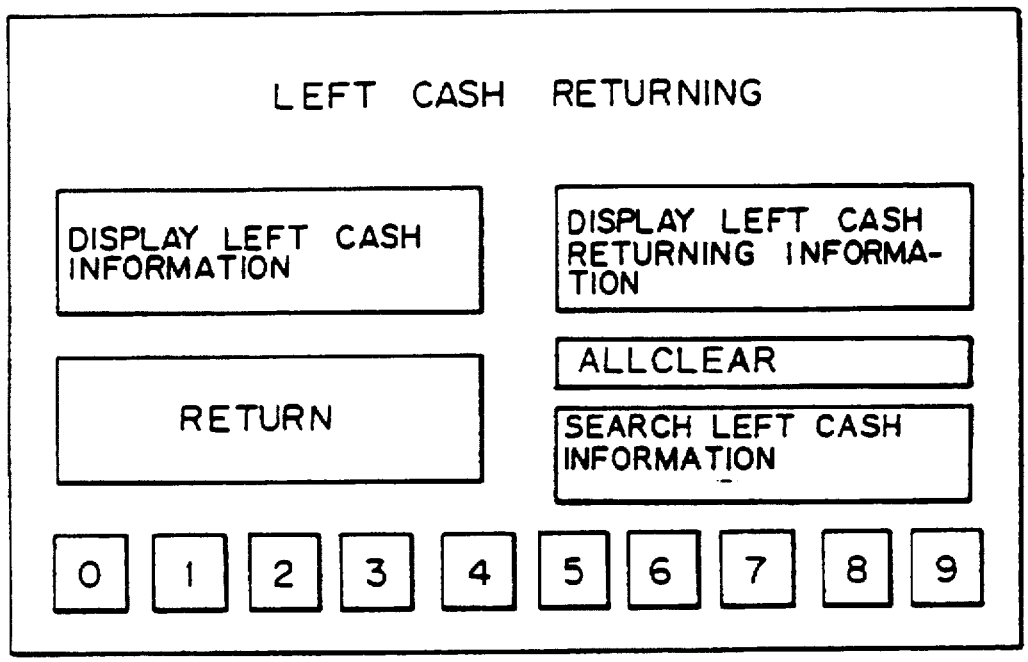
FIGS. 45 and 46 are explanatory illustrations showing a display for returning left cash.
Figure 46:
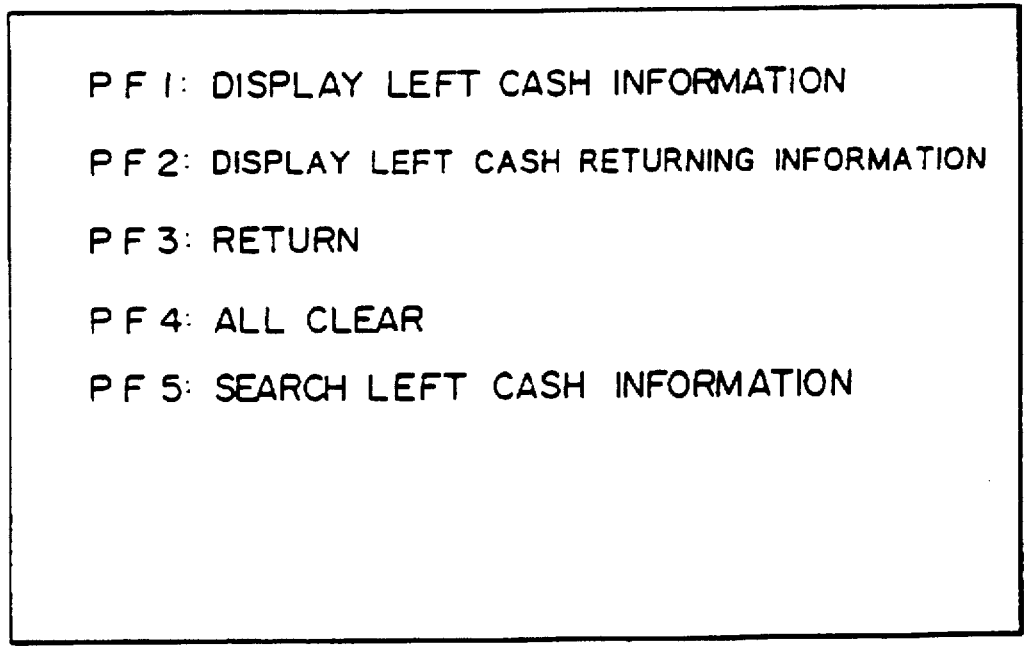
Figure 47:
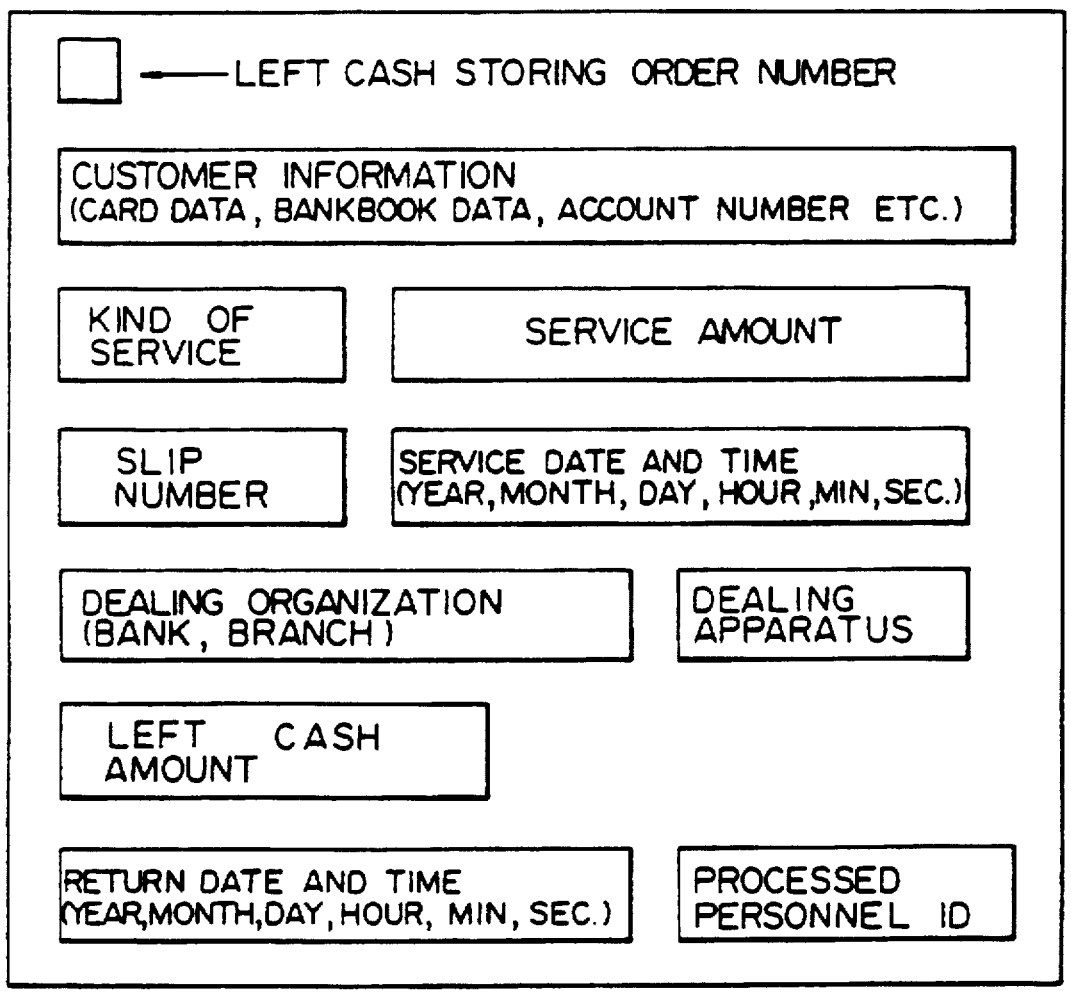
FIG. 47 is an explanatory illustration showing an example of left cash return information.

FIG. 44 shows the process for handling the left cash and returning the same to the customer for recovery. FIGS. 45 and 46 show one example of a display adapted for the process of returning the left cash. FIG. 47 shows information associated with returning the left cash.

At S53, when the customer who left the cash appears and requests the return of the left cash, and if the relevant cash safe 2 is still in the cash handling apparatus 3, the user inserts the personnel card to the reader/writer section 33 of the cash handling apparatus so that the information on the personnel card is read out. On the other hand, when the relevant cash safe 2 has already been removed from the cash handling apparatus 3, reading of the personnel card is performed by the card reader 26 of the cash safe 2, or as an alternative, by the card reader of the terminal device to which the relevant cash safe 2 is connected.

At S54, when the cash safe 2 is maintained within the cash handling apparatus 3, a left cash returning menu as shown in FIG. 45 is displayed on the color display screen of the customer accessible operating section 32, or as an alternative, the menu as shown in FIG. 46 is displayed on the liquid crystal display in the maintenance operation section 31. In either case, left cash information is selected and the customer card is inserted into the reader/writer section 33 of the cash handling apparatus 3 for entering card information. Then, the control section 34 performs a search against the information stored in the memory section 231 of the cash safe 2 to display the left cash information on the color display or the liquid crystal display as shown in FIG. 43.

The user confirms the left cash information and confirms the return of left cash by withdrawing the corresponding left cash from the left cash safe 22. Subsequently, the user enters the stacked order number of the returned cash and depresses a key to enter the fact that the left cash has been returned.

At S55, when the cash safe 2 is not set in the cash handling apparatus 3, similar left cash information is displayed on the terminal device connected to the cash safe 2 or the display section 27 of the cash safe 2. The personnel confirms the left cash information and the left cash to be returned. Thereafter, the corresponding left cash is withdrawn from the left cash safe and returned to the customer. Subsequently, the personnel enters the stacked order number of the returned cash and depresses a key to enter the fact that the left cash has been returned.

At S56, the control section or the main control section 230 of the cash safe 2, or, as an alternative, the control section of the terminal device performs an editing process for the left cash returning information by adding the left cash return date and time, the processed personnel ID (content of personnel card) for the left cash information. The left cash returning information is then written in the returned left cash file in the memory section 231 of the cash safe 2. Simultaneously, the left cash information associated with the returned left cash is cleared from the left cash file.

At S57, subsequently, the content of the returned left cash file in the memory section 231 of the cash safe 2 is printed on the journal of the cash handling apparatus 3 or by the terminal device to which the cash safe is connected. Also, the content of the left cash file is written in the file in the terminal device for back-up. Then, the content of the returned left cash file in the memory section 231 is cleared.

It should be noted that when the cash safe 2 is removed from the cash handling device 3 and not connected to the terminal device, the content of the returned left cash file is maintained in the memory section 231 of the cash safe 2.

When the customer who left the cash does not appear to recover the left cash, the user occasionally withdraws all of the left cash in the left cash safe 22 for storage in the main safe or so forth for returning to the customer at a later time. Thereafter, all clear keys are depressed and subsequently the returning key is depressed. Then, the control section performs an editing operation for the returned left cash information by adding the return date and time, returning personnel ID. The returned left cash information is then written in the memory section 231 of the cash safe 2 and the corresponding left cash information in the left cash file is cleared.

FIG. 48 shows another process for handling the left cash. In the former embodiment, a search for the left cash file in the memory section 231 is performed utilizing the customer card. Conversely, the shown embodiment allows access to the relevant left cash information in the left cash file such as customer's name, secret code, service amount, dealing date and time.

Namely, in this embodiment, at process S54 and S55, the left cash information search menu is displayed for selection of entering item, and subsequently switches the display for entry of the selected item. In response to the entry of the selected item of information, a search against the left cash file of the memory section 231 can be performed.

In the alternative embodiment, the information used for searching the left cash file can be the bankbook data in replace of the customer card data. It should be further noted that although the memory section 231 is provided in the cash safe in the shown embodiment, the corresponding memory section may be provided in the bill recycle unit 30 or the control section 34.

As can be appreciated herefrom, all of the objects and advantages sought for the present invention can be fulfilled.

While the present invention has been discussed in detail in terms of the preferred embodiment, the invention should not be interpreted to the specific construction, arrangement or processes set forth above. The discussion for the preferred embodiment should be appreciated as mere examples for practical implementation of the present invention. Therefore, the present invention should include all possible variations, modifications and changes that can be done without departing from the principle of the invention set out in the appended claims.

We claim:

1. A method for managing a cash safe in a cash handling apparatus comprising:

inputting available apparatus information representing at least one of a plurality of cash handling apparatus which can use the cash safe through an operator input section of the cash safe;

storing the available apparatus information in a memory in the cash safe;

reading out the available apparatus information from the memory of said cash safe upon placement of the cash safe in the cash handling apparatus;

checking whether the cash safe set in the cash handling apparatus is available for use;

permitting use of the cash safe upon availability; and inhibiting use of the cash safe upon unavailability of the cash safe for use, wherein the available apparatus information which is input can be set to an open setting by the operator, so that the cash safe can be used with more than one of the plurality of cash handling apparatus.

2. The method for managing a cash safe in a cash handling apparatus as set forth in claim 1, wherein when the available apparatus information contains information of more than one available apparatus, the apparatus information of the cash handling apparatus, in which the cash safe is set, is written in the memory of the cash safe set in the cash handling apparatus after checking the cash handling apparatus.

3. The method as set forth in claim 1, wherein the available apparatus information is read out from the memory of the cash safe when a cash counting checking process for the cash safe is performed.

4. The method as set forth in claim 3, wherein the read out available apparatus information is displayed on a display section of the cash safe.

5. The method as set forth in claim 3, wherein the cash safe is connected to a cash processing apparatus and the read out available apparatus information is input to the cash processing apparatus.

6. The method as set forth in claim 5, wherein the cash processing apparatus feeds out the cash in the cash safe for counting.

* * * * *